US005569730A

United States Patent [19]
Goodall et al.

[11] Patent Number: 5,569,730
[45] Date of Patent: Oct. 29, 1996

[54] ADDITION POLYMERS DERIVED FROM NORBORNENE-FUNCTIONAL MONOMERS AND PROCESS THEREFOR

[75] Inventors: Brian L. Goodall, Akron; George M. Benedikt, Solon; Lester H. McIntosh, III, Cuyahoga Falls; Dennis A. Barnes, Medina; Larry F. Rhodes, Silver Lake, all of Ohio

[73] Assignee: The B. F. Goodrich Company, Akron, Ohio

[21] Appl. No.: 339,863

[22] Filed: Nov. 15, 1994

Related U.S. Application Data

[63] Continuation-in-part of Ser. No. 153,250, Nov. 16, 1993, Pat. No. 5,468,819.

[51] Int. Cl.$^6$ .............................. C08F 10/00; C08F 34/00; C08F 32/02; C08F 32/08
[52] U.S. Cl. .............................. 526/282; 526/82; 526/83; 526/84; 526/161; 526/164; 526/169; 526/171; 526/177; 526/178; 526/179; 526/280; 526/281; 526/308; 526/283
[58] Field of Search .................................. 526/171, 281, 526/308, 164, 169, 282

[56] References Cited

U.S. PATENT DOCUMENTS

| | | |
|---|---|---|
| 2,721,189 | 10/1955 | Anderson et al. . |
| 3,330,815 | 7/1967 | McKeon . |
| 4,599,391 | 7/1986 | Yamamoto ........................... 526/282 |
| 5,087,677 | 2/1992 | Brekner ................................ 526/160 |

FOREIGN PATENT DOCUMENTS

| | | |
|---|---|---|
| 445755 | 9/1991 | European Pat. Off. . |
| 0504418 | 9/1992 | European Pat. Off. . |
| 2244276 | 11/1991 | United Kingdom . |

OTHER PUBLICATIONS

"Preparation and Reactivity Studies of Highly Versatile, Nickel-Based Polymerization Catalyst Systems" by T. J. Deming and B. M. Novak, *Macromolecules* 1993, 26, 7089-7091.

"Comprehensive Organometallic Chemistry" by Geoffrey Wilkinson et al, Chapter Ziegler-Natta Catalysis by Gavens et al, p. 484 et seq. (1982).

"The Organic Chemistry of Nickel" by P. W. Jolly and G. Wilke, vol. 1 Academic Press, New York, p. 352 (1974).

*J. of Polymer Science*, Part C 1b, p. 2525 (1967) by L. Porri, G. Natta, and M. C. Gallazzi.

"Copolymers of Ethylene with Bicyclic Dienes" by Schnecko et al *Die Angewandte Makromolekulare Chemie*, 20, 141-152 (1971).

*Chim. Ind.* (Milan) by L. Porri, G. Natta, and M. C. Gallazzi, 46 428 (1964).

*Stud. Surf. Sci. Catal.* 56 425 (1990) by W. Kaminsky et al.

*Makromol. Chem. Macromol. Symp.* 47 83 (1991) by W. Kaminsky et al.

*J. Mol. Cat.* 74 109 (1992) by W. Kaminsky et al.

*Shokubai* 33 536 (1991) by W. Kaminsky.

(List continued on next page.)

*Primary Examiner*—Fred Zitomer
*Attorney, Agent, or Firm*—Thoburn T. Dunlap

[57] ABSTRACT

Addition polymers derived from norbornene-functional monomers are terminated with an olefinic moiety derived from a chain transfer agent selected from a compound having a terminal olefinic double bond between adjacent carbon atoms, excluding styrenes, vinyl ethers, and conjugated dienes and at least one of said carbon atoms has two hydrogen atoms attached thereto. The addition polymers of this invention are prepared from a single or multicomponent catalyst system including a Group VIII metal ion source. The catalyst systems are unique in that they catalyze the insertion of the chain transfer agent exclusively at a terminal end of the polymer chain.

19 Claims, 9 Drawing Sheets

OTHER PUBLICATIONS

"Polypropylene and Other Polyolefins Polymerization and Characterization" by Ser van der Ven–Studies in Polymer Science–7, Elsevier (1990), pp. 71–84.

*J. of Organometal. Chemistry* by A. Sen, T. Lai, and R. Thomas 358 567–568 (1988).

*Makromol. Chem., Rapid Commun.* 12, 255–259 (1991) by C. Mehler and W Risse, "The Pd(II) Catalyzed Polymerization of Norbornene".

*Makromol. Chem., Rapid Commun.* 13, 455–459 (1992) by C. Mehler and W Risse, "The Pd(II) Catalyzed Polymerization of Norbornene Derivatives".

"Olefin Metathesis" by K. J. Ivin, Academic Press (1983).

*J. Polym. Sci, Polym. Chem.,* by U. Klabunde et al. 25 1989 (1987).

"Homogeneous Catalysis: The Applications and Chemistry of Catalysis by Soluble Transition Metal Complexes" by G. W. Parshall and Ittel, pp. 70–71. (1992).

*Makromol. Chem.* 193 73 (1970) by R. Sakata et al, "Effect of Unsaturated Hydrocarbons on the Polymerization of Butadiene, etc.".

"Synthesis and Characterization of poly(5–alkyl–2–norbornene)s by Cationic Polymerization" by T. Sagane et al *Macromol. Chem. 194 37–52 (1993).*

"Zietschrift fur Kristallographie" 201 287–289 (1992) by R. Kempe and J. Sieler.

Encyclopedia of Polymer Science and Engineering, 2nd Edition vol. 2, John Wiley & Sons (1985).

ADDITION POLYMERS DERIVED FROM NORBORNENE-FUNCTIONAL MONOMERS AND PROCESS THEREFOR

This is a continuation-in-part of application Ser. No. 08/153,250 filed on Nov. 16, 1993 U.S. Pat. No. 5,468,819.

BACKGROUND OF THE INVENTION

The well-known advantages of a polymer having chains containing directly linked polycyclic repeating units free of unsaturation, have driven those skilled in the art to search for a processable "addition polymer" of one or more multi-ringed monoolefinically unsaturated cycloolefin monomers such as norbornene, bicyclo[2.2.1]hept-2-ene or "NB" for brevity, and substituted embodiments thereof, such as ethylidenenorbornene or decylnorbornene, and particularly those monomers of NB having at least one substituent in the 5-(and/or 6-) positions. The foregoing monomers are collectively referred to herein as "norbornene-type" or "norbornene-functional" or "NB-type" or "NB-functional" monomers, for convenience, recognizing that, just as in NB, or substituted NB, each NB-type polymer is characterized by containing a repeating unit resulting from an addition polymerized derivative of bicyclo[2.2.1]hept-2-ene. A first NB-type or NB-functional monomer may be polymerized by coordination polymerization to form (i) an addition homopolymer; or, (ii) with a second NB-type or NB-functional monomer, either one (first or second) of which is present in a major molar proportion relative to the other, to form an addition NB-type copolymer; or, (iii) with a second monomer which is not an NB-type monomer, present in a minor molar proportion relative to the first, to form an addition copolymer with plural repeating units of at least one NB-type or NB-functional monomer.

Polynorbornene or "poly(bicyclo[2.2.1]hept-2-ene)" or polyNB for brevity, was originally produced a long time ago (U.S. Pat. No. 2,721,189). However this original material was found to contain two types of polymers, one brittle, the other thermoformable and 'drawable'. The brittle polymer was later found to be a low molecular weight ('mol wt') saturated polymer which was termed an addition type polymer; and, the thermoformable polymer was shown to be formed by ring opening metathesis polymerization ('ROMP'). A ROMP polymer has a different structure compared with that of the addition polymer in that (i) the ROMP polymer of one or more NB-type monomers, contains a repeat unit with one less cyclic unit than did the starting monomer, and, (ii) these are linked together in an unsaturated backbone characteristic of a ROMP polymer and is shown below:

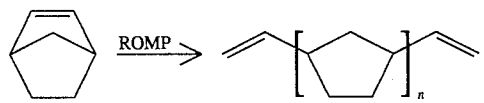

It will now be evident that, despite being formed from the same monomer, an addition-polymerized polyNB is clearly distinguishable over a ROMP polymer. Because of the different (addition) mechanism, the repeating unit of the former has no backbone C=C unsaturation as shown below:

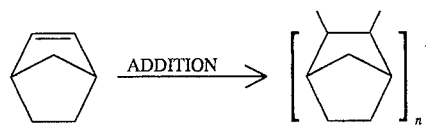

The difference in structures of ROMP and addition polymers of NB-functional monomers is evidenced in their properties, e.g., thermal properties. The addition type polymer of NB has a high $T_g$ of about 370° C. The unsaturated ROMP polymer of NB exhibits a $T_g$ of about 35° C., and exhibits poor thermal stability at high temperature above 200° C. because of its high degree of C=C unsaturation.

Some time later, reaction conditions were optimized so as to enable one to choose, and selectively make, either the low mol wt addition polymer, or the ROMP polymer. In U.S. Pat. No. 3,330,815, the disclosure taught that only the addition polymer was synthesized with $TiCl_4/Et_2AlCl$ or $Pd(C_6H_5CN)_2Cl_2$, under particular conditions, except that the polymers produced were only those in the mol wt range from 500 to 750 in which range they were too brittle for any practical application.

Addition polymers of norbornene have been shown to be produced with "zirconocene type" catalysts such as those taught by Kaminsky et al, and others, all well known to those skilled in the art. These polymers have been found to be a highly crystalline form of a "norbornene-addition polymer", that is, an addition polymer of a NB-functional monomer, which is totally insoluble, and reportedly does not melt until it decomposes at ≈600° C. (under vacuum to avoid oxidation). It is therefore unprocessable (W. Kaminsky et al., *J. Mol. Cat.* 74, (1992), 109; W. Kaminsky et. al. *Makromol. Chem, Macromol. Symp.*, 47, (1991) 83; and W. Kaminsky, *Shokubai*, 33, (1991) 536.). An added distinguishing characteristic of the zirconocene catalyst system is that it catalyzes the copolymerization of ethylene and norbornene. In such copolymers, the amount of NB incorporated into the ethylene/NB copolymer can be varied from high to low (W. Kaminsky et. al. *Polym. Bull.*, 1993, 31, 175).

The polymer formed with a zirconocene catalyst can incorporate ethylene (or compounds containing ethylenic unsaturation at a terminal end thereof) in its backbone, randomly, whether in runs of a multiplicity of repeating units, or even a single unit. It should also be noted that the ionic metallocene catalysts, such as zirconocenes and hafnocenes, use metals from Group IVB as the cation with a compatible weakly coordinating anion. These catalysts are entirely distinct from the catalysts used in this invention.

Research has continued toward the production of a melt-processable addition polymer of a NB-type monomer, and is the subject of an on-going effort. By "melt-processable" it is meant that the polymer is adequately flowable to be thermoformed in a temperature window above its $T_g$ but below its decomposition temperature. To date, there has been no disclosure of how to solve the many problems inherent in the production of a heat-resistant, yet thermoformable and processable polymer of a NB-functional monomer which polymer can be extruded, injection molded, blow molded, and the like, using conventional equipment.

To date, we know of no practical or reliable method for commercially producing an amorphous NB addition polymer with controlled mol wt. Polymers formed with too low a mol wt are of limited utility in thermoformed articles. Polymers with too high a mol wt can only be cast from solution and in some cases are completely insoluble and difficult to thermoform. The goal has been to produce an addition polymer having a mol wt $M_w$ in the range of 50,000 to 500,000, using only one or more NB-functional monomers, in a reliably controlled manner. The only method available to produce such a polymer has been through premature deactivation of the catalyst systems which produce amorphous polymers of NB, the homopolymers having tool wts in the millions. Predictably, this method of mol wt control leads to low catalyst productivity and requires the use of high catalyst levels when the mol wt $M_w$ is to be in the range from about 150,000–350,000. Since the problem of forming a processable NB-type polymer was never solved, the second, equally serious problem of obtaining a useful or practical level of conversion was never addressed.

A few years ago the reactivity of cationic, weakly ligated, transition metal compounds was studied in the polymerization of olefins and strained ring compounds, (A. Sen, T. Lai and R. Thomas, *J. of Organometal. Chemistry* 358 (1988) 567–568, C. Mehler and W. Risse, *Makromol. Chem., Rapid Commun.* 12, 255–259 (1991)). Pd complexes incorporating the weakly ligating $CH_3CN$ (acetonitrile) ligand in combination with a weakly coordinating counteranion could only be used with aggressive solvents such as acetonitrile or nitromethane. When Sen et al used the complexes to polymerize NB, a high yield of a homopolymer which was insoluble in $CHCl_3$, $CH_2Cl_2$ and $C_6H_6$, was obtained.

The identical experimental procedure, with the same catalyst and reactants, when practiced by Risse et al used one-half the molar amount of each component. Risse et al reported the synthesis of a polyNB homopolymer which had a mol wt $M_n$ of 24,000. In other runs, using different ratios of NB to $Pd^{2+}$-compound, polyNBs having mol wts $M_n$ of 38,000 and 70,000 respectively with narrow dispersities $M_w/M_n$ in the range from 1.36 to 1.45, and viscosities in the range from 0.22 to 0.45 dL/g were made. A homopolymer which had a viscosity of 1.1 was synthesized, which upon extrapolation from the mol wt data given for the prior runs, indicates the $M_w$ was over $10^6$. See Mehler and Risse *Makromol. Chem., Rapid Commun.* 12, 255–9 (1991), experimental section at the bottom of page 258 and the GPC data in Table 1 on pg 256. The polymers were soluble in 1,2-dichlorobenzene in which Risse et. al. measured mol wts by GPC (gel permeation chromatography) and viscometry, as did Maezawa et al in EP 445,755A, discussed below.

Maezawa et al disclosed the production of high mol wt NB polymers with a two-component catalyst system. The disclosure states that the polymer is preferably formed in the molecular weight range from $10^5$ to $10^7$. The manner of obtaining the desired mol wt is shown to be by terminating the polymerization reaction after a predetermined period. Such termination is effected by decomposing the catalyst with an external terminating agent such as acidified methanol, which is added to the reaction to stop the polymerization. There is no internal control of the mol wt within a predetermined range by an agent that does not deactivate the catalyst.

Specifically, three known methods of controlling the mol wt are suggested: (i) varying the amount of the transition metal compound used; (ii) varying the polymerization temperature; and (iii) using hydrogen as a chain transfer agent "CTA" (see page 9, lines 20–23 of the '755A disclosure) as suggested by Schnecko, Caspary and Degler in "Copolymers of Ethylene with Bicyclic Dienes" *Die Angewandte Makromolekulare Chemie*, 20 (1971) 141–152 (Nr.283). Despite the foregoing suggestions, there is no indication in '755A that any of them was effective, as is readily concluded from the illustrative examples in the specification. As stated in their illustrative Example 1 in which the catalyst included a combination of nickel bisacetylacetonate $Ni(acac)_2$ and methaluminoxane ("MAO"), a polyNB having $M_w=2.22\times 10^6$ (by GPC) was formed. As shown in Table 1 of the '755A reference, only Exs. 5, 6 and 7, in which the (triphenylphosphine)Ni-containing catalysts were used, made homopolymers with $M_w=234,000$; 646,000; and 577,000 respectively. These nickel catalysts with a triphenylphosphine ligand, are shown to have relatively lower productivity than the biscyclooctadienylnickel (Ex 3) and biscyclopentadienylnickel (Ex 4) which were also used.

One is therefore led to conclude that only those Ni-based catalysts which have substantially lower productivity than $Ni(acac)_2$ with a MAO catalyst system would effectively decrease the mol wt of the homopolymer produced. There is no suggestion that any of the polymers disclosed in the '755A reference are likely to be melt-processable. A conclusion that they are not melt-processable is supported by the evidence that all the polymers made by Maezawa et al were cast from solution.

A key aspect of the '755A disclosure was that the catalyst system disclosed was a combination of at least two components, namely, a transition metal complex, and a methaluminoxane cocatalyst. Maezawa et al used this multi-component catalyst system to produce the high mol wt polymers in the range above $5 \times 10^5$. It was critical that the transition metal component in the complex be from Groups VB, VIB, VIIB, and VIII, and that it be paired with the methaluminoxane cocatalyst in order to produce polymer in a reasonable yield. The criticality of the cocatalyst was confirmed by illustrative examples of transition metal compounds which were generally catalytically effective only so long as methaluminoxane was the cocatalyst (Comparative Examples 3, and 4). The experimental evidence indicated that attaining a high productivity catalyst system was limited to specific nickel complexes in combination with MAO as the activator. All the illustrative examples having been run in toluene, it is evident that they were unaware that a polar solvent such as a halohydrocarbon, and the like, might improve productivity.

It is evident that the results obtained with the '755A catalyst/cocatalyst system are different from those with a Group VIII metal catalyst in which the metal is weakly ligated to displaceable ligands and a portion of a ligand generates a σ-bond. Whether the σ-bond-generating ligand has an allyl group or a canonical form thereof, the allyl metal linkage provides the initial metal-C σ-bond into which successive NB-type moieties are inserted to form a polymer chain. This insertion reaction is well known in the analogous propagation of ethylene in Ziegler Natta catalysis described in detail in the text *Comprehensive Organometallic Chemistry* edited by Geoffrey Wilkinson et al, in a chapter titled "Ziegler-Natta Catalysis" by Gavens et al, 1982, pg 484 et seq. Allyl-Ni cationic complexes have been synthesized for the polymerization of butadiene, but an allyl-Ni-cyclooctadiene ("allyl-Ni COD") cation complex was reported not to be catalytically active (see text, *The Organic Chemistry of Nickel* P. W. Jolly and G. Wilke, Vol I Academic Press New York, 1974 pg 352).

On the other hand, it has long been recognized that cationic nickel compounds are active catalysts for the polymerization of butadiene (R. Taube, et al *Makromol. Chem., Macromol. Symp.* 66, (1993) 245; L. Porri, G. Natta, M. C. Gallazzi, *J. of Polymer Sci. Pt C.* 16 (1967) 2525). Taube et al state "The chain growth proceeds by the insertion of butadiene into the allyl nickel bond always with formation of the new butenyl group in the 'anti' configuration (anti insertion)." The coordination of an allyl type ligand to the nickel is maintained continuously throughout the butadiene polymerization. This mechanism is clearly distinguishable from the insertion mechanism of a NB-functional monomer in which insertion of only the very first monomer molecule occurs at an allyl type ligated metal center.

Allylnickelhalides alone (no Lewis acid cocatalyst) have been used to produce polyNB, however the molecular weights of the NB polymer produced in these studies were actually low; eg 1000 to 1500 mol wt. (L. Porri, G. Natta, M. C. Gallazzi *Chim. Ind.* (*Milan*), 46 (1964),428). It had been thought that the low yields and the low mol wts of the polyNB were due to deactivation of the catalysts.

Still more recently, in a lone example of the use of a nickel catalyst as a transition metal equivalent to zirconium, Okamoto et al disclosed the production of high mol wt norbornene polymer with a three component catalyst system in example 117 on page 46 of EP 504,418A. The three-component catalyst was made in situ by combining triisobutylaluminum; dimethylanilinium tetrakis(pentafluorophenyl)borate; and, $Ni(acac)_2$ in toluene. The polymer recovered had a $M_w=1.21 \times 10^6$ and a mol wt distribution of 2.37. Though essentially the entire specification is directed to the copolymerization of cycloolefins with α-olefins using zirconium-containing catalysts, Okamoto et al did not react norbornene and α-olefin with a nickel catalyst. Nowhere in the '418A specification is there a teaching that the use of an α-olefinic CTA will control molecular weight. There is no teaching of a polymer with a terminal olefinic end-group. Nor is there any teaching that an α-olefin would do anything but copolymerize.

The failure to recognize that an α-olefin might function as a CTA, with or without the presence of an alkylaluminum cocatalyst, was understandable since there existed a large body of work related to the copolymerization of cycloolefins with α-olefins, and in none of such polymerizations was there any disclosure that the α-olefin might function as an effective CTA. Further, the great reactivity of ethylene or propylene buttressed an expectation that copolymerization, not chain transfer, is the logical and expected result.

Since practical consideration relating to melt-processing cycloolefin addition polymers produced herein, dictate that their mol wt be controlled within one order of magnitude, e.g., in the range from 50,000 to 500,000, it is evident that the '755A invention was unable to provide either a solution to the problem, or even an enabling disclosure to solve it. They do not suggest they can reliably make a reproducible polymer in the defined mol wt range. They suggest the use of hydrogen as CTA, and provided no reason to explore using another, least of all a CTA with a terminal non-styrenic, non-vinyl ether double bond. Moreover, there is no disclosure of a polymer with a terminal end-group derived from a compound having terminal unsaturation.

Neither is there any basis for estimating the effect of an α-olefin as a CTA in an insertion reaction, particularly insofar as the α-olefin is effective to tailor the mol wt of the growing polymer chains in an addition polymerization, irrespective of whether a multicomponent Group VIII catalytic system is used in a complex catalyst of the type taught by Maezawa.

An acyclic olefin, e.g., 1-hexene, is known to be an effective CTA in the ROMP of cyclic olefins, to reduce mol wt via a cross-metathesis mechanism. ROMP involves a metal carbene (or metal alkylidene) active center which interacts with the cyclic olefin monomer to afford a metallocycloalkane intermediate. A repeating unit contains a C=C double bond for every C=C double bond in the monomer. How effectively the acyclic olefin reduces the mol wt of the copolymer formed depends on the structure of the olefin and on the catalyst system (K. J. Ivin, *Olefin Metathesis*, Academic Press, 1983). In contrast, addition (or vinyl type) polymerization of olefins and diolefins involves the insertion of the monomer into a metal-carbon σ-bond, as in Ni—C, or Pd—C. Despite the many disclosures relating to the formation of copolymers of NB-type monomers, and the well-known fact that an olefin is an effective chain transfer agent in a ROMP polymerization, it will now be evident why the difference in the mechanisms of chain termination failed to suggest the use of an olefin as a chain transfer agent in the copolymerization taught herein.

Chain transfer via β-hydride elimination has been previously described. See, for example, *Polypropylene and other Polyolefins* Polymerization and Characterization by Ser van der Ven, *Studies in Polymer Science* 7, Elsevier Amsterdam, etc. 1990, Chapter 1 POLYPROPYLENE; CATALYSTS AND POLYMERIZATION ASPECTS by Brian L. Goodall, and Section 1.6 thereof titled "The Effect of Catalyst and Process Variables on the Molecular Weight and its Distribution ("Chain Transfer"), and particularly Section 1.6.3 *On The Mechanism of Chain Transfer*, pg 82–83. In typical α-olefin polymerization hydrogen is introduced to control molecular weight. There is no teaching that the introduction of a second type of olefin will result in control of molecular weight or will selectively terminate a polymer chain with a well-defined olefinic end-group.

In typical α-olefin polymerizations, it is recognized that the known mechanism of "β-hydride elimination" can provide a double bond near the terminal end of the polymer chain. In this mechanism which modulates the mol wt of olefinic polymers, a metal bonded to a hydrocarbyl radical with hydrogens on the carbon β to the metal, can undergo a reaction where the β-hydrogen is abstracted to the metal, leaving an olefinic group. This results in an unsaturated polymer chain and the metal hydride. In general, the rate of β-hydride elimination vs. the polymerization rate, controls the molecular weight of the polymer. For most polymerization catalyst systems, the proclivity of the catalyst system toward β-hydride elimination must be extensively researched and is not predictable. The polymer mol wt depends upon a host of process variables: the choice of monomer or monomers, the presence of or absence of hydrogen, the ligand environment around the transition metal, the presence of additional donor ligands, type of catalyst (homogeneous or heterogeneous), presence or absence of a cocatalyst (and choice thereof), and polymerization medium (bulk, solution, slurry, gas phase), inter alia. It will be clear from the above and is well documented in the literature that the resulting poly(α-olefin) contains a mixture of end-groups both saturated and unsaturated.

The factors that influence β-hydrogen elimination in the case of Group VIII metal catalysts are also unpredictable, for example, nickel catalysts have been used in the polymerization of ethylene. Depending upon the Ni catalyst chosen, it is possible to generate exclusively the dimer (1-butene), higher olefins (oligomers), or high mol wt polyethylene. Homogeneous Ni catalysts for the polymerization of ethylene to high mol wt polyethylene have been described by Klabunde et al. (U. Klabunde et al., *J. Polym. Sci., Polym. Chem.*, 25 p 1989 (1987)) and Ostoja Starzewski (P. W. Jolly and G. Wilke, Vol 2, supra) where the polymer mol wt is controlled by the ligand environment around the nickel and the choice of reaction medium The polymerization of ethylene has been reported to occur in the presence of a variety of different nickel containing Ziegler catalysts and single-component nickel catalysts, while other nickel catalysts give only dimers (see P. W. Jolly and G. Wilke, Vol 2, supra). Shell Oil Co. uses a nickel-catalyzed oligomerization of ethylene to manufacture linear α-olefins on a large scale (see G. W. Parshall and S. D. Ittel, *Homogeneous Catalysis: The Applications and Chemistry of Catalysis by Soluble Transition Metal Complexes*, John Wiley and Sons, 1992).

The mechanism by which an α-olefin affects both initiation and propagation rate in a different polymerization system, namely the cobalt-catalyzed polymerization of butadiene (to butadiene rubber) was known, as stated by Goodall supra, on pg 83, but the rate at which the reaction occurs, and the amount of butadiene which is incorporated in the rubber chains is not predictable, necessitating the presence in the reactor, of a major molar amount of α-olefin relative to the butadiene. From the foregoing considerations there is no basis in the art to predict the effect of an α-olefin on the polymerization of a NB-functional monomer.

It is noted that nickel catalysts have been used in the polymerization of butadiene where the solvent is neither a chlorohydrocarbon nor an aromatic solvent such as toluene or xylene. With some catalysts, the microstructure of the polymer is a function of its mol wt. With others, unsaturated hydrocarbons such as acetylenes and allenes retard initiation and propagation and enhance chain transfer, but do not affect microstructure (see *Encyclopedia of Polymer Science and Engineering Second Edition*, Vol 2, pg 537; John Wiley and Sons, 1985).

However monoolefins were reported to have no effect on the polymerization of butadiene, at least when the amount added is relatively small (see R. Sakata, J. Hosono, A. Onishi and K. Ueda, *Makromol. Chem.*, 139 (1970) 73). Still other nickel catalysts (with different ligand environments) give only (cyclic) dimers and trimers, such as "COD" and cyclododecatriene ("CDT").

It should be noted that the structure of the Ni-cyclodiolefin complex has been investigated in the interest of exploring numerous transition metal complexes with weakly ligated compounds in combination with a counteranion. Such a study was published by R. Kempe and J. Sieler in *Zeitschrift fur Kristallographie* 201, 287–289 (1992) who did not suggest it would have catalytic activity. Also known are compounds related to $(\pi\text{-}C_3H_5NiCl)_2\cdot TiCl_4$, which compounds are formed by reacting π-allylnickel halides with strong Lewis acids (e.g., $TCl_4$, $AlBr_3$), and these are used for the polymerization of butadiene and the dimerization of olefins. There was no logical reason from known facts about nickel catalysts which would suggest the use of the known metal complex as a particularly effective catalyst for NB-functional monomers.

There is a need to control the $T_g$ of NB-addition polymers. The effect of an alkyl substituent on the $T_g$ of a copolymer was disclosed in an article titled "Synthesis and characterization of poly(5-alkyl-2-norbornene)s by cationic polymerization. Effect of alkyl substituent length on monomer reactivity, polymer structure and thermal properties" by T. Sagane et al, *Macromol. Chem.* 4, 37–52 (1993). The longer the sidechain, the lower the $T_g$ of the polymer. However, the copolymers were made with a $AlEtCl_2$/tert-butyl chloride catalyst system, and the mol wt $M_w$ of the longest chain made was less than 2500. There was no suggestion that any other complex metal system, or any other catalyst system might yield higher mol wts.

In view of the foregoing discussion, the prior art has not described or contemplated NB-type addition polymers having a single olefinic group located at a terminal end thereof.

Nor has the prior art described or contemplated a method of controlling the molecular weight of an addition polymerized NB-type polymer in the presence of a chain transfer agent having a terminal double bond. Moreover, there is no teaching that the introduction of a selected α-olefin CTA into the reaction medium will selectively terminate a NB-type addition polymer chain with a well-defined olefinic endgroup. Additionally, the prior art does not address the effect of alkyl substituent length for the control of $T_g$ of NB-type polymers over 2,500 $M_w$.

SUMMARY OF THE INVENTION

Accordingly, it is a general object of this invention to make a NB-type addition homo- or copolymer having chains with a terminal end-group derived from a chain transfer agent ("CTA") containing a terminal olefinic non-styrenic, non-vinyl ether double bond, without the chain transfer agent being introduced into the polymer chain except near an end thereof.

It is another object of this invention to produce a NB-type polymer with a controllable $M_w$.

It is still another object of this invention to make a CTA terminated addition polymer having a repeating unit derived from (i) an unsubstituted NB or NB-functional monomer including norbornadiene; (ii) NB substituted with a $(C_1–C_{20})$alkyl, $(C_1–C_{20})$haloalkyl, $(C_5–C_{12})$cycloalkyl which, in turn, may be substituted; or, (iii) $(C_1–C_6)$alkylidene group; or, (iv) an aryl or haloaryl group, e.g., phenylNB, p-chlorostyrylNB; or, a $(C_7–C_{15})$aralkyl or haloaralkyl group, e.g., 5-benzylNB; or (v) vinylnorbornene (vinylNB); or (vi) $(C_3–C_{20})$alkylenylNB provided it does not terminate with a vinyl group, that is, the double bond in the substituent is an internal olefinic bond.

In another object of the invention homopolymers or copolymers derived from NB-functional monomers are formed in a desired mol wt range by using a predetermined amount of a CTA having an olefinic terminal double bond. The amount of CTA used is a function of the mol wt chosen for the polymer, irrespective of which addition polymerization catalyst is used. Preferably the catalyst yields only an addition polymer terminated with the chain transfer agent as a chain end in which the olefinic double bond is preserved.

It is a further object of the present invention to control the mol wt range of polymer by the use of a terminal olefinic CTA in the presence of a NB-functional monomer, a transition metal complex, and a sufficient amount of an alkylaluminoxane cocatalyst.

It is another specific object of this invention to provide a homopolymer or copolymer derived from a norbornene-functional monomer having a controlled mol wt in a predetermined range wherein the monomer preferably has a single $(C_6–C_{16})$alkyl or $(C_6–C_{12})$haloalkyl, or ethylidene substituent at the 5 and/or 6 positions, and the length of the substituent on at least one of the monomers is chosen to provide a polymer of desired $T_g$.

It is still another specific object of this invention to provide a copolymer derived from NB-functional monomers, at least one of which is a NB-functional monomer having a single alkylene substituent having from 2 to 20 carbon atoms, in which copolymer the length of the substituent on at least one of the monomers and the ratio of the comonomers is so chosen as to provide a copolymer of desired $T_g$.

It is yet another object of this invention to provide a copolymer of a first monomer selected from the group consisting of NB and substituted NB present in a major amount relative to a second monomer chosen from a mono($C_4$–$C_8$)cycloolefin; norbornadiene; dimers of cyclopentadiene, trimers of cyclopentadiene, and a multi-ringed cyclomonoolefin structure derived from at least one NB unit, the structure including up to five fused rings; and, preferably, the CTA is present in an amount less than 10 mole %, preferably less than 5 mole %, relative to the first monomer.

It is a further specific object to enhance the yield of the addition polymer formed in the presence of a single or multicomponent component catalyst system irrespective of whether the polymerization is carried out in the absence or presence of a lower ($C_1$–$C_3$) alkylaluminoxane cocatalyst, by the simple expedient of using a halohydrocarbon solvent rather than a non-polar solvent, without regard to the transition metal used to form the organometal complex. In particular, when the transition complex in combination with an alkylaluminoxane cocatalyst in an amount effective to convert at least one NB-functional monomer with another NB-functional or monocyclic monomer polymerizable with NB, into an addition polymer, and the metal is selected from the group consisting of chromium, molybdenum, tungsten, cobalt, manganese, nickel, palladium and platinum, it is found that with the halohydrocarbon solvent the conversion of monomer(s) to polymer is at least 100% higher than when said reactants are polymerized in an essentially non-polar solvent. The amount of aluminoxane used is preferably from 50 to 500 equivalent of Al for each equivalent of transition metal in the catalyst.

It is an object of the present invention to produce a melt-processable NB-type polymer having a CTA terminal end and a $M_w$ in the range of 50,000 to 500,000.

It is another object of this invention to provide a method for appending a terminal olefinic end-group on a NB-type polymer.

These and other objects of the present invention are accomplished by polymerizing a norbornene-functional monomer in the presence of a single or multicomponent catalyst system containing a Group VIII transition metal ion source. The polymerization reaction can be carried out with or without a chain transfer agent having a terminal olefinic double bond between adjacent carbon atoms, excluding styrenes, vinyl ethers, and conjugated dienes, and at least one of said adjacent carbon atoms has two hydrogen atoms attached thereto.

The present invention is directed to addition polymers derived from NB-functional monomers wherein the chains of said polymer are terminated with an olefinic moiety derived from a chain transfer agent selected from a compound having a non-vinyl, non-vinyl ether terminal olefinic double bond between adjacent carbon atoms and at least one of said adjacent carbon atoms has two hydrogen atoms attached thereto, wherein the moiety derived from said chain transfer agent is exclusively located at the terminal end of said polymer chain. The chain transfer agents of this invention are exclusive of conjugated dienes.

The NB-type addition polymers of this invention are prepared from a single or multicomponent catalyst system comprising a Group VIII metal ion source. These catalyst systems are unique in that they catalyze the insertion of the chain transfer agents of this invention exclusively at a terminal end of the polymer chain. By exclusively located at a terminal end of the polymer chain does not exclude minimal amounts (less than 1 mole %, based on the total repeating units present in the polymer chain in addition to the terminal end-groups derived from the CTA) of the chain transfer agent being incorporated into the polymer chain.

The catalyst systems of our invention do not incorporate ethylene or any α-olefin having a non-styrenic or non-vinyl ether double bond into the polymer formed, except at the terminal ends thereof. As will presently be evident, the term "catalyst" is used because the function of said catalyst is that of both an initiator of a chain as well as that of its termination by inciting β-hydride elimination.

In combination with the catalyst systems used in this invention, a predetermined amount of an olefin with a terminal double bond, functions as an efficient chain transfer agent (CTA), and reliably produces higher mol wt polymers of predetermined weight average molecular weight $M_w$, in the range from about 500 to about 2,000,000 or more. By "olefin with a terminal double bond" we refer to an olefin which has a $CH_2$=$C(R')_2$ structure, wherein R' independently represents hydrogen, a hydrocarbyl group, or a group as defined hereinbelow. The terminal double bond is a non-styrenic, non-vinyl ether double bond. In other words, R' cannot represent an aromatic moiety such as phenyl or an —OR moiety wherein R is hydrocarbyl. The CTA of this invention also excludes conjugated diene compounds.

The $M_w$ range given above is determined relative to polystyrene by GPC (gel permeation chromatography).

A NB-type polymer with a $M_w$ which is controllable within a desired relatively narrow range, is produced by using a hydrocarbon with a terminal double bond, most preferably an α-olefin, as a CTA preferably in a minor amount relative to the cycloolefins being polymerized, and proportioned to provide the desired mol wt; the more olefin used, the lower the mol wt of the copolymer. The resulting cycloolefin (co)polymer has a characteristic terminal double bond which results from a β-hydride elimination reaction terminating a propagating chain.

When the olefin is ethylene in the polymerization of a NB-functional monomer, the ethylene ends up as vinyl end group. If the chain of addition-polymerized cycloolefin repeating units is not too long, the vinyl end group affords a polymerizable macromonomer or oligomer having from about 4 to 50, preferably from 4 to 30 and most preferably from 4 to 20 NB-type repeating units.

Thus, to make a polyNB macromonomer having a $M_w$ in the range from 500 to 3,000 (corresponding to from 4 to about 30 linked repeating units), one simply uses the calculated molar amount of olefin, based on the desired chain length, for the CTA. In an analogous manner, a polymer in the range from about 3,000 to 2,000,000, preferably from 3,000 to 1,000,000, more preferably 20,000 to 500,000, and most preferably from 50,000 to 500,000, is made by using a proportioned amount of olefin, and if desired, even higher mol wts. The ease with which either a macromonomer, or a melt-processable (co)polymer is made, is a function of the characteristics of the particular cycloolefin species being (co)polymerized.

This invention provides such polymers. For obvious reasons, crystalline NB polymers which do not melt and are insoluble in conventionally used solvents are unsuitable for such "forming" or "drawing" operations.

Most preferably, a polymer in the $M_w$ range from about 50,000 to 500,000 is produced which is readily processable with conventional thermoforming techniques, though tailored polymers with even higher $M_w$ are processable if a monomer is substituted with an alkyl, alkylene or alkylidene substituent. Which substituent is chosen, along with the number of carbon atoms (number of aliphatic carbon atoms) in the chosen substituent, determines the processability and toughness of the polymer.

The polymer produced can be thermoformed, extruded, injection molded, vacuum formed, compression molded, blow molded, press molded, cast from solution, solvent processed, fiber formed, and sintered, into various shapes and forms. End-use applications include automotive and transportation applications such as lighting, glazing, under hood components, body panels, bumpers, dash boards, and the like; medical applications such as fluid handling equipment, and the like; electrical and electronic applications such as computer housings, insulators, and the like; building and construction applications such as glazing, coatings, and the like; appliance panels and trim; consumer products such as housewares; microwave equipment; packaging; industrial parts and components; and optical components. Sheets, robes and other forms of arbitrary length and cross-section may also be formed by extruding the polymer. Because of the controllable mol wt of the polymer, such forms may be adapted for use as membrane means for the separation of gas from liquid, as in pervaporation membranes; or, in the separation of liquids having different molecular weights as in nanofiltration or reverse osmosis membranes.

The lower $M_w$ polymers (oligomers or macromonomers) of this invention can be used in waxes, additives, coatings, adhesives, sealants, and the like.

The common source of a processability problem with known addition cycloolefin (co)polymers having a repeating unit with a NB-type structure is that they are not melt-processable. The problem stems from an inability to control the growth of the polymer chains. This inability is endemic to all known polymerization systems for the addition polymerization of norbornene-functional monomers. Therefore, when the problem of forming a melt-processable polymer of a NB-functional cycloolefin monomer was addressed, neither the essential components of an appropriate catalyst nor its structure could be deduced from known catalysts used for the purpose at hand. This purpose is to produce homopolymers of a multi-ringed cycloolefin, or, a copolymer of first and second multi-ringed cycloolefins, or, a copolymer of a multi-ringed cycloolefin and another monocycloolefin. We have provided several catalyst systems specifically adapted for use in the addition coordination polymerization of homopolymers and copolymers of cycloolefins, effected in solution or in slurry.

In "solution", we refer not only to a polymerization in the classical sense where initiator, catalyst, reactants and reaction products are in solution, in a single phase, but also to polymerization in which a phase of microparticles smaller than 1 µm are present, which particles are so small, typically less than 0.1 µm, as to behave as a single phase. Such a two-phase reaction mass is referred to as a colloidal solution. In "slurry", we refer to polymerization in which (i) the presence of polymer is evidenced by a distinct separate phase which typically precipitates out of solution; or (ii) catalyst is anchored to an "active" support, irrespective of the phase in which the polymer is present. An "active" support is one which exhibits a distinct contribution with respect to the polymer formed, compared with an "inert" or "inactive" support such as silica which fails to exhibit such contribution.

BRIEF DESCRIPTION OF THE DRAWINGS

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF THE INVENTION

Figure 1:
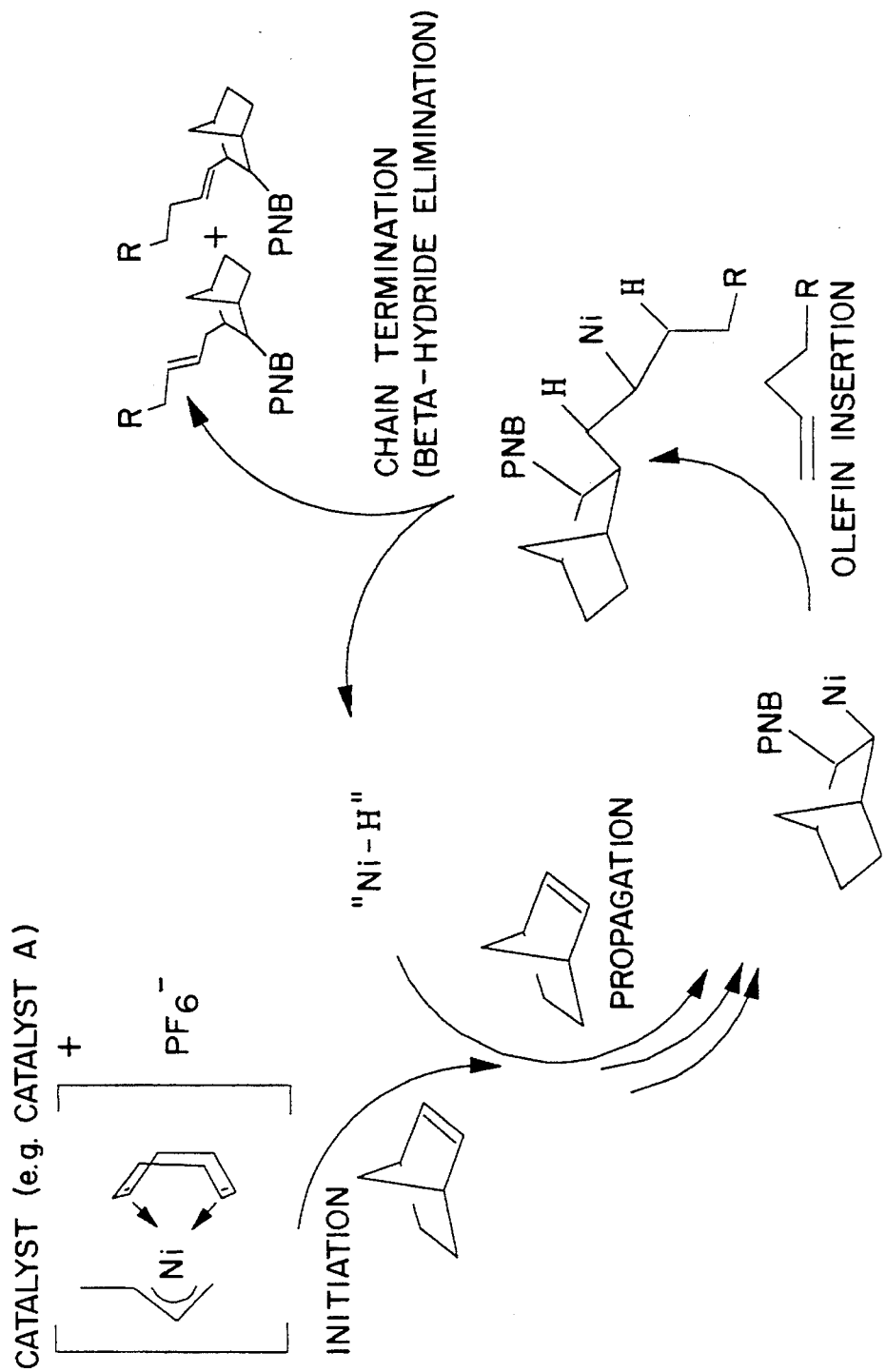
FIG. 1 is a schematic illustration depicting the manner in which a catalyst of this invention (Ni is illustrated) is believed to produce the copolymer.

In one embodiment of this invention, a novel, essentially anhydrous, reaction mixture of a NB-functional monomer and any pre-formed single component complex metal catalyst has been found to propagate polymer chains of controllable mol wt, provided the catalyst initiates a polymer chain by an insertion reaction of the monomer, and this occurs in the presence of a predetermined amount of a terminal olefinic chain transfer agent ("CTA"). This reaction mixture is remarkable because it does not require purified monomers; nor is the reaction mixture sensitive to the presence of organic impurities which are not highly reactive with the catalyst. This property is unlike that of catalysts containing an effective transition metal from "the other side" of the Periodic Table, specifically, such as zirconocene, hafnocene and titanocene catalysts. Under typical operating conditions, these "other side" catalysts are well known to be totally ineffective in the presence of even trace amounts of water as low as 10 ppm, and sensitive to a wide variety of reactive functions requiring uneconomic purification of monomers. By "essentially anhydrous" is meant that there is no more than 1% by weight of moisture present in the polymerization reaction mixture, and preferably less than 0.1%.

More specifically, the reaction mixture is most preferably a solution of a pre-formed, single-component ionic catalyst of nickel or palladium with a NB-functional monomer, in combination with a predetermined minor molar amount of an olefinic CTA relative to the moles of monomer in the mixture, in the absence of a cocatalyst such as an aluminoxane (e.g., MAO), or an aluminum alkyl (e.g., triethylaluminum, diethylaluminum, chloride, ethylaluminum dichloride, ethylaluminum sesquichloride, and the like), though other specific Group VIII transition metals ("M") produce some copolymers, but less effectively. The CTA is either ethylene or a compound having a terminal olefinic double bond between adjacent carbon atoms, excluding styrenes, vinyl ethers, and conjugated dienes, and at least one of said adjacent carbon atoms has two hydrogen atoms attached thereto.

The pre-formed single component organometal complex catalyst is represented by

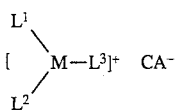  Structure I wherein,

M represents a Group VIII metal, preferably a metal selected from the group consisting of Ni and Pd;

$L^1$, $L^2$, and $L^3$ represent ligands, which separately, or, two, or all three together, provide up to three (3) π-bonds and a single metal-C σ-bond to M; and $L^1$, $L^2$, and $L^3$ may each be the same, or different, and when different, provide three individual ligands; or, two of the three ligands may be portions of an individual ligand; or, all three ligands may be portions of the same ligand; and, $CA^-$ represents a weakly coordinating counter anion chosen to solubilize the cation in an inert, that is, non-reactive, cosolvent for all reactants.

The phrase "compatible weakly coordinating anion" refers to an anion which is only weakly coordinated to the cation, thereby remaining sufficiently labile to be displaced by a neutral Lewis base. More specifically the phrase refers to an anion which when functioning as a stabilizing anion in the catalyst system of this invention does not transfer an anionic substituent or fragment thereof to the cation, thereby forming a neutral product. Compatible anions are anions which are not degraded to neutrality when the initially formed complex decomposes.

The reaction mixture most preferably consists of a single phase which may include a colloidal solution. Alternatively, the reaction may be effected in a heterogeneous system with a heterogeneous catalyst, illustrated in particular by one anchored to an "active" support such as aluminum fluoride to control the morphology of the polymer formed.

The single component catalyst consists essentially of (i) a cation of said organo "M" complex which most preferably consists of a single "M", preferably Ni or Pd atom, and (ii) a weakly coordinating counteranion; the cation has a hydrocarbyl group directly bound to "M" by a single metal-C σ bond, and also by at least one, but no more than three π-bonds. By hydrocarbyl is meant a group that is capable of stabilizing a Group VIII metal complex by providing a carbon-metal σ bond and at least one or more olefinic π bonds that may be conjugated or non-conjugated, or aromatic rings. Representative hydrocarbyl groups are ($C_3$–$C_{20}$) alkenyl groups which may be, non-cyclic monocyclic or polycyclic and can be substituted with branched and unbranched ($C_1$–$C_{20}$) alkoxy, ($C_6$–$C_{15}$) aryloxy or halo groups. Optionally, the cation is bound to a weakly coordinating neutral donating ligand by not more than two π-bonds or an aromatic ring. This complex cation most preferably consists essentially of (i) a single allyl ligand, or, a canonical form thereof, which provides a σ-bond and a π-bond; or, (ii) a compound providing at least one olefinic π-bond to the metal, and a σ-bond to the metal from a distal C-atom, spaced apart from either olefinic C-atom by at least two carbon-carbon single bonds. The weakly coordinating neutral ligand is preferably a chelating bidentate cyclo($C_6$–$C_{12}$)diolefin, for example cyclooctadiene ("COD") or dibenzoCOD, or an aromatic compound such as benzene, toluene, xylene, or mesitylene.

Embodiment (i) of the complex cation is illustrated by:

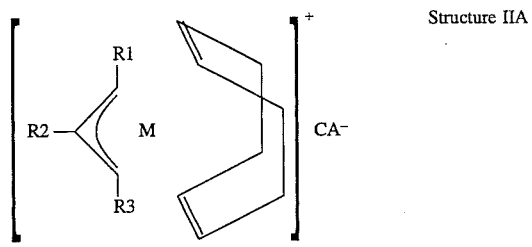  Structure IIA

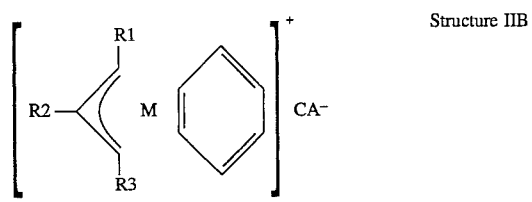  Structure IIB

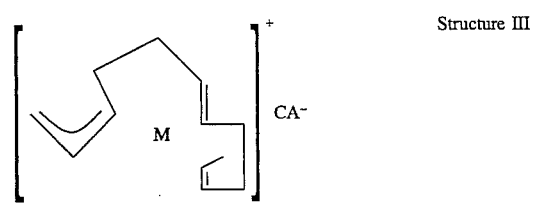  Structure III where $R^1$, $R^2$, $R^3$ are each independently a hydrogen atom, or an alkyl, aralkyl, or cycloalkyl group containing from 1 to 8 carbon atoms. Optionally, any two of $R^1$, $R^2$, $R^3$ may be linked together to form a cyclic ring structure. Embodiment (ii) of the complex cation is illustrated by:

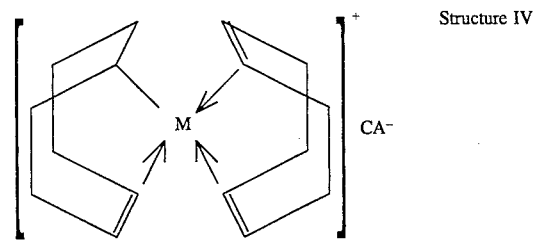  Structure IV

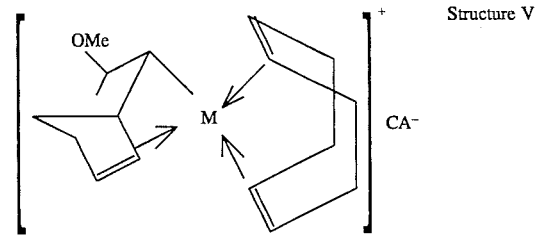  Structure V

It is a specific object of this invention to provide the above-described complex cation of "M" with a weakly coordinating or non-coordinating counteranion which is a relatively inert and poor nucleophile, which provides the cation with essential solubility in hydrocarbon and halohydrocarbon solvents such as toluene, xylene, and 1,2-dichloroethane. The anion is preferably selected from the group consisting of a tetrafluoride of Ga, Al, and B, or a hexafluoride of P, Sb and As, and a phenyl borate in which the phenyl ring has F or $CF_3$ substituents.

Such a preformed single-component complex may be formed in solution, in situ, and added to one or more monomers; or, the preformed single-component complex may be recovered from solution as a solid, then added to the monomer(s). In either form, whether as solution or as solid, the preformed single-component complex necessarily has a Group VIII metal in combination with a labile bidentate ligand.

In another embodiment of this invention, a reaction mixture of a NB-functional monomer and a multicomponent catalyst system comprising a Group VIII transition metal ion source, an organoaluminum compound, and an optional third component has been found to propagate polymer chains of controllable mol wt. also in the presence of a predetermined amount of the non-styrenic, non-vinyl ether chain transfer agent as described above. This is accomplished by the same insertion mechanism as described above for the single component catalyst systems.

The transition metal ion source is a Group VIII transition metal compound that is preferably soluble or made to be soluble in the reaction medium. The Group VIII transition metal is bonded to ionic and/or neutral ligands.

As used herein the term "organoaluminum compound" is non-inclusive of aluminoxane, however, an aluminoxane, e.g., MAO, can be employed when the reaction medium contains the CTA of the present invention or in the absence of a CTA so long as a halohydrocarbon diluent is employed..

In the description below, reference to the "π-allyl complex" refers equally to a canonical form thereof. The bidentate ligand in the complex M cation is labile and easily displaced from the π-allyl complex. Upon displacement by a NB-functional moiety providing a ligand, an insertion reaction occurs which results in an unexpectedly facile addition polymerization. This displacement and subsequent addition reaction occurs only when a NB-functional monomer is in the liquid phase, and the monomer is used in a much larger molar amount than the diolefin in the Ni-complex, typically in a molar excess of at least 1000:1. Despite the known stability of a bidentate ligand when bonded to "M", an insertion reaction of the monomer in the π-allyl complex results in the formation of a unique cationic transition metal propagating species. In addition to the well-defined single component catalyst system defined above, we also have found it possible to generate these cationic transition metal propagating species using a multicomponent catalyst system including a Group VIII transition ion source, an organoaluminum compound and, optionally, a third component.

In the absence of the CTA of the present invention in an appropriate amount chosen to provide polymer chains of desired average length, the propagating species results in a cycloolefin addition polymer having essentially no measurable unsaturation but an undesirably high mol wt. Besides the unique structure of the propagating species consisting of the "M-complex" in which a propagating monomer moiety is inserted, the species forms a polymer in which both its mol wt. and its glass transition temperature ($T_g$) are tailored to provide a weight average mol wt $M_w$>50,000 but preferably not greater than about 500,000. Lower mol wt polymers with $M_w$ in the range from about 20,000 to 50,000, and oligomers with $M_w$ in the range from about 500 to 20,000, may also be formed by carrying out the polymerization in the presence of a progressively larger amount of olefin CTA.

Referring to FIG. 1, there is schematically illustrated the manner in which an olefin is believed to function as an efficient CTA in the coordination polymerization, in a manner analogous to that in which chain transfer occurs via β-hydride elimination in a transition-metal-catalyzed vinyl-type polymerization (e.g., of ethylene or propylene). This mechanism proceeds via a growing poly(NB) chain which contains two β-hydrides, neither of which can be eliminated since one is located at a bridgehead and the other is situated "anti" or "trans" to the metal. The result is that, in the absence of a CTA, the molecular weight of the poly(NB) formed typically runs into the millions.

However, as soon as an α-olefin (in FIG. 1, 1-decene is illustrated, for which R=$C_6H_{13}$) inserts, the resulting metal alkyl can undergo β-hydride elimination, generating an olefin-terminated poly(NB) chain, and, a Group VIII metal hydride, i.e., a nickel hydride species in which a NB molecule inserts to initiate the next poly(NB) chain. The overall effect is a highly effective chain transfer process. In the absence of the chain transfer agents of this invention, the metal hydride cannot be formed for the purposes stated hereinabove.

Irrefutable evidence for the intermediacy of a Group VIII metal hydride species in the catalytic cycle for polymerizing norbornene in the presence of a CTA (ethylene, 250 psig) was found upon isolation and characterization of low molecular weight norbornene oligomers from a polymerization using [(crotyl)Ni(COD)]$PF_6$ as the catalyst. The methanol soluble fraction of the resulting polymer was subjected to GC-MS (gas chromatography-mass spectrometry). Two significant peaks were found in the GC trace which had a mass of 216 and 244, respectively. Using preparatory GC methods, the peaks were separated and isolated. Using one-dimensional and two-dimensional NMR techniques the compounds were determined to be dimers of norbornene with a vinyl and a hydrogen substituent (mass=216) and a vinyl and an ethyl substituent (mass=244) as shown below (the structures as drawn are not meant to favor one stereochemistry, meso or racemic, over another since this has yet to be determined).

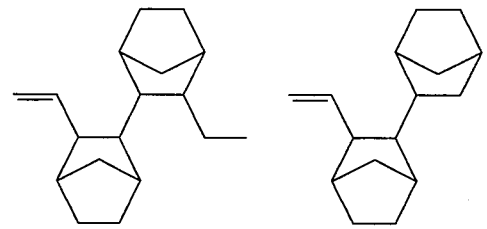

The isolation and characterization of these dimers can be taken as concrete evidence for the following mechanism:

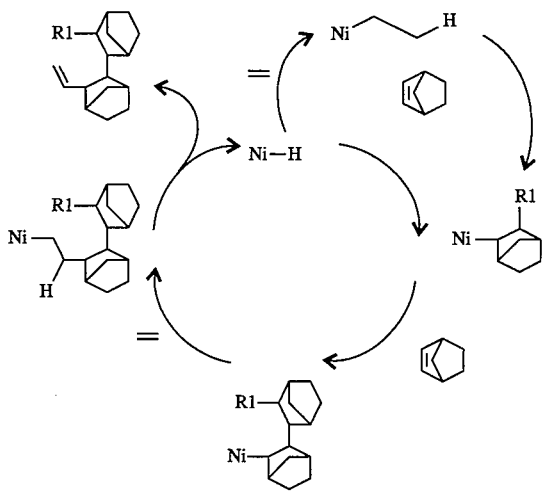

R1 = H or ethyl

In this mechanism, the nickel hydride catalytic intermediate inserts norbornene to give a nickel-norbornene moiety which cannot β-hydride eliminate for reasons mentioned previously. This moiety can insert an additional norbornene followed by ethylene at which time β-hydrogens are available for elimination and production of the dimer with mass=216 (the vinyl, hydrogen substituted norbornene dimer).

Under the conditions employed, insertion of ethylene into the nickel hydride catalytic intermediate is competitive with the first insertion of norbornene. Insertion of two subsequent norbornene units followed by ethylene and β-hydride elimination produces the dimer of mass=244 (the vinyl, ethyl substituted norbornene dimer).

Thus, the presence of an olefinic end-group in the norbornene polymer chain can be taken as proof of the intermediacy of a Group VIII metal hydride catalytic species.

Figure 2:
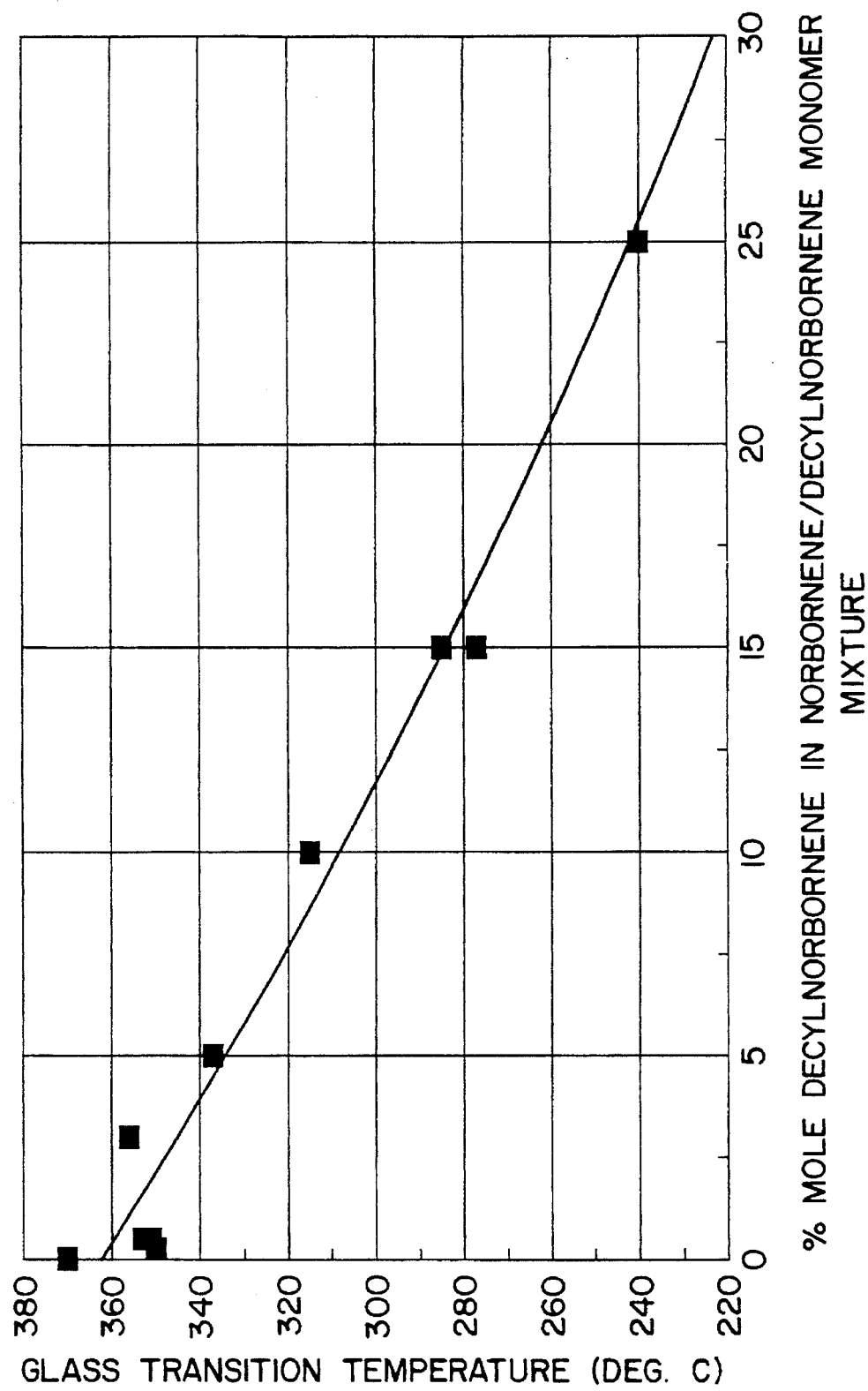
FIG. 2 is a graph depicting the effect of the concentration of 5-decylnorbornene on the $T_g$ of a copolymer of norbornene and 5-decylnorbornene.

Referring to FIG. 2, it is evident that the $T_g$ of the copolymer formed is a function of the concentration of the 5-decylNB in the mixture of monomers, the greater the concentration of 5-decylNB, the lower the $T_g$ of the copolymer.

Figure 3:
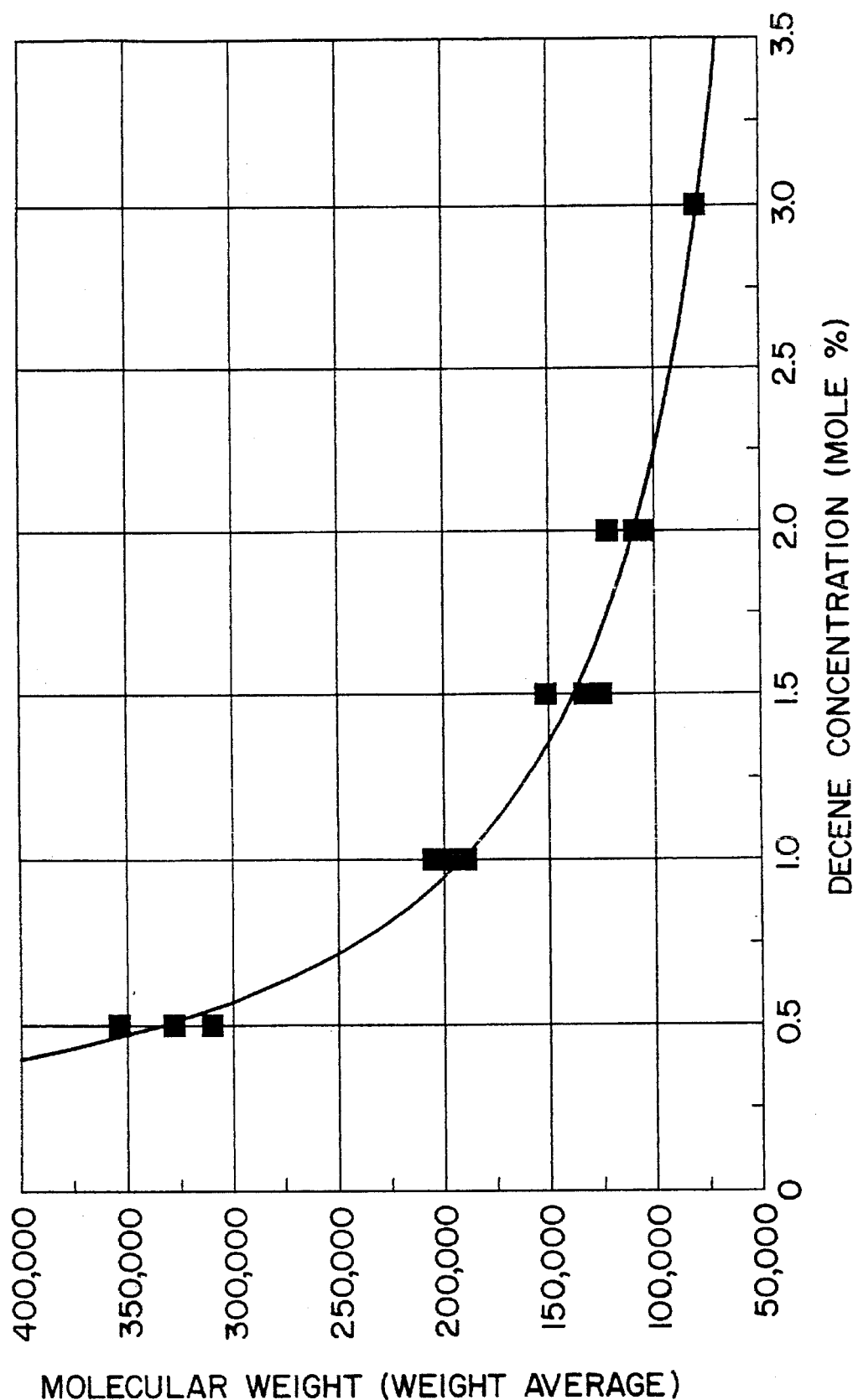
FIG. 3 is a graph depicting the effect of 1-decene concentration on the weight average molecular weight of poly(norbornene) formed.

Referring now to FIG. 3, the efficacy of the α-olefin as a CTA is evidenced by the relatively low concentration<10 mole %, typically from 0.25–5 mole %, of α-olefin necessary to provide the desired molecular weight. Relying on the mechanism illustrated, a calculated amount of olefin affords a polymer of desired molecular weight which is reproducibly tailored for a particular purpose. Without the knowledge that the α-olefin would function as described, such an accurately tailored coordination addition polymer of cycloolefins could not have been reproducibly produced by modifying any known prior art process.

In the single component catalytic system embodiment of this invention where the Group VIII metal M represents Ni, the organometallic Ni cation has a formal coordination number of 4 but an oxidation state of 2. The surprising effect of the anion which is both relatively inert, and a relatively poor nucleophile, not only accounts for the solubility of the Ni-complex in halohydrocarbons (e.g., 1,2-dichloroethane) and aromatic solvents (e.g., toluene and xylene), but also appears to favor the rapid displacement of the bidentate ligand and formation of an addition polymer in a chosen, desirable relatively narrow mol wt range, e.g., from 200,000 to 300,000 in the presence of the CTA of the present invention.

The key to proper anion design requires that it be labile and stable toward reactions with the cationic metal complex in the final catalyst species and that it renders the single component catalyst soluble in the hydrocarbon or halohydrocarbon solvents of this invention. The anions which are stable toward reactions with water or Brønsted acids, and which do not have acidic protons located on the exterior of the anion (i.e., anionic complexes which do not react with strong acids or bases) possess the stability necessary to qualify as a stable anion for the catalyst system. The properties of the anion which are important for maximum lability include overall size, and shape (i.e., large radius of curvature), and nucleophilicity.

In general, a suitable anion may be any stable anion which allows the catalyst to be dissolved in a solvent of choice, and has the following attributes: (1) the anion should form stable salts with the aforementioned Lewis acid, Brønsted acids, reducible Lewis Acids, protonated Lewis bases, thallium and silver cations; (2) the negative charge on the anion should be delocalized over the framework of the anion or be localized within the core of the anion; (3) the anion should be a relatively poor nucleophile; and (4) the anion should not be a powerful reducing or oxidizing agent.

Examples of anions meeting the foregoing criteria are the following: $BF_4^-$; $PF_6^-$; $AlF_3O_3SCF_3^-$; $SbF_6^-$; $B[C_6H_3(CF_3)_2]_4^-$; $SbF_5SO_3F^-$; and $B[C_6F_5]_4^-$.

A preferred pre-formed, single catalytic component is formed by protonating a known tris- or tetrakisolefinnickel compound (see P. W. Jolly and G. Wilke, Vol I supra, pgs 252 and 338) and this protonated compound does not have to be separated from solution before being added to NB-functional monomer(s) to be polymerized. A convenient proton source to convert the tris- or tetrakisolefinnickel is N,N-dimethylanilinium tetrakis(bis-3,5-trifluoromethyl)phenylborate. The precursor is most preferably chosen from (i) (t,t,t-1,5,9-cyclododecatriene)nickel or bis(cyclooctadiene)nickel; and, (ii) the reaction product of one of the foregoing with butadiene, which reaction products are represented by structure below:

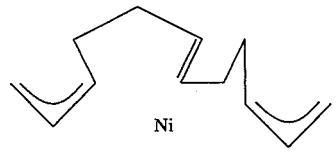

A preferred active species containing Ni is a pre-formed, single catalytic component consisting of the combination of the π-allyl-Ni-diolefin cation, for example, the π-allyl-Ni-cyclo-1,5-octadiene cation, referred to as a "[allyl-Ni-COD]⁺ complex", with a compatible weakly coordinating counteranion for the complex. There is no cocatalyst required and none is used. However, the use of an alkylaluminum compound as a cocatalyst can be advantageous in circumstances where the reagents are unusually high in protic impurities. For example, water present in the monomer can be scavenged by the alkylaluminum compound.

The catalyst may be prepared by any known synthesis which results in combining a $[\pi\text{-}(C_6\text{–}C_{12})\text{cycloalkadienyl}]M$ complex containing two ligands each of which react with an acidic hydrogen atom (i.e., proton); and, a salt which will provide both solubility in a commercially easily available and environmentally acceptable solvent, as well as a compatible weakly coordinating counteranion for the complex which provides the cation.

In this combination, it is preferred to use an anion of a Group IIIA tetrafluoride, e.g., $BF_4^-$; or a Group VA hexafluoride, e.g., $PF_6^-$ anion; or a phenylborate having plural fluoro or trifluoromethyl ring substitutions; or an arylborate having plural fluoromethyl substituents. Such anions provide desired solubility and are compatible with and noncoordinating toward the Ni-complex cation formed. Yet such anions effectively stabilize the cation without adversely affecting its ability to polymerize NB-functional monomers.

The specific catalyst: allyl-Ni-COD/weakly coordinating anion is preformed by first forming a neutral $Ni[COD]_2$ complex, reacting the complex with an allylbromide to generate a bis(allylNi bromide) complex which is then subjected to scission with a halide abstracting agent and an anion-providing salt such as thallium hexafluorophosphate or silver hexafluoroantimonate. The sequence is written as follows:

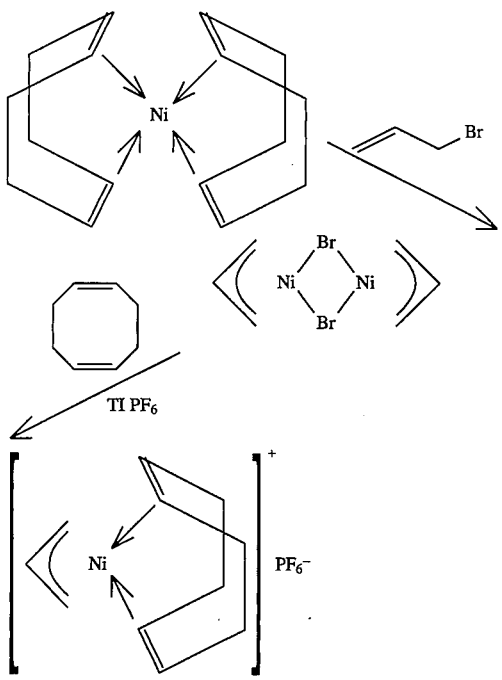

When partitioned, only one COD ligand remains, and it is bonded through two π bonds to the nickel.

The multicomponent catalyst system embodiment of the present invention comprises a Group VIII transition metal source, an organoaluminum compound, and an optional third component.

The Group VIII transition metal source is selected from a compound containing at least one transition metal selected from Group VIII of the Periodic Table. There are no restrictions on the transition metal compound so long as it provides a source of catalytically active Group VIII transition metal ions. Preferably, the Group VIII transition metal compound is soluble or can be made to be soluble in the reaction medium. The Group VIII transition metal preferably is selected from iron, cobalt, nickel, rhodium, ruthenium, palladium and platinum. Of these, nickel, palladium and cobalt are particularly preferred.

The Group VIII transition metal compound comprises ionic and/or neutral ligand(s) bonded to the Group VIII transition metal. The ionic and neutral ligands can be selected from a variety of monodentate, bidentate, or multidentate moieties and combinations thereof.

Representative of the ionic ligands that can be bonded to the Group VIII transition metal to form the transition metal compound are anionic ligands selected from the halides such as chloride, bromide, iodide or fluoride ions; pseudohalides such as cyanide, cyanate, thiocyanate, hydride; carbanions such as branched and unbranched ($C_1$–$C_{40}$) alkylanions, phenyl anion; cyclopentadienylide anions; π-allyl groupings; enolates of β-dicarbonyl compounds such as acetylacetonoate, 2,4-pentanedionate and halogenated acetylacetonoates such as 1,1,1,5,5,5-hexafluoro-2,4-pentanedionate, 1,1,1-trifluoro- 2,4,pentanedionate; anions of acidic oxides of carbon such as carboxylates and halogenated carboxylates (e.g., acetates, 2-ethylhexanoate, neodecanoate, trifluoroacetate, etc.) and oxides of nitrogen (e.g., nitrates, nitrites, etc.)of bismuth (e.g., bismuthate, etc.), of aluminum (e.g., aluminates, etc.), of silicon (e.g., silicate, etc.), of phosphorous (e.g., phosphates, phosphites, phosphines, etc.) of sulfur (e.g., sulfates such as triflate, p-toluene sulfonate, sulfites, etc.); ylides; amides; imides; oxides; phosphides; sulfides; ($C_6$–$C_{24}$) aryloxides, ($C_1$–$C_{20}$) alkoxides, hydroxide, hydroxy ($C_1$–$C_{20}$) alkyl; catechols; oxylate; chelating alkoxides and aryloxides; complex anions such as $PF_6^-$, $AlF_3O_3SCF_3^-$, $SbF_6^-$ and compounds represented by the formulae:

$$Al(R^7)_4^-, B(X)_4^-$$

wherein $R^7$ and X independently represent a halogen atom selected from Cl, F, I, and Br, or a substituted or unsubstituted hydrocarbyl group. Representative of hydrocarbyl are ($C_1$–$C_{25}$) alkyl such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonodecyl, eicosyl, heneicosyl, docosyl, tricosyl, tetracosyl, pentacosyl, and isomeric forms thereof; ($C_2$–$C_{25}$) alkenyl such as vinyl, allyl, crotyl, butenyl, pentenyl, hexenyl, octenyl, nonenyl, decenyl, undecenyl, dodecenyl, tridecenyl, tetradecenyl pentadecenyl, hexadecenyl, heptadecenyl, octadecenyl, nonadecenyl, pentacosenyl, and isomeric forms thereof. ($C_6$–$C_{25}$) aryl such as phenyl, tolyl, xylyl, naphthyl, and the like; ($C_7$–$C_{25}$) aralkyl such as benzyl, phenethyl, phenpropyl, phenbutyl, phenhexyl, napthoctyl, and the like; ($C_3$–$C_8$) cycloalkyl such as cyclopropyl, cyclobutyl, cyclopentyl, cyclohexyl, cycloheptyl, cyclooctyl, 2-norbornyl, 2-norbonenyl, and the like. In addition to the above definitions X represents the radical:

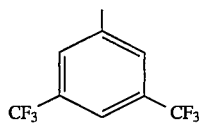

The term substituted hydrocarbyl means the hydrocarbyl group as previously defined wherein one or more hydrogen atoms have been replaced with a halogen atom such as Cl, F, Br, and I (e.g., as in the perfluorophenyl radical); hydroxyl; amino; alkyl; nitro; mercapto, and the like.

The ionic ligand also can be chosen from cations such as, for example, organoammonium, organoarsonium, organophosphonium, and pyridinium compounds represented by the formulae:

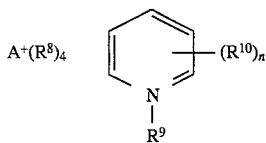

wherein A represents nitrogen, arsenic, and phosphorous and the $R^8$ radicals can be independently selected from hydrogen, branched or unbranched ($C_1$–$C_{20}$) alkyl, branched or unbranched ($C_2$–$C_{20}$) alkenyl, and ($C_5$–$C_{16}$) cycloalkyl, e.g., cyclopentyl, cyclohexyl, cycloheptyl, cyclooctyl, and the like. $R^9$ and $R^{10}$ are independently selected from hydrogen, branched and unbranched ($C_1$–$C_{50}$) alkyl, branched and unbranched ($C_2$–$C_{50}$) alkenyl and ($C_5$–$C_{16}$) cycloalkyl groups as defined above; and n is 1 to 5, preferably n is 3, most preferably n=1. The $R^{10}$ radicals preferably are attached to positions 3, 4, and 5 on the pyridine ring.

It should be noted that increasing the sum of the carbon atoms contained in the $R^8$ radicals confers better solubility of the transition metal compound in organic media such as organic solvents and NB-functional monomer. Preferably, the $R^8$ radicals are selected from ($C_1$–$C_{18}$) alkyl groups wherein the sum of carbon atoms for all $R^8$ radicals is 15 to 72, preferably 25 to 48, more preferably 21 to 42. The $R^9$ radical is preferably selected from branched and unbranched ($C_1$–$C_{50}$) alkyl, more preferably ($C_{10}$–$C_{40}$) alkyl. $R^{10}$ is preferably selected from branched and unbranched ($C_1$–$C_{40}$) alkyl, more preferably ($C_2$–$C_{30}$) alkyl.

Specific examples of organoammonium cations include tridodecylammonium, methyltricaprylammonium, tris(tridecyl)ammonium and trioctylammonium. Specific examples of organoarsonium and organophosphonium cations include tridodecylarsonium and phosphonium, methyltricaprylarsonium and phosphonium, tris(tridecyl)arsonium and phosphonium, and trioctylarsonium and phosphonium. Specific pyridinium cations include eicosyl-4-(1-butylpentyl)pyridinium, docosyl-4-(13-pentacosyl)pyridinium, and eicosyl-4-(1-butylpentyl)pyridinium.

Suitable neutral ligands which can be bonded to the Group VIII transition metal are the olefins; the acetylenes; carbon monoxide; nitric oxide, nitrogen compounds such as ammonia, isocyanide, isocyanate, isothiocyanate; pyridines and pyridine derivatives (e.g., 1,10-phenanthroline, 2,2'-dipyridyl), 1,4-dialkyl-1,3-diazabutadiene, amines such as represented by the formulae:

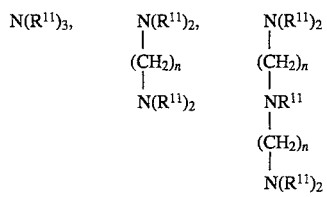

wherein $R^{11}$ is independently hydrocarbyl or substituted hydrocarbyl as previously defined and n is 2 to 10. Ureas; nitriles such as acetonitrile, benzonitrile and halogenated derivatives thereof; organic ethers such as dimethyl ether of diethylene glycol, dioxane, tetrahydrofuran, furan diallyl ether, diethyl ether, cyclic ethers such as diethylene glycol cyclic oligomers; organic sulfides such as diethyl sulfide; thioethers; arsines; stibines; phosphines such as triarylphosphines (e.g., triphenylphosphine), trialkylphosphines (e.g., trimethyl, triethyl, tripropyl, tripentacosyl, and halogenated derivatives thereof), bis(diphenylphosphino)ethane, bis(diphenylphosphino)propane, bis(dimethylphosphino)propane, bis(diphenylphosphino)butane, (S)-(–)2,2'-bis(diphenylphosphino)-1,1'-binaphthyl, (R)-(+)-2,2'-bis(diphenylphosphino)-1,1'-binaphthyl, and bis(2-diphenylphosphinoethyl)phenylphosphine; phosphine oxides, phosphorus halides; phosphites represented by the formula:

$$P(OR^{11})_3$$

wherein $R^{11}$ independently represents a hydrocarbyl or substituted hydrocarbyl as previously defined; phosphorus oxyhalides; phosphonates; phosphonites, phosphinites, ketones; sulfoxides such as ($C_1$–$C_{20}$) alkylsulfoxides; ($C_6$–$C_{20}$) arylsulfoxides, ($C_7$–$C_{40}$)alkarylsulfoxides, and the like. It should be recognized that the foregoing neutral ligands can be utilized as optional third components as will be described hereinbelow.

More specifically, the Group VIII transition metal source of the present invention can be represented by the following formula:

$$C^{c'}_c[M^{m'}_m X^{x'}_x Y^{y'}_y L_l]$$

wherein

C represents a cation as previously described;

M represents a Group VIII transition metal selected from the group of iron, cobalt, nickel, ruthenium, palladium, and platinum. Preferably M is nickel, cobalt or palladium;

X and Y independently represent anionic ligands as previously described;

L represents neutral ligands as previously described;

x, y, and l are 0 to 15 with the proviso that x, y, and l cannot all be zero at the same time;

c is 0, 1, 2, or 3;

c' is the charge of C m is 1 to 4 m' is the oxidation state of the Group VIII transition metal M which is determined by the equation=

$$\frac{(xx' + yy') - cc'}{m} ;$$

x' is the absolute value of the charge of X;

y' is the absolute value of the charge of Y;

Examples of Group VIII transition metal compounds suitable as the transition metal ion source include:

nickel acetylacetonates
nickel carboxylates
nickel dimethylglyoxime
nickel ethylhexanoate
cobalt neodecanoate
iron napthenate
palladium ethylhexanoate
$NiCl_2(PPh_3)_2$
$NiCl_2(PPh_2CH_2)_2$
nickel (II) hexafluoroacetylacetonate tetrahydrate
nickel (II) trifluoroacetylacetonate dihydrate
nickel (II) acetylacetonate tetrahydrate
trans-Pd $Cl_2(PPh_3)_2$
palladium (II) bis(trifluoroacetate)
palladium (II) bis(acetylacetonate)

palladium (II) 2-ethylhexanoate
Pd(acetate)$_2$(PPh$_3$)$_2$
palladium (II) bromide
palladium (II) chloride
palladium (II) iodide
palladium (II) oxide
monoacetonitriyletris(triphenylphosphine) palladium (II) tetrafluoroborate
tetrakis(acetonitrile) palladium (II) tetrafluoroborate
dichlorobis(acetonitrile) palladium (II)
dichlorobis(triphenylphosphine) palladium (II)
dichlorobis(benzonitrile) palladium (II)
iron (II) chloride
iron (III) chloride
iron (II) bromide
iron (III) bromide
iron (II) acetate
iron (III) acetylacetonate
ferrocene
nickelocene
nickel (II) acetate
nickel bromide
nickel chloride
dichlorohexyl nickel acetate
nickel lactate
nickel oxide
nickel tetrafluoroborate
cobalt (II) acetate
cobalt (II) acetylacetonate
cobalt (III) acetylacetonate
cobalt (II) benzoate
cobalt chloride
cobalt bromide
dichlorohexyl cobalt acetates
cobalt (II) stearate
cobalt (II) tetrafluoroborate
bis(allyl)nickel
bis(cyclopentadienyl)nickel
palladium acetylacetonate
palladium bis(acetonitrile)dichloride
palladium bis(dimethylsulfoxide)dichloride
platinum bis(triethylphosphine)hydrobromide
ruthenium tris(triphenylphosphine)dichloride
ruthenium tris(triphenylphosphine)hydrido chloride
ruthenium trichloride
ruthenium tetrakis(acetonitrile)dichloride
ruthenium tetrakis(dimethylsulfoxide)dichloride
rhodium chloride
rhodium tris(triphenylphosphine) trichloride The organoaluminum component of the catalyst system of the present invention is represented by the formula:

wherein $R^{12}$ independently represents branched and unbranched (C$_1$–C$_{20}$) alkyl, (C$_6$–C$_{24}$) aryl, (C$_7$–C$_{20}$) aralkyl, (C$_3$–C$_{10}$) cycloalkyl; Q is a halide or pseudohalide selected from chlorine, fluorine, bromine, iodine, branched and unbranched (C$_1$–C$_{20}$) alkoxy, (C$_6$–C$_{24}$) aryloxy; and x is 0 to 2.5, preferably 0 to 2.

Representative organoaluminum compounds include trialkylaluminums such as trimethylaluminum, triethylaluminum, tripropylaluminum, triisopropylaluminum, triisobutylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum, trioctylaluminum, tris-2-norbornylaluminum, and the like.

Dialkylaluminum halides such as dimethylaluminum chloride, diethylaluminum chloride, diisopropylaluminum chloride, diisobutylaluminum chloride, and the like.

Monoalkylaluminum dihalides such as methylaluminum dichloride, ethylaluminum dichloride, ethylaluminum diiodide, propylaluminum dichloride, isopropylaluminum dichloride, butylaluminum dichloride, isobutylaluminum dichloride, and the like.

Alkylaluminum sesquihalides such as methylaluminum sesquichloride, ethylaluminum sesquichloride, propylaluminum sesquichloride, isobutylaluminum sesquichloride, and the like.

In the practice of the present invention, the catalytic system obtained from the Group VIII transition metal source and the organoaluminum component can be effectively used, however, if desired, the catalyst system employed can optionally contain a third component or third components.

Examples of such third components are Lewis acids such as the BF$_3$·etherate, TiCl$_4$, SbF$_5$, tris(perfluorophenyl)boron, BCl$_3$, B(OCH$_2$CH$_3$)$_3$; strong Brønsted acids such as hexafluoroantimonic acid (HSbF$_6$), HPF$_6$ hydrate, trifluoroacetic acid (CF$_3$CO$_2$H), and FSO$_3$H·SbF$_5$, H$_2$C(SO$_2$CF$_3$)$_2$ CF$_3$SO$_3$H, and paratoluenesulfonic acid; halogenated compounds such as hexachloroacetone, hexafluoroacetone, 3-butenoic acid-2,2,3,4,4-pentachlorobutylester, hexafluoroglutaric acid, hexafluoroisopropanol, and chloranil, i.e.,

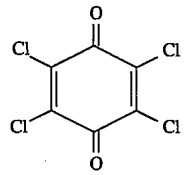

electron donors such as phosphines and phosphites and olefinic electron donors selected from (C$_4$–C$_{12}$) aliphatic and (C$_6$–C$_{12}$) cycloaliphatic diolefins, such as butadiene, cyclooctadiene, and norbornadiene.

Acidity of strong Brønsted acids can be gauged by determining their Hammet acidity function $H_0$. A definition of the Hammer acidity function is found in *Advanced Inorganic Chemistry* by F. A. Cotton and G. Wilkinson, Wiley-Interscience, 1988, p. 107.

As set above the neutral ligands can be employed as optional third components as electron donating compounds.

In one embodiment the multicomponent catalyst system can be prepared by a process which comprises mixing the catalyst components, i.e., the Group VIII transition metal compound, the organoaluminum compound, and third component (if employed), together in a hydrocarbon or halohydrocarbon solvent and then mixing the premixed catalyst system in the reaction medium comprising at least one norbornene-functional monomer. Alternatively, (assuming the optional third component is utilized), any two of the catalyst system components can be premixed in a hydrocarbon or halohydrocarbon solvent and then introduced into the reaction medium. The remaining catalyst component can be added to the reaction medium before or after the addition of the premixed components.

In another embodiment, the catalyst system can be prepared in situ by mixing together all of the catalyst components in the reaction medium. The order of addition is not important.

The reactions of the present invention are carried out in an organic solvent which does not adversely interfere with the catalyst system and is a solvent for the monomer. Examples of organic solvents are aliphatic (non-polar) hydrocarbons such as pentane, hexane, heptane, octane and decane; alicyclic hydrocarbons such as cyclopentane and cyclohexane; aromatic hydrocarbons such as benzene, toluene, and xylene; halogenated (polar)hydrocarbons such as methylene chloride, ethyl chloride, 1,1-dichloroethane, 1,2-dichloroethane, 1,2-dichloroethylene, 1-chloropropane, 2-chloropropane, 1-chlorobutane, 2-chlorobutane, 1-chloro-2-methylpropane, 1-chloropentane, chlorobenzene, o-dichlorobenzene, m-dichlorobenzene, and p-dichlorobenzene.

The choice of reaction solvent is made on the basis of a number of factors including the choice of catalyst and whether it is desired to run the polymerization as a slurry or solution process. For most of the catalysts described in this invention, the preferred solvents are chlorinated hydrocarbons such as methylene chloride and 1,2-dichloroethane with simple hydrocarbons being less preferred due to the resulting lower conversion of the norbornene monomer(s). Surprisingly the inventors have discovered that certain of the catalyst systems, most notably catalysts based on Group VIII metal compounds and alkylaluminum halides, specifically, monoalkylaluminum dihalides, (e.g., ethylaluminum dichloride), also give excellent results (and high monomer conversion) when run in simple hydrocarbons such as heptane and cyclohexane.

The solubility of the polynorbornenes described in this application is highly dependent on the catalyst employed; for example, nickel-based catalysts afford polymers soluble in simple hydrocarbons while palladium-based catalysts typically afford essentially insoluble polymers (soluble only in hot o-dichlorobenzene). All of the norbornene-based polymers are insoluble in 1,2-dichloroethane or dichloromethane at ambient temperature, making these ideal diluents for slurry polymerization processes (i.e., polymerizations in which the polymer is formed as a precipitate) regardless of the choice of catalyst type. Using o-dichlorobenzene or hydrocarbons such as cyclohexane, heptane or toluene in combination with suitable nickel-based catalysts results in the solution polymerization of norbornenes (i.e., polymerizations in which the polymer is formed as a solution).

The molar ratio of total monomer to Group VIII transition metal for the single and multicomponent catalysts can run from 1,000:1 to 100,000:1, preferably 1,000:1 to 20,000:1, and most preferably 3,000:1 to 10,000:1.

In the multicomponent catalyst systems, aluminum metal to Group VIII transition metal molar ratio ranges from less than or equal to 100:1, preferably less than or equal to 30:1, and most preferably less than or equal to 20:1.

The optional third component is employed in a molar ratio to Group VIII transition metal ranging from 0.25:1 to 20:1. When acids are employed as third components, the acid to Group VIII transition metal range is less than or equal to 4:1, preferably less than or equal to 2:1.

The temperature at which the polymerization reactions of the present invention are carried out typically ranges from −100° C. to 120° C., preferably −40° C. to 90° C.

The optimum temperature for the present invention is dependent on a number of variables, primarily the choice of catalyst and the choice of reaction diluent. Thus, for any given polymerization the optimum temperature will be experimentally determined taking these variables into account. To exemplify such an optimization process, we have discovered that (when using a s multicomponent catalyst made by reacting nickel ethylhexanoate with hexafluoroantimonic acid, followed by boron trifluoride etherate and triethylaluminum) even though catalyst activity is extremely high over a wide range of temperature in both dichloromethane and 1,2-dichloroethane there exists an optimum in temperature if a freely stirring slurry is desired. In the case of dichloromethane the optimum temperature is 10° C. to 20° C. while in the case of 1,2-dichloroethane the optimum temperature is 30° C. to 40° C. Operating below this optimum tends to result in a slush or cake which, while still resulting in very high monomer conversion with control of molecular weight, is less desirable to process in most commercial hardware. Operating above the optimum temperature, while still giving a very high polymer yield with controlled molecular weight, results in particle agglomeration or even a fused mass. When running a continuous process it is desirable to operate within this temperature window; when operating a batch process it is preferred to initiate the polymerization below these temperatures and allow the exotherm to raise the process temperature to within the optimum range.

Other solvents and other catalysts each have their own preferred temperature ranges depending on the criteria against which the polymerization performance (e.g., conversion, rate, etc.) and parameters (e.g., ease of stirring a slurry, solution viscosity, heat removal, etc.) are being measured.

To control the explosive speed of the polymerization reactions carried out with the single or multicomponent catalyst systems of this invention, a suitable monomer to catalyst molar ratio is selected, the reactor can be cooled to slow down the reaction, and the reaction can be carried out in a high boiling solvent. By high boiling solvent is meant that the solvent has a boiling point above the polymerization temperature. If a pressure reaction vessel is employed to contain the polymerization reaction, the foregoing considerations do not have to be taken into account.

In one embodiment of the multicomponent catalyst system of the present invention, a typical catalyst system comprises a Group VIII transition metal salt, e.g., nickel ethylhexanoate, an organoaluminum compound, e.g., triethylaluminum, and a mixture of optional third components, e.g., BF$_3$•etherate and hexafluoroantimonic acid (HSbF$_6$), in a preferred molar ratio of Al/BF3•etherate/Ni/acid of 10/9/1/0.5–2. The reaction sequence is written as follows:

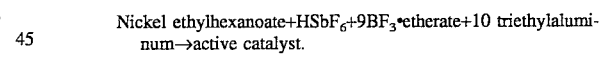

Nickel ethylhexanoate+HSbF$_6$+9BF$_3$•etherate+10 triethylaluminum→active catalyst.

In another embodiment of the multicomponent catalyst system of the invention the optional third component is a halogenated compound selected from various halogenated activators. A typical catalyst system comprises a Group VIII transition metal salt, an organoaluminum, and the third component halogenated compound shown in the reaction sequence written below:

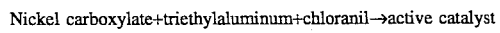

Nickel carboxylate+triethylaluminum+chloranil→active catalyst

In still another embodiment of the multicomponent catalyst system of this invention no third component is present. The catalyst system comprises a Group VIII metal salt and a monoalkylaluminum dihalide component run in a hydrocarbon or halohydrocarbon solvent as shown in the reaction sequence below:

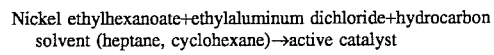

Nickel ethylhexanoate+ethylaluminum dichloride+hydrocarbon solvent (heptane, cyclohexane)→active catalyst By norbornene-functional or NB-functional is meant that the monomer is characterized by containing at least one norbornene-functional group in its structure including norbornadiene as identified by the formulae below which can be substituted or unsubstituted:

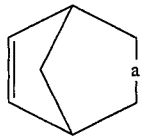   VI wherein "a" represents a single or double bond.

Representative monomers are identified by formulae VII and VIII as follows:

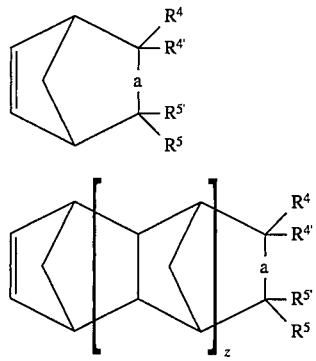

wherein $R^4$, $R^{4'}$ $R^5$, and $R^{5'}$ independently represent hydrogen, halogen, branched and unbranched ($C_1$–$C_{20}$) alkyl, branched and unbranched ($C_1$–$C_{20}$) haloalkyl, substituted and unsubstituted ($C_5$–$C_{12}$) cycloalkyl, ($C_1$–$C_6$) alkylidenyl, ($C_6$–$C_{40}$) aryl, ($C_6$–$C_{40}$) haloaryl, ($C_7$–$C_{15}$) aralkyl, ($C_7$–$C_{15}$) haloaralkyl, ($C_3$–$C_{20}$) alkynyl, branched and unbranched ($C_3$–$C_{20}$) alkenyl, provided the alkenyl radical does not contain a terminal double bond, that is the double bond in the radical is an internal olefinic bond, or vinyl; $R^4$ and $R^5$ when taken with the two ring carbon atoms to which they are attached can represent saturated and unsaturated cyclic groups containing 4 to 12 carbon atoms or an aromatic ring containing 6 to 17 carbon atoms; "a" represents a single or double bond, and Z is 1 to 5. It should be noted that when $R^4$, $R^{4'}$ $R^5$, and $R^{5'}$ represent an alkylidene radical the carbon atom to which the alkylidene radical is connected does not have another substituent, and when "a" is a double bond $R^4$, $R^{4'}$ $R^5$, and $R^{5'}$ cannot be alkylidenyl.

Examples of norbornene-functional monomers include norbornadiene, 2-norbornene, 5-methyl-2-norbornene, 5-hexyl-2-norbornene, 5-ethylidenyl-2-norbornene, vinylnorbornene, dicyclopentadiene, dihydrodicyclopentadiene, tetracyclododecene, methyltetracyclododecene, tetracyclododecadiene, dimethyltetracyclododecene, ethyltetracyclododecene, ethylidenyl tetracyclododecene, phenyltetracyclodecene, trimers of cyclopentadiene (e.g., symmetrical and asymmetrical trimers) and halogenated norbornadiene and norbornene-functional monomers wherein $R^4$, $R^{4'}$ $R^5$, and $R^{5'}$ independently represent hydrogen, halogen (e.g., Cl, F, I, Br) and fully halogenated alkyl groups of the formula $C_nF_{2n+1}$ wherein n represents the number of carbon atoms from 1 to 20. Representative substituents are trifluoromethyl, $—C_4F_9$, $—C_{10}F_{21}$, and $—C_{20}F_{41}$.

The halogenated norbornene-functional monomers can be synthesized via the Diels-Alder reaction of cyclopentadiene with the appropriate halogenated dieneophile as shown in the following reaction schemes:

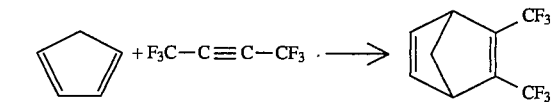

wherein $R^6$ independently represents hydrogen or F and n is 1 to 20.

The chain transfer agent or CTA is selected from a compound having a non-styrenic, non-vinyl ether terminal carbon-carbon double bond wherein at least one of said carbon atoms in said carbon-carbon double bond has two hydrogen atoms attached thereto, said chain transfer agent excludes conjugated dienes. By non-styrenic, non-vinyl ether is meant that compounds having the following structures are excluded from the chain transfer agents of this invention:

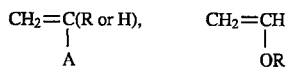

wherein A is an aromatic substituent and R is hydrocarbyl.

The preferred CTA compounds of this invention are represented by the following formula:

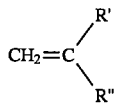

wherein R' and R" independently represent hydrogen, branched or unbranched ($C_1$ to $C_{40}$) alkyl, branched or unbranched ($C_2$ to $C_{40}$) alkenyl, halogen, or the group

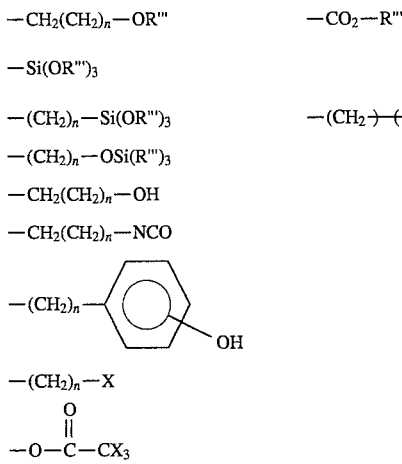
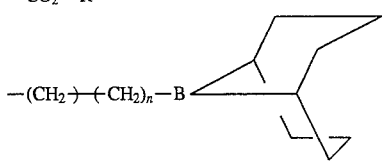

wherein R''' is branched or unbranched ($C_1$ to $C_{10}$) alkyl, preferably methyl or ethyl, branched or unbranched ($C_3$–$C_{90}$) alkenyl, substituted or unsubstituted ($C_6$–$C_{15}$) aryl wherein said substituents if present are selected from branched or unbranched ($C_1$–$C_{10}$) alky or haloalkyl, and halogen, X is chlorine, fluorine, bromine or iodine, and n is 0 to 20, preferably 1 to 5.

Of the above chain transfer agents the α-olefins having 2 to 10 carbon atoms are preferred, e.g., ethylene, propylene, 4-methyl-1-pentene, 1-decene, 1,7-octadiene, and 1,6-octadiene, or isobutylene.

The choice of the optimum olefinic chain transfer agent is dependent on a number of factors such as the choice of catalyst type, the process conditions (temperature, solvent, etc.), the presence or absence of alkylaluminum cocatalyst and the nature of the olefinic end group desired in the resulting polymer, oligomer or macromonomer. The level of the olefinic chain transfer agent required for a given molecular weight is dependent on all of the above variables as well as the type of olefinic chain transfer agent selected.

While the optimum conditions for any given result should be experimentally determined by a skilled artisan taking into the account all of the above factors there are a number of general guidelines which can be conveniently utilized where appropriate. One observation that we have made is that the efficacy of any given chain transfer agent is highly dependent on the selection of Group VIII transition metal used in the catalyst. Notably nickel catalysts are more sensitive than other metals (i.e., a given level of olefin causes a bigger decrease in molecular weight when applied to a nickel catalyst than when applied to, for example, a palladium catalyst). Furthermore, we have learned that, in general, α-olefins (e.g., ethylene, propylene, 1-decene, 4-methyl-1-pentene) are the most effective chain transfer agents with 1,1-disubstituted olefins (e.g., isobutylene) being less efficient. In other words, all other things being equal, the concentration of isobutylene required to achieve a given molecular weight will be much higher than if ethylene were chosen. Styrenic olefins, conjugated dienes, and vinyl ethers are not effective as chain transfer agents due to their propensity to polymerize with the catalysts described herein.

The CTA can be employed in an amount ranging from about 0.10 mole % to over 50 mole % relative to the moles of total NB functional monomer. Preferably, the CTA is employed in the range of 0.10 to 10 mole %, and more preferably from 0.1 to 5.0 mole %. As discussed above, depending on catalyst type and sensitivities, CTA efficiencies and desired end group, the concentration of CTA can be in excess of 50 mole % (based on total NB-functional monomer present), e.g., 60 to 80 mole %. Higher concentrations of CTA (e.g., greater than 100 mole %) may be necessary to achieve the low molecular weight embodiments of this invention such as in oligomer and macromonomer applications. It is important and surprising to note that even such high concentrations of CTA do not copolymerize into the polymer backbone but rather insert as a terminal endgroups on each polymer chain. Besides chain transfer, the process of the present invention affords a way by which a terminal α-olefinic end group can be placed at the end of a polymer chain.

The polynorbornene materials of both the single and multicomponent catalyst systems can be classified by their solubility characteristics. In general, the nickel-catalyzed materials are readily soluble in hydrocarbons such as cyclohexane at room temperature even at molecular weights greater than 500,000. The palladium-catalyzed materials are markedly less soluble. In general, these materials must be heated in chlorinated aromatic solvents such as o-dichlorobenzene or trichlorobenzene before any significant solubility is noted. The differences in solubility are due in all probability to differences in microstructure between the two types of polymers.

Figure 4:
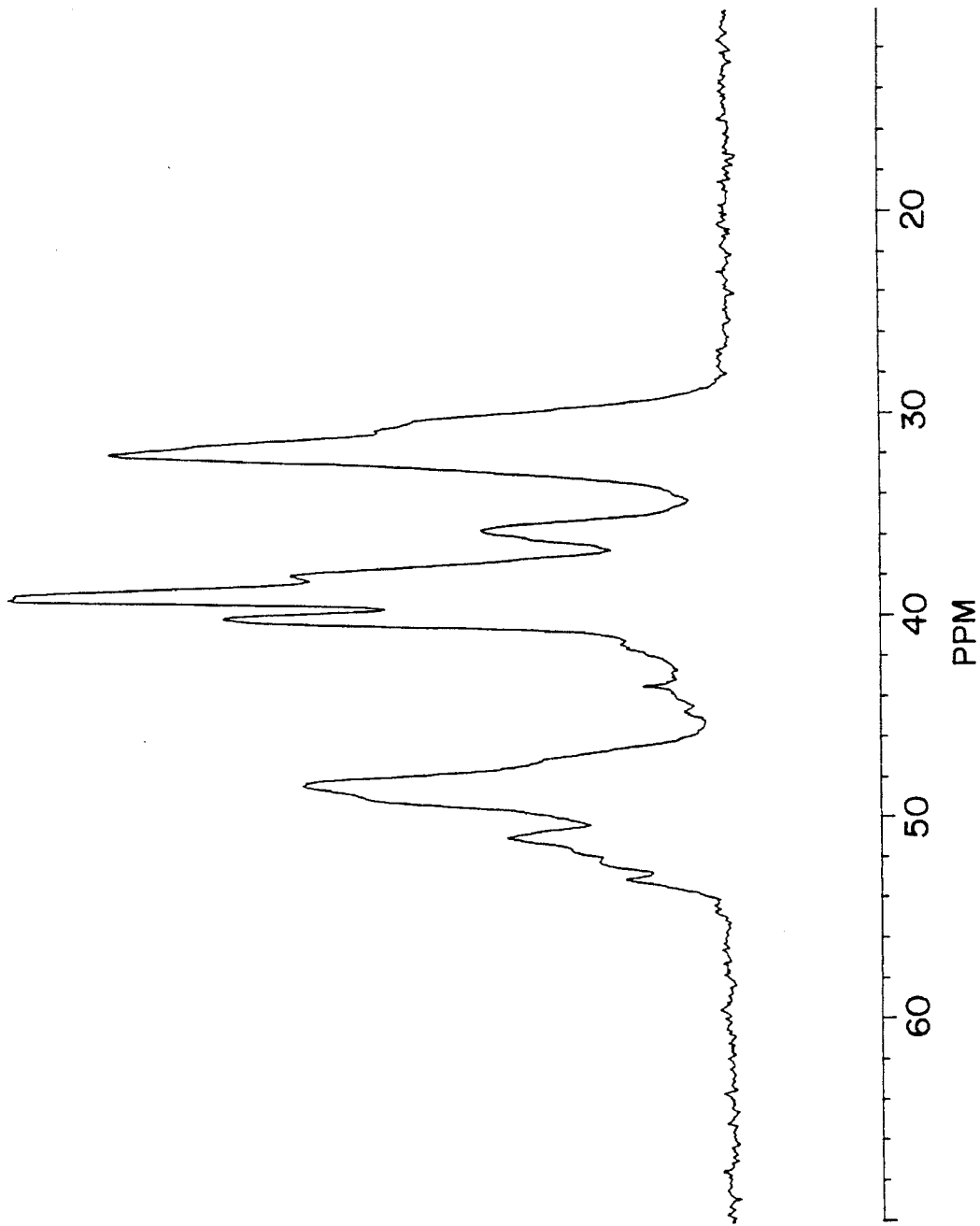
FIG. 4 is a $^{13}$C-NMR spectrum at 50 MHz of a nickel catalyzed polymer of the present invention.
Figure 5:
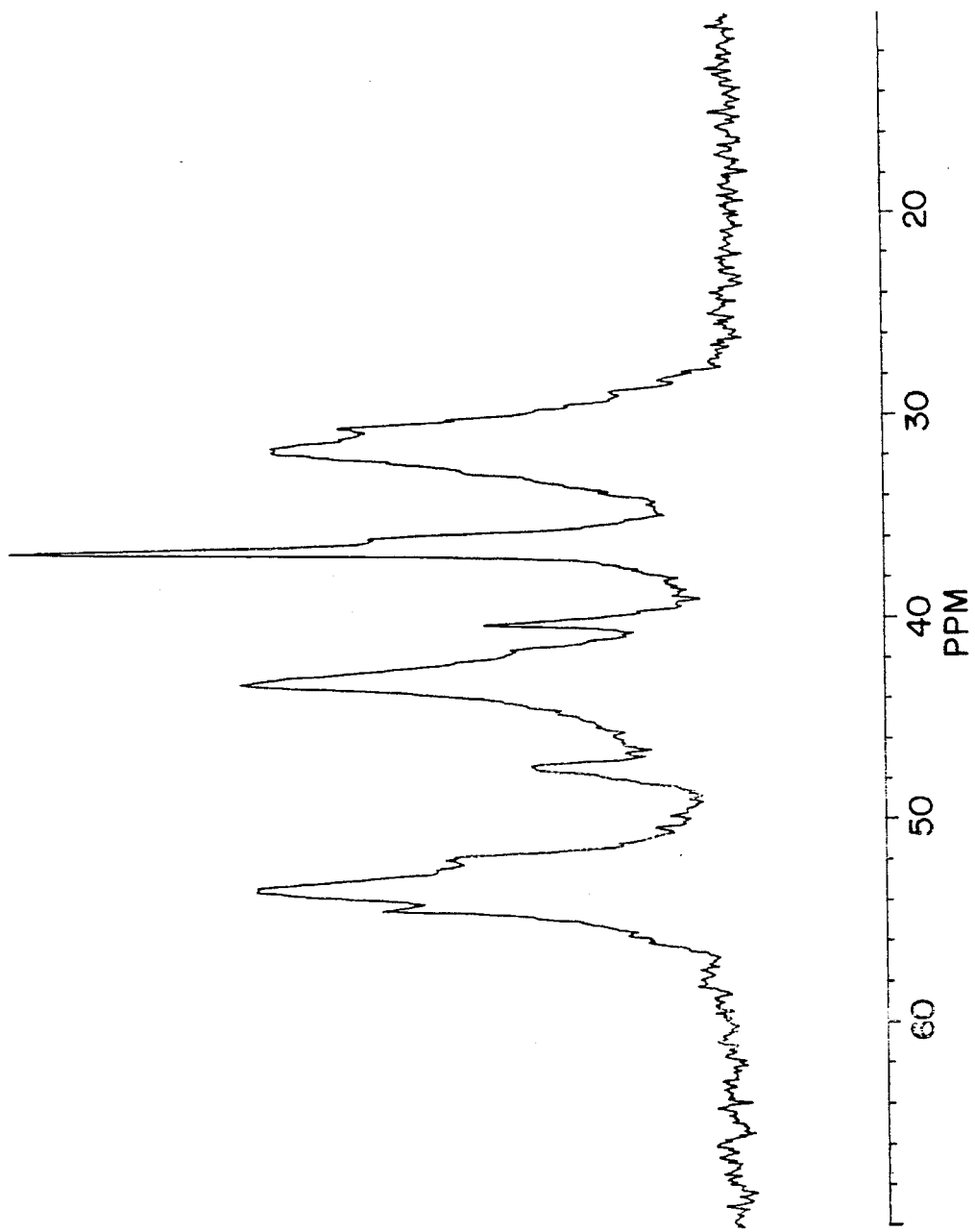
FIG. 5 is a $^{13}$C-NMR spectrum at 50 MHz of a palladium catalyzed polymer of the present invention.
Figure 6:
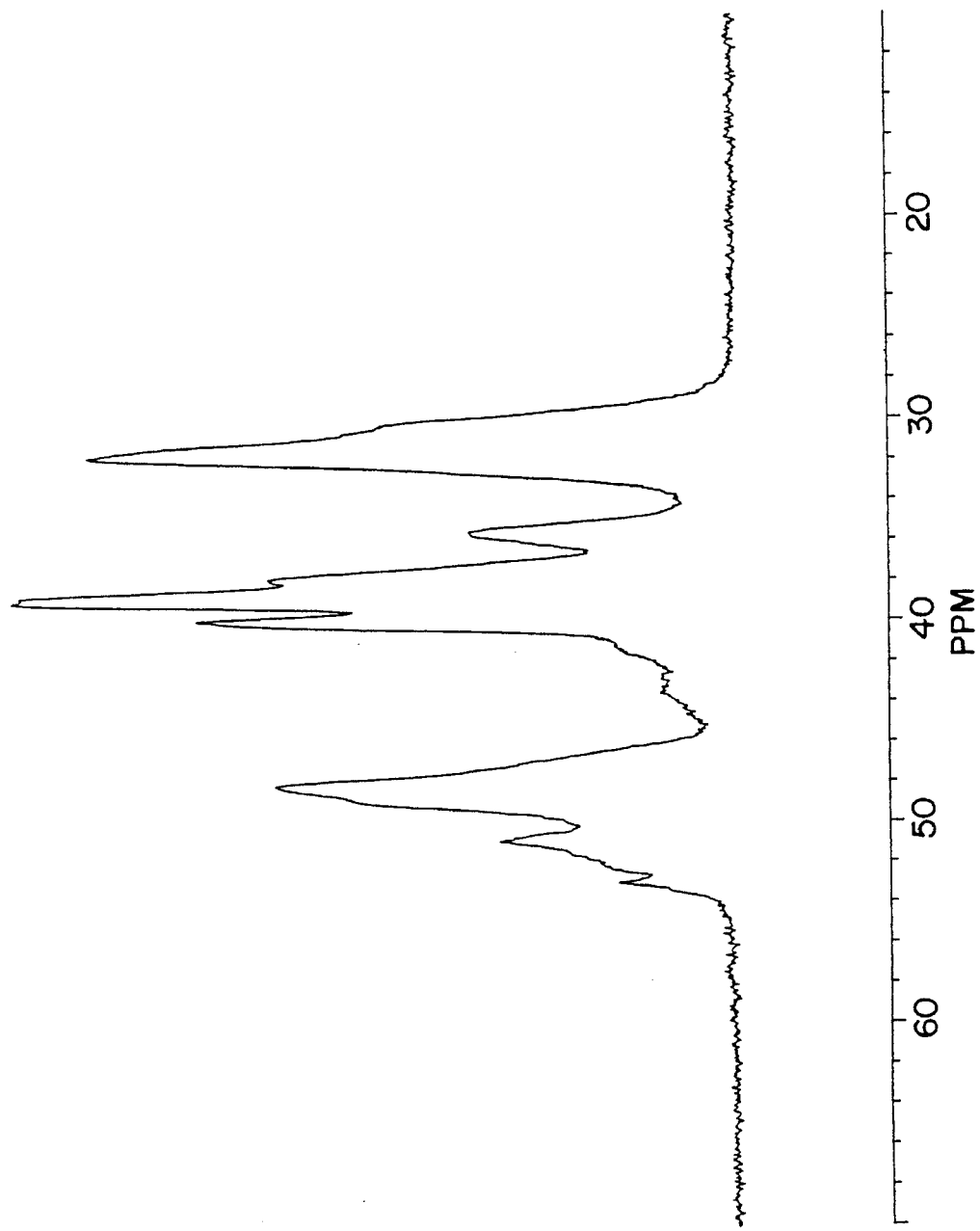
FIG. 6 is a $^{13}$C-NMR spectrum at 50 MHz of a nickel catalyzed polymer of the present invention.
Figure 7:
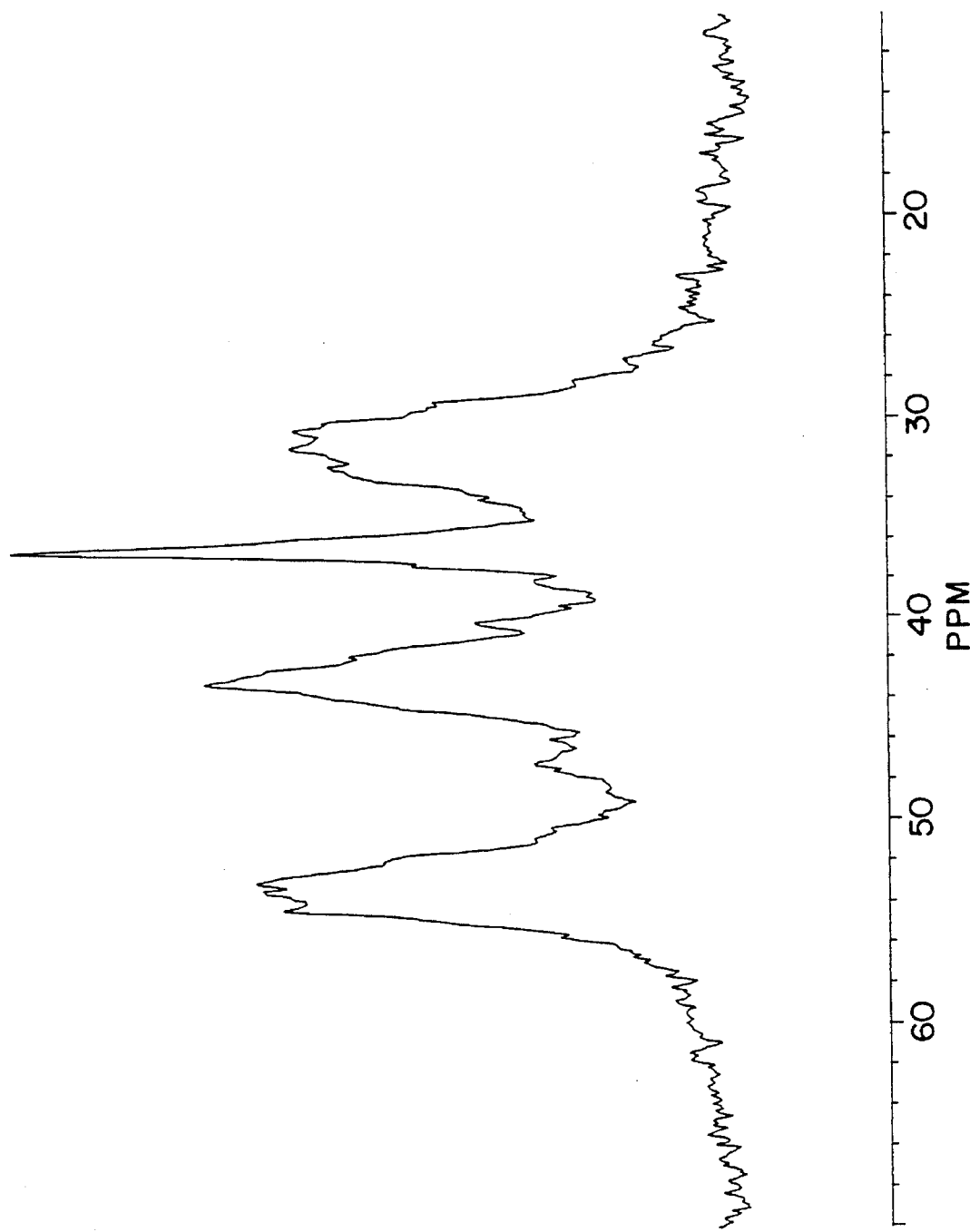
FIG. 7 is a $^{13}$C-NMR spectrum at 50 MHz of a palladium catalyzed polymer of the present invention.

Carbon-13 NMR spectroscopy allows one to investigate the polymer microstructure of the addition polymers of this invention. The $^{13}$C-NMR spectra in FIGS. 4 through 7 were measured in a mixture of deuterated trichlorobenzene/benzene at 363° K. In FIG. 4 is presented a spectrum of a sample of norbornene addition polymer synthesized using a single-component catalyst system, [(crotyl)Ni(COD)]$PF_6$. In FIG. 5 is presented a spectrum of an addition polynorbornene made using the palladium analog, [(crotyl)Pd(COD)]$PF_6$. Note that the two spectra are entirely different indicating that the polymer microstructure depends, in this case, on the nature of the transition metal used in the polymerization. This trend also is apparent for the multicomponent catalyst systems. For example, in FIG. 6 is presented a representative spectrum of an addition polynorbornene made using a Ni(II) 2-ethylhexanoate, triethylaluminum, hexachloroacetone catalyst system. In FIG. 7 a spectrum of an addition polynorbornene made using a Pd(II) 2-ethylhexanoate, triethylaluminum, hexachloroacetone catalyst system is presented. Again, the nickel-catalyzed polymer is entirely different from the palladium-based material. We have found that ligands also affect the polymer microstructure. For example, the polymer isolated from a $PdCl_2(PPh_3)_2$, triethylaluminum, hexachloroacetone catalyst system exhibited a $^{13}$C-

NMR spectrum different from both the Ni and Pd 2-ethylhexanoate systems mentioned above.

By comparing the $^{13}$C-NMR spectra of nickel catalyzed polynorbornene to the $^{13}$C-NMR spectra of palladium catalyzed polynorbornene, we found that the nickel catalysts give polynorbornenes with a distinctive resonance in the CH region between 45 to 55 ppm, with a major intensity peak at about 47.5–48 ppm as shown in FIGS. 4 and 6. In contrast, the $^{13}$C-NMR spectra of palladium catalyzed polynorbornene (FIGS. 5 and 7) are devoid of a major intensity resonance peak at 48 ppm.

Figure 8:
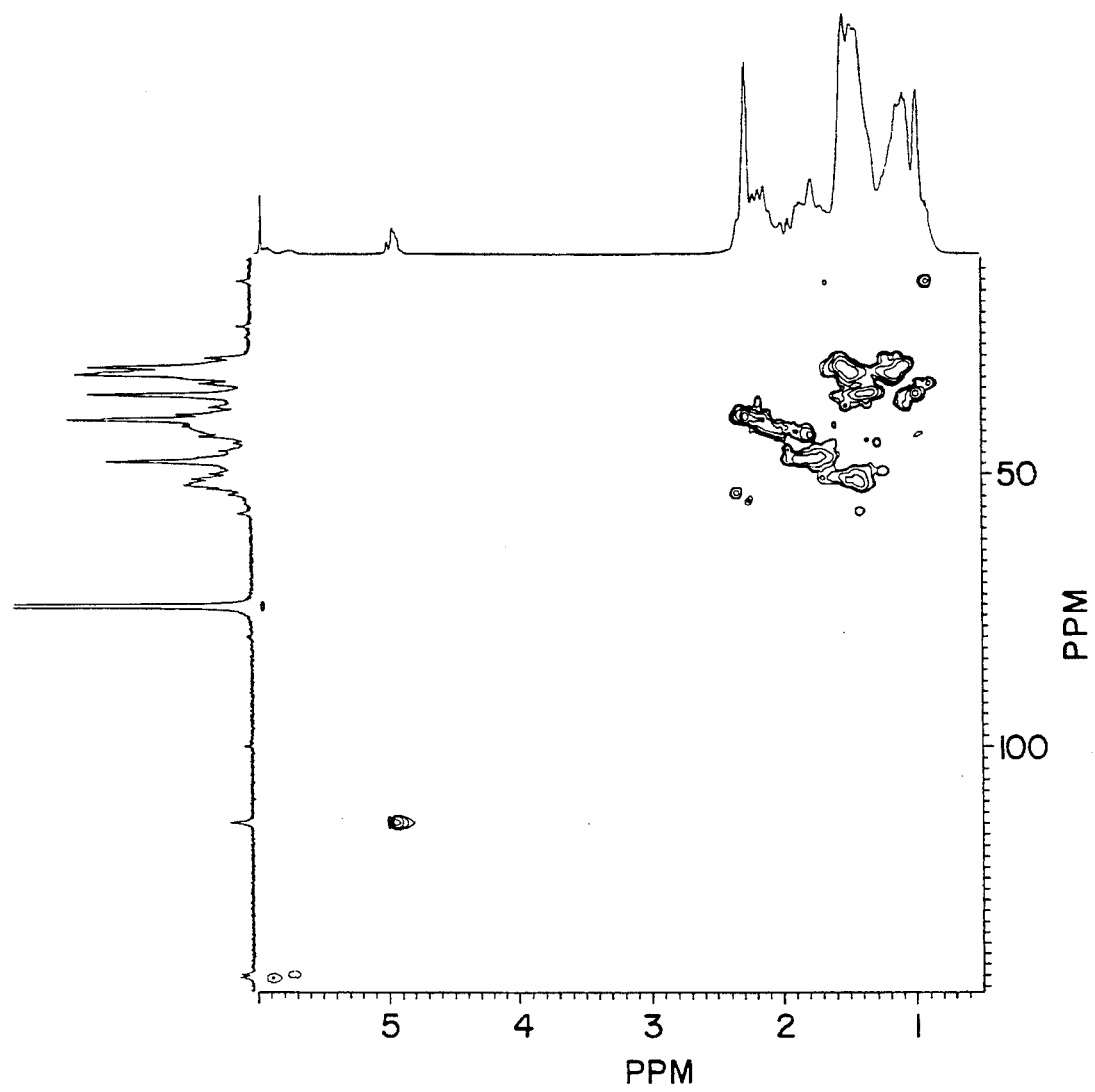
FIG. 8 is a $^1$H-$^{13}$C 2D NMR correlation spectrum at 500 MHz of a nickel catalyzed polymer of the present invention.
Figure 9:
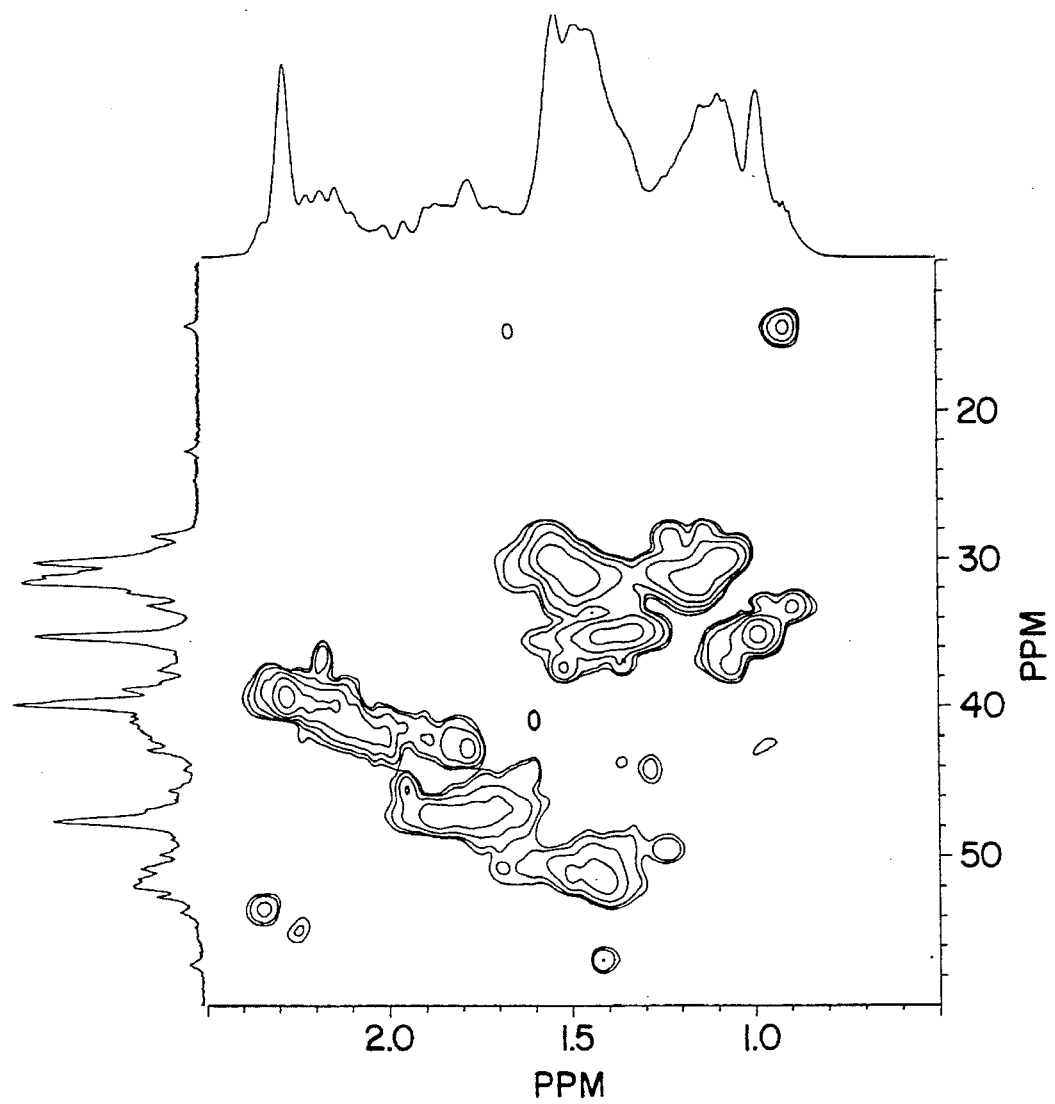
FIG. 9 is an expansion of the aliphatic region of the 2D NMR spectrum shown in FIG. 8.

In FIG. 8 there is shown $^1$H-$^{13}$C (proton-carbon) NMR correlation spectrum (measured in deuterated tetrachloroethane at 323° K.) of a polynorbornene prepared by a nickel catalyst in the presence of a CTA (i.e., ethylene). The region between 45–55 ppm corresponds to the resonance of a norbornene non-bridgehead CH group. This region shows a narrow multiplet at 45–50 ppm (centered at about 47.5 ppm) and a broad multipict at 50–55 ppm. These multipicts exhibit corresponding proton-NMR resonance at 1.6–2 ppm and 1.2–1.6 ppm respectively. The bridgehead CH group exhibits $^{13}$C-NMR resonance at 38–42 ppm corresponding to a proton-NMR resonance at 1.75–2.5 ppm. In addition, two different types of vinyl end-groups are noticed in the $^1$H-$^{13}$C-NMR correlation spectrum, one having a CH resonance at 142.4 ppm in the $^{13}$C NMR spectrum and a proton resonance at 5.90 ppm, the other having a CH resonance at 141.8 ppm in $^{13}$C and a proton resonance at 5.73 ppm. When propylene is employed as the CTA, the end groups observed by $^{13}$C and $^1$H-NMR correspond to the following structures:

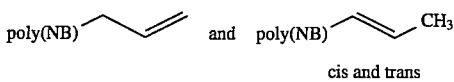

cis and trans

For longer CTA's the end-groups observed by $^{13}$C and $^1$H-NMR correspond to these structures:

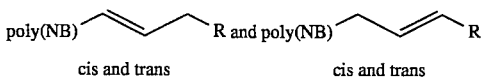

cis and trans      cis and trans

The ethylene and isobutylene CTA's are unique in that only a single well-defined end-group is observed.

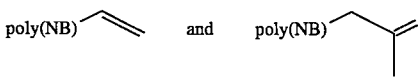

The foregoing structures exhibit resonances that are characteristic of olefinic end groups. These end-groups are easily identified and interpreted by those skilled in the art.

While not wishing to be bound by a specific theory of invention, we believe that the difference in microstructure as confirmed by the spectra is attributable to differing tacticity (e.g., diisotactic vs diheterotactic vs disyndiotactic) and/or differing repeating unit enchainment in the polymer backbone (e.g., 2,3-enchainment vs 2,7-enchainment). We believe that the nickel catalyzed polymers of this invention contain 2,7-repeating unit enchainment in addition to the typical 2,3-repeating unit enchainment set forth in the prior art.

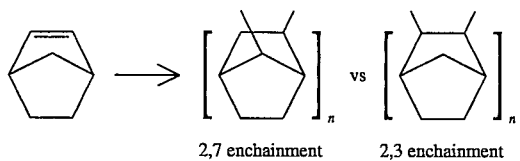

2,7 enchainment    2,3 enchainment

The foregoing $^{13}$C-NMR spectra are representative of unsubstituted polynorbornene homopolymer. As one of ordinary skill in the art will recognize the multiplet peaks can shift upon adding substituents and/or comonomer units into the backbone. Accordingly, it will be evident that the $^{13}$C and $^1$H-NMR spectrum of polynorbornene homopolymer can be utilized as a characterization tool for the presence (including the type of) or absence of an olefinic end-group as well as differences in microstructure.

In the following illustrative examples, various complex catalysts are prepared and used as illustrative examples in the preparation of homopolymers of NB and substituted NB monomers, and of copolymers thereof.

Examples of Pre-formed Single Component Catalysts

Catalyst A: [($\eta^3$-crotyl)(cycloocta-1,5-diene)nickel] hexafluorophosphate

To a flask containing bis(cycloocta-1,5-diene)nickel (2.75 g, 10 mmol), was added a solution of crotyl bromide (1.35 g, 10 mmol) and butadiene (2.5 g) in toluene (24 ml). A deep-red solution of (crotyl)nickelbromide dimer resulted. After 2 hours at ambient temperature the solvent was removed under reduced pressure. To the resulting powder was added a solution of 1,5- cyclooctadiene (3.6 ml) in tetrahydrofuran (THF) (32 ml). After cooling to 0° C. thallium hexafluorophosphate (3.5 g, 10 mmol) was added and the resulting mixture allowed to warm to ambient temperature (21° C.) and be stirred for one hour.

The solvent was stripped away under reduced pressure and dichloromethane (24 ml) was added. Insoluble thallium bromide was removed by filtration (under nitrogen) to afford the complex catalyst product as a solution in dichloromethane. This solution was reduced in volume and diethylether was added. The catalyst was washed thoroughly with diethylether, then dried under reduced pressure, to afford the catalyst as 1.3 g of orange crystals. This catalyst, identified hereafter as "catalyst A" is referred to as [($\eta^3$-crotyl)(cycloocta-1,5-diene)nickel]hexafluorophosphate.

Catalyst B: Tetrakis(acetonitrile)palladium (II) tetrafluoroborate Purchased from Aldrich Chemical Company, used as received.

Catalyst C: [($\eta^3$-crotyl)(cycloocta-1,5-diene)nickel]tetrakis(3,5-bis(trifluoromethyl)-phenyl) borate.

3,5-bis(trifluoromethyl)bromobenzene (50 g, 170 mmol) in diethylether (150 ml) was added slowly (over about 2 hours) to magnesium powder (5.1 g, 210 mmol) followed by refluxing for about 3 hours to give a dark grey solution. Sodium tetrafluoroborate (3.4 g, 30 mmol) was added and the resulting slurry was refluxed for 24 hours. The refluxed slurry was added to an aqueous solution of sodium carbonate (75 g in 1 liter), stirred 20 minutes, then filtered. The aqueous layer was separated and extracted 4 times with diethylether (200 ml aliquots). The ether layers were combined and dried over sodium sulfate and treated with decolorizing charcoal. The solvent was removed under high vacuum to afford an amber slush. Methylene chloride was added until the solid was thoroughly wetted, then chloroform was added and the resulting solid was filtered and dried. An essentially quantitative yield of recovered sodium tetrakis[3,5-bis(trifluoromethyl)phenyl]borate (18 g), was in the form of a light tan, crystalline solid.

COD (1.3 ml) in THF (16 ml) was added to crotylnickelbromide dimer (0.5 g, 1.75 mmol). The mixture was cooled to 0° C. and the above described sodium tetrakis [bis(trifluoromethyl)phenyl]borate (3.1 g, 3.5 mmol) was added. The mixture was warmed to room temperature and stirred for 1 hour to give a clear, dark brown solution. The solvent was removed under vacuum and methylene chloride added to give a slightly hazy solution. The solution was filtered to give a clear, amber solution. The solvent was removed under vacuum, washed three times with hexane, filtered and dried under high vacuum to afford the product, [($\eta^3$-crotyl)-(cycloocta-1,5-diene)nickel]tetrakis(3,5-bis(trifluoromethyl)phenyl)borate (3.42 g) as a pale yellow powder.

Catalyst D: [6-methoxynorbornen-2-yl-5-palladium(cyclooctadiene)]hexafluorophosphate To a flask containing (norbornadiene)palladium dichloride (1.0 g. 3.7 mmol) and methanol (20 ml) was added a solution of potassium methoxide (0.256 g, 3.65 mmol) in methanol (20 ml), the addition being made at −78° C. After an hour at that temperature the mixture was allowed to warm to ambient temperature and was filtered and dried to afford a light green-brown solid (methoxynorbornenylpalladium-chloride dimer). A portion of this material (0.5 g, 1.65 mmol) was placed in a stirred flask with THF (50 ml) and COD (2 ml). Then a solution of thallium hexafluorophosphate (0.57 g, 1.65 mmol) in tetrahydrofuran (17 ml) was added 0° C. After warming to room temperature the solvent was removed and then 1,2-dichloroethane (60 ml) was added to give a yellow solution and a pale colored precipitate (thallium chloride). The solution was filtered and the solvent removed under high vacuum to afford the product, identified hereafter as catalyst D, and referred to as methoxynorbornenylpalladium(cyclooctadiene)]hexafluorophosphate (structure below) as a greenish solid.

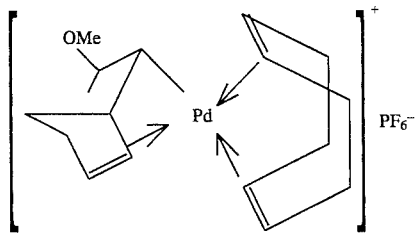

Catalyst E: [($\eta^3$-crotyl)(cycloocta-1,5-diene)palladium] hexafluorophosphate To a 500 ml Erlenmeyer flask was added sodium chloride (2.95 g, 50.4 mmol), palladium dichloride (4.44 g, 25.3 mmol), methanol (150 ml) and water (2.25 g, 125 mmol). The resulting suspension was stirred at ambient temperature for an hour affording a dark-brown solution. To this solution was added crotyl bromide (7.6 ml, 74 mmol).

The vessel was then purged with carbon monoxide for 30 minutes (at a rate of 40 ml per minute). After several minutes the solution became lighter in color with a noticeable amount of a precipitate. The mixture was then poured into water (1 liter) affording an amber-brown colored solid. The mixture was extracted with 3 aliquots of chloroform (total volume 500 ml). Removal of the chloroform from the resulting solution afforded a yellow green solid which was characterized by proton NMR methods as ($\eta^3$-crotyl)palladium halide dimer. The yield was essentially quantitative. This yellow-green solid was dissolved in tetrahydrofuran (100 ml) and 1,5-cyclooctadiene (8.7 ml) was added. Thereafter thallium hexafluorophosphate (8.8 g, 25.3 mmol) was dissolved in THF and both solutions were cooled to 0° C. The thallium hexafluorophosphate solution was added slowly to the solution of the palladium compound. An immediate off-white precipitate was observed, the amount of which increased as more of the thallium solution was added.

After the addition was completed the ice-bath was removed and the suspension was allowed to warm to ambient temperature, with stirring. The THF was removed under vacuum and dichloromethane (100 ml) was added. The mixture was filtered and the solution was concentrated to a volume of about 40 ml. To this solution was added diethylether (100 ml) which resulted in the formation of light yellow-white crystals in high yield. The crystals are identified hereafter as catalyst E, and referred to as [($\eta^3$-crotyl)(cycloocta-1,5-diene)-palladium]hexafluorophosphate. The material was characterized by NMR spectroscopic methods.

Example of a two-component catalyst with MAO cocatalyst

Catalyst F: nickelethylhexanoate: first component, and MAO second component.

Nickel(II)ethylhexanoate, identified hereafter as Catalyst F, is obtained as a solution in mineral spirits and was used, as received (from OMG Inc.) in combination with MAO as cocatalyst.

Additional Examples: Pre-formed Single Component Catalysts

Catalyst G: $\eta^3$, $\eta^2$, $\eta^2$-dodeca-2(E), 6(E), 10(Z)-triene-1-ylnickel hexafluorophosphate The synthesis of this catalyst, the structure of which is represented below, is described by R. Taube et al., *Makromol. Chem., Macromol. Symp.*, 66, (1993) 245–260 and in references cited in Taube et al.

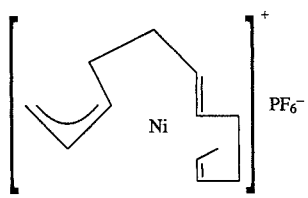

Catalyst H: Tetrakis(octanonitrile)palladium (II) tetrafluoroborate

Heptylcyanide (octanonitrile) (40 ml) was added to tetrakis(acetonitrile)palladium (II) tetrafluoroborate (1.5 g) and the resulting slurry was allowed to stir for 4 hours, after which time the solid had dissolved, affording a red solution. Hexane (60 ml) was added and then the hexane and excess nitriles were removed under high vacuum, with the flask being heated on a steam bath, to afford the catalyst product (which was washed 3 times with hexane and redried), as a red, viscous oil identified as [tetrakis(octanonitrile)palladium (II) tetrafluoroborate].

Catalyst I: [($\eta^3$-cyclooctenyl)(cycloocta-1,5-diene)nickel] tetrakis(3,5-bis(trifluoromethyl)phenyl) borate in toluene To a mixture of bis(cyclooctadiene)nickel (0.011 g, 0.04 mmol) and N,N-dimethylanilinium-3,5-bis(trifluoromethyl)-phenyl)borate (0.046 g, 0.047 mmol), was added toluene (2 ml). This resulted in an orange solution of the catalyst which was used as such.

Catalyst J: $\{CH_3Ni(C_2H_4)_2\}^-Li\{(CH_3)_2NCH_2CH_2N(CH_3)_2\}_2^+$, an anionic catalyst.

This compound was made according to a method taught by Klaus Jonas et al *Angew. Chem. Int. Ed. Engl.*, 15. 621–2 (1976).

Catalyst K: Bis(η³-allyl nickel trifluoroacetate)

This compound was made according to a method taught by F. Dawans et al *J. Organometal. Chem.*, 21, 259–61 (1970).

Catalyst L: η³, η², η²-dodeca-2(E),6(E), 10(Z)-triene-1-ylnickel on a support, forming an active support.

The synthesis of this catalyst is described by R. Taube et al., *Makromol. Chem.*, 194, (1993) 1273–88 and references therein. The active support, $AlF_3$, was prepared by reacting $BF_3$·etherate with triethylaluminum and isolating the product as a white solid. This support was reacted with $[Ni(C_{12}H_{19})]O_3SCF_3$ at ambient temperature in toluene for 24 hours. The slurry/solution of the nickel compound was originally yellow in color but became colorless as the reaction proceeded, affording the supported catalyst as a yellow-brown solid which was filtered and dried. The catalyst (L) was stored, under nitrogen as a yellow-brown powder.

Catalyst M: η³-crotyl(cycloocta-1,5-diene)nickel on an active support

Catalyst A (5mg) was dissolved in 1,2-dichloroethane (20 ml) and added to an active support (200mg) (obtained from Witco and used as received) consisting essentially of an alkylaluminoxane (MAO) on a silica support. The active support contained 7.4% by wt aluminum. The resulting mixture was stirred at ambient temperature for 5 minutes and then used, without isolating, as a supported catalyst.

Catalyst N: Manganese Lin-All

This material, manganese Lin-All (a long chain manganese carboxylate salt), was obtained as a solution in mineral spirits (containing 6% wt Mn) from OMG Inc., and was used as received in combination with MAO as cocatalyst.

Catalyst O: Molybdenum Hex-Cem

This material, molybdenum Hex-Cem (a long chain molybdenum carboxylate salt), was obtained as a solution in mineral spirits (containing 15% by wt Mo) from OMG Inc., and was used as received in combination with MAO as cocatalyst.

EXAMPLE 1

Catalyst A with decylnorbornene comonomer and decene-1 as Chain Transfer Agent "CTA"

To a 3-liter wide-mouth glass flask equipped with a mechanical stirrer were added the following materials in the given order: norbornene (163 g, 1.73 mol), 1,2-dichloroethane (2,950 g, 2,341 ml), 5-decylnorbornene (71.7 g, 0.31 mol), 1-decene (3.57 g, 4.8 ml, 0.0255 mol) and then catalyst A (0.187 g, 0.51 mmol) dissolved in dichloromethane (2 ml). Immediately after adding the catalyst to the stirred solution polymer started forming and the reaction exothermed to 44° C. The mixture was allowed to stir for a total of 60 minutes before methanol (100 ml) was added to destroy the catalyst. The polymer cake was added to stirring methanol to afford the product as a white powder which was filtered off and washed with methanol and then ethanol. The polymer was then dried, dissolved in cyclohexane (4 liter) and then precipitated by addition to acetone. The polymer obtained was filtered off, washed with acetone and dried under vacuum for 16 hours at 150° C. The resulting polymer weighed 188 g (80% isolated yield), showed a $T_g$ of 282° C. and molecular weight (relative to polystyrene standard) of 167,000 ($M_w$) as determined by GPC methods ($M_n$ was 79,400). In addition to the reduction in molecular weight, the 1-decene caused the polymer to be terminated with an olefinic group observed by proton NMR spectroscopy. Resonances are observed at 5.35 ppm relative to tetramethylsilane using a solution in perdeuterated o-dichlorobenzene at 110° C. The 5.35 ppm corresponds to two overlapping protons of a 1,2-disubstituted double bond.

EXAMPLE 2

Catalyst A with decylnorbornene comonomer but no α-olefin or other CTA

In this example no olefin was used to control molecular weight. To a 3-liter wide-mouth glass flask equipped with a mechanical mechanical stirrer was added the following materials in the given order: norbornene (123 g, 1.3 mol), 1,2-dichloroethane (2,500 g, 2,006 ml), 5-decylnorbornene (53.1 g, 0.23 mol), and then catalyst A (0.119 g, 0.325 mmol) dissolved in dichloromethane (2 ml). Immediately after adding the catalyst to the stirred solution polymer started forming and the reaction exothermed. The mixture was allowed to stir for a total of 60 minutes before methanol (100 ml) was added to destroy the catalyst. The polymer cake was added to stirring methanol to afford the product as a white powder which was filtered off and washed with methanol and then dried under vacuum for 16 hours at 60° C. followed by several hours at 180° C. The resulting polymer showed a molecular weight of 1,460,000 ($M_w$) as determined by GPC methods ($M_n$ was 366,000). The polymer showed no resonances in the olefinic region in the NMR spectrum.

EXAMPLE 3

Catalyst A with NB but no $M_w$ control and no comonomer

To a 3-liter wide-mouth glass flask equipped with a mechanical stirrer was added the following materials in the given order: norbornene (230 g, 2.4 mol), 1,2-dichloroethane (2,950 g, 2,341 ml) and then catalyst A (0.44 g, 1.2 mmol) dissolved in dichloromethane (2 ml). Immediately after adding the catalyst to the stirred solution polymer started forming and precipitating from solution as a white powder to give a viscous white "cake" within about 5 seconds. The reactor exothermed to a maximum of 64° C. The mixture was allowed to stand for a total of 60 minutes before methanol (100 ml) was added to destroy the catalyst. The polymer cake was added to stirring acetone to afford the product as a white powder which was filtered off and washed with acetone and then methanol. The polymer was then dried overnight in a heated (60° C.) vacuum oven. The resulting poly(norbornene) weighed 228.6 g (99.4% isolated yield), showed a $T_g$ of 370° C. and molecular weight of 1,640,000 ($M_w$) as determined by GPC methods ($M_n$ was 436,000).

The addition homopolymer of NB exhibited a $T_g$ at 370° C. (nominally). Though prone to oxidation in air at 370° C. there is no melt flow. Specifically, a shear stress of 0.76 MPa was insufficient to induce any flow prior to decomposition. An even higher temperature, typically 50° C. above the $T_g$ is required to obtain melt flow necessary for fusion, that is, to progress from the elastic plateau into the terminal flow regime. Decomposition is unavoidable when such melt flow is obtained. The conclusion is that the homopolymer of NB is not processable in the melt state.

EXAMPLES 4–13

Catalyst A with different levels of decylnorbornene (comonomer) and decene-1 (CTA)

The following examples demonstrate the effects of an α-olefin and a 5-alkylnorbornene comonomer on polymer glass transition temperature and molecular weight. All the polymerizations were run, in a 50 ml glass vial, at ambient temperature in 1,2-dichloroethane (25 ml) using a magnetic stir bar for agitation. The components were added in the following order: norbornenes, decene-1, 1,2-dichloroethane, catalyst A (2.2 mg, 0.006 mmol dissolved in 0.5 ml 1,2-dichloroethane). In experiments 12 and 13, 4.4 mg (0.012 mmol) of catalyst A was used. In example 7 the NB was used as received without any purification or drying. The reactions were run for 1 hour (experiment 13, 30 minutes) after which methanol was injected to terminate the reaction and the polymer was washed with excess methanol and dried. The results are set forth in the following Table 1.

It is seen from the effect of increasing 1-decylNB concentration, that by copolymerizing the NB with decylNB, the $T_g$ of the copolymer formed can be manipulated. A copolymer with 20 mole % 1-decylNB exhibits a $T_g$ of about 250° C. Flow is initiated for this copolymer with a shear stress of 0.76 MPa at 310° C. The viscosity can be adjusted between 800,000 and 50,000 poise by changing temperatures between 310° C. and 340° C., which is suitable for processing. A negligible amount of oxidation and chain scission occurs during the short time required to process the polymer at these temperatures so that the properties of the polymer, after melt flow, are retained. Thus copolymerization with a substituted-NB of choice one can lower the $T_g$ sufficiently to allow melt processing at a desired temperature.

TABLE 2

| Expt # | Temp. °C. | Catalyst | Solvent | Polymer yield, g | Conv'n, % |
|---|---|---|---|---|---|
| 14 | room | A | chlorobenzene | 2.05 | 89 |
| 15 | room | A | o-dichlorobenzene | 2.2 | 96 |
| 16 | 60 | C | toluene | 0.89 | 39 |

EXAMPLES 17, 18

Catalyst B using an α-olefin for $M_w$ control

In one (#17) of these two examples, the polymerization carried out by Sen and Risse, using a palladium catalyst and no CTA, is substantially duplicated. For comparison, the only difference in #18 is that 10 mol % 1-decene is added to a mixture analogous to the one which produced the homopolymer in #17. Each polymerization was run in a 50 ml glass vial, at ambient temperature with nitromethane (10 ml) as solvent, using a magnetic stir bar for agitation. The components in #18 were added in the following order: norbornene (5 g, 53.1 mmol), nitromethane, catalyst B (11 mg, 0.026 mmol which was first dissolved in 2 ml of nitromethane) then decene-1 (1.0 ml, 5.2 mmol). In #17, the

TABLE 1

| Ex. # | Norbornene (g, mmol) | Decene-1, (g, mmol) | 5-Decyl-norbornene, (g, mmol) | Polymer yield, (g) | Conv'n (%) | $M_w \times 10^{-3}$ | $M_n \times 10^{-3}$ | $T_g$, °C. |
|---|---|---|---|---|---|---|---|---|
| 4 | 2.32, 24.6 | 0.035, 0.25 | 0.03, 0.125 | 2.16 | 92 | 195 | 80 | 353 |
| 5 | 2.31, 24.5 | 0.053, 0.38 | 0.03, 0.125 | 2.18 | 93 | 124 | 44 | 351 |
| 6 | 2.25, 23.9 | 0.053, 0.38 | 0.18, 0.75 | 2.19 | 90 | 125 | 54 | 356 |
| 7 | 1.98, 21.1 | 0.018, 0.125 | 0.88, 3.75 | 2.49 | 87 | 310 | 129 | 285 |
| 8 | 2.2, 23.3 | 0.07, 0.5 | 0.29, 1.25 | 2.35 | 94 | 114 | 44 | 336 |
| 9 | 2.08, 22.1 | 0.053, 0.38 | 0.59, 2.5 | 2.39 | 90 | 128 | 54 | 297 |
| 10 | 2.34, 24.8 | 0,018, 0.125 | 0.015, 0.063 | 2.26 | 96 | 331 | 117 | 375 |
| 11 | 1.95, 20.8 | 0.07, 0.5 | 0.88, 3.75 | 2.6 | 92 | 110 | 50 | 265 |
| 12 | 1.7, 18 | 0.84, 6 | 0, 0 | 1.7 | 100 | 11 | 6 | 274 |
| 13 | 2.3, 24.5 | 0, 0 | 0, 0 | 2 | 87 | 1250 | 335 | 370 |

Note that in each of the foregoing examples, the conversion obtained was substantially quantitative being generally above 90%. Further, when the molar ratio of 1-decene to NB is 0.33, a macromonomer of NB is formed which has a $M_w$ of only 11,000 with 100% conversion.

EXAMPLES 14–16

Catalysts A and C, solution polymerizations with different solvents

In these three examples, catalysts A and C are used to polymerize NB under solution conditions. Each example was run in 25 ml of chlorobenzene, o-dichlorobenzene, and toluene (as indicated in Table 2 below) in a 50 ml glass vial, at ambient (22° C.) temperature (example 14 was at 60° C.) using a magnetic stir bar for agitation. The components were added in the following order: norbornene (2.29 g, 24.4 mmol, used as received with no further purification), chosen solvent, catalyst A (2.2 mg, 0.006 mmol dissolved in 0.5 ml of the solvent), experiment 14 catalyst C (6.6 mg, 0.006 mmol). Each reaction was run for 1 hour to produce a viscous solution ('polymer cement') into which methanol was injected to terminate the reaction. The polymer was then washed with excess methanol and dried.

same procedure just described was followed, but no 1-decene was used. Each reaction was allowed to proceed for 1 hr to allow a comfortable margin for completion. Methanol was then injected into the solid reaction mass to terminate the reaction. The polymer was washed with excess methanol and dried. The results are set forth in Table 3 below.

TABLE 3

| Expt. # | 1-Decene | Polymer yield, g | Conv'n % | $M_w$ | $M_n$ |
|---|---|---|---|---|---|
| 17 | no | 2.7 | 54 | 141,000 | 70,200 |
| 18 | yes | 3.4 | 68 | 92,400 | 39,100 |

In addition to the reduction in molecular weight the 1-decene caused the polymer in experiment 18 to be terminated with an olefinic group observed by proton NMR methods (signals observed in the region of about 4.5 to about 6 ppm relative to TMS).

EXAMPLE 19

Catalyst D in the homopolymerization of NB

To a 50 ml glass vial was added norbornene (5 g, 53.1 mmol) and 1,2-dichloroethane (10 ml). To this solution was added catalyst D (11 mg, 0.026 mmol) dissolved in dichloroethane (1 ml). Upon addition (at ambient temperature) the solution became cloudy and after 1 minute the solution became viscous, indicating polymer formation. The reaction was allowed to run for 24 hours after which the vessel was a solid plug of polymer. Methanol was injected to terminate the reaction and the polymer was washed with excess methanol and dried. The yield of poly(norbornene) was 4.6 g, 92% yield. The molecular weight was 13,200 ($M_n$) and 44,500 ($M_w$).

EXAMPLE 20

Catalyst E in the homopolymerization of NB

To a 100 ml glass vial was added norbornene (5 g, 53.1 mmol) and 1,2-dichloroethane (40 ml). To this solution was added catalyst E (5.4 mg, 0.013 mmol) dissolved in dichloroethane (3 ml). Upon addition (at ambient temperature) the solution became cloudy and after about 1 minute the solution became viscous, indicating polymer formation. The reaction was allowed to run for 24 hours after which the vessel was a solid plug of polymer. Acetone was injected to terminate the reaction and the polymer was washed with excess acetone and dried. The yield of poly(norbornene) was 3.3 g, 66% yield.

EXAMPLE 21

Catalyst F using propylene as CTA

To a 500 ml stirred, stainless steel pressure vessel was added a solution of norbornene (100 g, 1.06 mol) in toluene (40 ml) followed by propylene (126 g, 3.0 mol). Into this pressure vessel was injected catalyst F (nickelethylhexanoate, 0.55 g, 1.2 mmol in mineral spirits) dissolved in toluene (20 ml) followed by MAO (20 ml, 44 mmol) in toluene (15 ml). After addition of the MAO there was an immediate exotherm (peaking at 50° C.) which was controlled by cooling the reactor by circulating chilled water through the jacket. After 90 mins the reaction was stopped by injecting methanol. After venting the excess propylene, the polymer was precipitated by adding to a large volume of methanol and the polymer was washed with methanol and dried to afford 25.7 g of the product (25% conversion). The molecular weight was 3,680 ($M_n$) and 6,520 ($M_w$). In addition to the reduction in molecular weight the propylene caused the polymer to be terminated with an olefinic group observed by proton NMR methods (signals observed in the region of about 4.8 to about 6 ppm relative to TMS).

EXAMPLE 22

Catalyst F from without CTA
Comparative Example

To a 500 ml stirred serum bottle was added a solution of norbornene (50 g, 0.53 mol) in toluene. Into this solution was injected catalyst F (nickelethylhexanoate, 0.12 mmol in mineral spirits) dissolved in cyclohexane (1 ml) followed by methaluminoxane (5 ml of a 10% w solution in toluene). After 90 min the reaction was stopped by injecting ethanol. The polymer was precipitated by adding to a large volume of methanol and the polymer was washed with methanol and dried to afford 31.6 g of the product (63% conversion). The molecular weight was 1,030,000 ($M_w$) and 597,000 ($M_n$).

EXAMPLE 23

Copolymerization of NB and cyclopentene

To a 50 ml glass vial was added norbornene (5 g, 53.1 mmol) and cyclopentene (5 ml). To this solution was added a solution of catalyst H (100 mg, 0.128 mmol) in toluene (1 ml). The reaction was allowed allowed to stir for 24 hours at ambient temperature after which methanol was injected to terminate the reaction and the polymer was washed with excess methanol and dried. The yield of polymer was 4.5 g. The resulting polymer was characterized using NMR techniques as a norbornene/cyclopentene copolymer and was shown terminated with an olefinic group.

EXAMPLE 24

Catalyst A with ethylene as $M_w$ modifier

To a 500 ml stirred, stainless steel pressure vessel was added a solution of norbornene (75 g, 0.8 mol) in 1,2-dichloroethane (200 ml) followed by ethylene (300 psi). Into this pressure vessel was injected catalyst A (73 mg, 0.2 mmol) dissolved in 1,2-dichloroethane (4 ml). After one hour the reaction was stopped by venting the ethylene and injecting ethanol (2 ml). The polymer slurry was worked up by adding to an excess of ethanol, filtering, washing the polymer with ethanol, air drying and then drying the product under vacuum, at 80° C. for 20 hr. The polymer yield was 38.7 g (54%). The molecular weight was 2,120 ($M_n$) and 2,840 ($M_w$). In addition to the reduction in molecular weight the ethylene caused the polymer to be terminated with an olefinic (vinyl) group observed by proton NMR spectroscopy. The $T_g$ of the material was 170° C.

EXAMPLE 25

Catalyst A in copolymerization of methylNB and decylnorbornene using decene-1 as $M_w$ modifier This polymerization was run in a 50 ml glass vial, at ambient temperature in 1,2-dichloroethane (25 ml) using a magnetic stir bar for agitation. The components were added in the following order: 5-methylnorbornene (2.03 g, 18.8 mmol), 5-decylnorbornene (1.46 g, 6.25 mmol), decene-1 (0.043 g, 0.31 mmol), 1,2-dichloroethane, catalyst A (4.4 mg, 0.012 mmol dissolved in 0.5 ml 1,2-dichloroethane). The reaction was run for 1 hour after which methanol was injected to terminate the reaction and the polymer was washed with excess methanol and dried. The yield of polymer was 2.02 g (58% conversion) and the molecular weight was 20,000 ($M_n$) and 71,000 ($M_w$).

EXAMPLE 26

Catalyst I in solution homopolymerization of NB

To a 100 ml glass vial was added norbornene (5 g, 53.1 mmol) and toluene (5 ml). To this solution was added the solution of catalyst I in toluene (2 ml). Within 1 minute the reaction mixture became hot and stirring stopped due to the high viscosity caused by polymer formation. After 10 rains the reaction was stopped and the polymer was dissolved in toluene (400 ml) and precipitated with methanol and filtered. The polymer was then redissolved in toluene, reprecipitated with methanol, washed with methanol and dried to afford the polymer (3.5 g, 70% conversion). The polymer has a $T_g$ of about 400° C. and molecular weight of $M_w$ 520,000, $M_n$ 128,000.

EXAMPLE 27

Catalyst I in homopolymerization of NB

To a 100 ml glass vial was added norbornene (5 g, 53.1 mmol) and 1,2-dichloroethane (50 ml). To this solution was added the solution of catalyst I in toluene (2 ml). The polymer started to form immediately and precipitated from solution. The contents of the reaction flask were added to excess methanol, washed with methanol and dried to afford the polymer (4.2 g, 84% conversion). The polymer has a $T_g$ of about 384° C.

EXAMPLE 28

Catalyst F using ethylene as CTA

To a 500 ml stirred, stainless steel pressure vessel was added a solution of norbornene (30 g, 0.32 mol) in toluene (250 ml) followed by propylene (250 psi). Into this pressure vessel was injected catalyst F (nickelethylhexanoate, 0.046 g, 0.1 mmol in mineral spirits) dissolved in toluene (5 ml) followed by methaluminoxane (14.8 mmol) in toluene (5 ml). After 40 minutes the reaction was stopped by injecting methanol. After venting the excess ethylene, the polymer was precipitated by adding to a large volume of methanol and the polymer was washed with methanol and dried to afford 15.1 g of the product. The product was a homopolymer of norbornene terminated with a vinyl group originating from the ethylene molecular weight modifier. The olefinic (vinyl) end group observed by proton NMR methods (signals observed in the region of about 5.0 to about 6 ppm relative to TMS).

EXAMPLES 29–34

Catalyst A with different levels of either dodecyl or hexadecyl norbornene comonomer and decene-1

The following examples demonstrate the effects of an α-olefin and a 5-alkylnorbornene comonomer on polymer glass transition temperature and molecular weight. All the polymerizations were run, in 100 ml glass vials, at ambient temperature in 1,2-dichloroethane (40 ml) using a magnetic stir bar for agitation. The components were added in the following order: norbornenes, decene-1, 1,2-dichloroethane, catalyst A (4.6 mg dissolved in 3 ml 1,2-dichloroethane). The reactions were run for 1 hour after which methanol was injected to terminate the reaction and the polymer was washed with excess methanol and dried. The results are set forth in Table 4 below.

TABLE 4

| Ex. # | NB (g) | Decene-1 (ml) | 5-alkyl-NB (type, ml) | Polymer yield, (g) | $M_w \times 10^{-3}$ | $M_n \times 10^{-3}$ | $T_g$, °C. |
|---|---|---|---|---|---|---|---|
| 29 | 4.16 | 0.1 | dodecyl, 2.41 | 1.1 | 228 | 120 | 272 |
| 30 | 4.4 | 0.05 | dodecyl, 1.61 | 4.95 | 322 | 142 | n.d. |
| 31 | 4.74 | 0.15 | dodecyl, 0.5 | 4.8 | 137 | 63 | n.d. |
| 32 | 4.4 | 0.1 | hexadecyl, 1.93 | 4 | 179 | 104 | 286 |
| 33 | 4.16 | 0.1 | hexadecyl, 2.9 | 4.95 | 153 | 82 | 243 |
| 34 | 3.7 | 0.1 | hexadecyl, 4.85 | 2.7 | 147 | 87 | 179 |

In a manner analogous to that which produces a hexadecyl substituent and the desired copolymer, a polymer with a $C_{20}$ (eicosyl) substituent in a repeating unit is made. Even longer chains may be used as substituents if desired, but there is no substantial difference in properties of a copolymer with >20 C atoms over one which has 20, and therefore no economic incentive to make a copolymer with a chain longer than 20 carbon atoms.

EXAMPLES 35–38

Catalyst A with different levels of decene-1

The following examples demonstrate the effects of various levels of an α-olefin (decene-1) on homopolymer molecular weight. All the polymerizations were run, in a 50 ml glass vial, at ambient temperature in 1,2-dichloroethane (25 ml) using a magnetic stir bar for agitation. The components were added in the following order: norbornene, decene-1, 1,2-dichloroethane, catalyst A (2.2 mg dissolved in 3 ml 1,2-dichloroethane). The reactions were run for 1 hour after which methanol was injected to terminate the reaction and the polymer was washed with excess methanol and dried.

The results are set forth in Table 5 below.

TABLE 5

| Ex. # | Norbornene (g, mmol) | Decene-1, (g, mmol) | Conv'n (%) | $M_w \times 10^{-3}$ | $M_n \times 10^{-3}$ |
|---|---|---|---|---|---|
| 35 | 2.29, 24.3 | 0.1, 0.7 | 93 | 80 | 33 |
| 36 | 2.32, 24.6 | 0.053, 0.38 | 97 | 151 | 56 |
| 37 | 2.33, 24.8 | 0.035, 0.25 | 94 | 205 | 78 |
| 38 | 2.34, 24.9 | 0.018, 0.125 | 99.6 | 354 | 130 |

EXAMPLE 39

Use of Catalyst A with commercially available NB.

This example is presented as evidence of the excellent resistance to deactivation exhibited by the novel catalysts. Commercially available NB is used as received, without any pretreatment to remove impurities which might be present. The NB produced a homopolymer with excellent conversion. This demonstrates the substantial immunity of the catalyst to impurities conventionally present in commercial NB.

A procedure analogous to that in examples 35 to 38 was used here, except that the NB was used as received (from Aldrich Chemical Company). The high conversion demonstrates the high tolerance of these catalysts towards impurities.

The results are set forth in Table 6 below.

TABLE 6

| Ex. # | Norbornene (g, mmol) | Decene-1, (g, mmol) | Conv'n (%) | $M_w \times 10^{-3}$ | $M_n \times 10^{-3}$ |
|---|---|---|---|---|---|
| 39 | 2.32, 24.6 | 0.1, 0.7 | 93 | 105 | 45 |

EXAMPLES 40–42

(Comparative examples)

The attempted polymerizations were run, in a 50 ml glass vial, at ambient temperature in toluene (25 ml) using a magnetic stir bar for agitation. The components were added in the following order: norbornene, diluent, catalyst. No molecular weight modifier was used. The reactions were run for 3 hours. With these exceptions the procedure used was that of examples 35–38. At the end of 3 hours methanol was injected to kill the reaction, in every case no polymer was formed.

In experiment 40 catalyst J was used with toluene as the reaction solvent. This illustrates that an anionic nickel complex is ineffective in the polymerization of norbornene.

In experiment 41 catalyst K was used and in experiment 42 bis(cyclooctadiene)nickel was used, in both cases dichloroethane was applied as the reaction diluent. These two experiments illustrate that neutral nickel complexes and those with more-coordinating anions (trifluoroacetate) are ineffective catalysts for the polymerization of norbornene.

EXAMPLE 43

This example demonstrates the copolymerization of norbornene and ethylidenenorbornene (ENB). The polymerization was run, in a 100 ml glass vial, at ambient temperature in 1,2-dichloroethane (50 ml) using a magnetic stir bar for agitation. The components were added in the following order: norbornene (4.2 g, 45 mmol, used as received without further purification), ENB (0.6 g, 5 mmol), decene-1 (0.14 g, 1 mmol), 1,2-dichloroethane, catalyst A (9.2 mg dissolved in 5 ml 1,2-dichloroethane). The reaction was run for 1 hour after which ethanol was injected to kill the reaction and the polymer was washed with excess acetone and dried. The polymer was characterized by proton NMR methods and found to contain 7% mole of ENB.

EXAMPLE 44

This example demonstrates the homopolymerization of ethylidenenorbornene (ENB). The polymerization was run, in a 50 ml glass vial, at ambient temperature using a magnetic stir bar for agitation. The components were added in the following order: ENB (12 g, 100 mmol), and catalyst A (18 mg dissolved in 1 ml 1,2-dichloroethane). The reaction was run for 1 hour after which ethanol was injected to kill the reaction and the polymer was dissolved in toluene and precipitated with acetone, washed with acetone and dried in vacuum to afford the product, poly(ethylidenenorbornene) (8.4 g, 70% yield) as a white powder.

EXAMPLE 45

To a 50 ml glass vial equipped with a magnetic stir bar was added norbornene (7.5 g, 80 mmol), tetracyclododecene (3.2 g, 20 mmol) and 1,2-dichloroethane (25 ml). To this stirred mixture (a colorless liquid) was added, at ambient temperature, catalyst A (9 mg in 1 ml methylene chloride). The polymer precipitated from solution within 2 min and the reaction was terminated after 60 min. The resulting polymer was not further characterized.

EXAMPLE 46

To a 50 ml glass vial equipped with a magnetic stir bar was added norbornene (8.5 g, 90 mmol), methyltetracyclododecene (1.7 g, 10 mmol) and 1,2-dichloroethane (25 ml). To this stirred mixture (a colorless liquid) was added, at ambient temperature, catalyst A (18 mg in 1 ml dichloroethane). After 90 mins the viscous solution was added to excess acetone and the polymer precipitated. The polymer was washed with excess acetone and dried. It was characterized by proton NMR methods to be a copolymer of norbornene and methyltetracyclododecene and was found to have $M_w$ 360,000 and $M_n$ 150,000.

EXAMPLES 47–51

In these examples varying levels of an α-olefin (decene-1) are used to control the molecular weight to assorted desired values. In addition various levels of 5-decylnorbornene comonomer are applied to control the polymer glass transition temperature. In each experiment a third monomer was used as a minor component, such that the resulting polymers are terpolymers. The third monomer applied in every case was the trimer of cyclopentadiene (in fact a mixture of various isomers including both symmetric and asymmetric structures) which can be prepared by heat- soaking of dicyclopentadiene followed by distillation. All the polymerizations were run, in a 50 ml glass vial, at ambient temperature in 1,2-dichloroethane (25 ml) using a magnetic stir bar for agitation. The components were added in the following order: norbornenes, decene-1, 1,2-dichloroethane, catalyst A (2.2 mg, 0.006 mmol dissolved in 0.5 ml 1,2-dichloroethane). The reactions were run for 1 hour after which methanol was injected to kill the reaction and the polymer was washed with excess methanol and dried.

In the polymer chains formed in each of the foregoing examples, whether homopolymer or copolymer, there is essentially no repeating unit which is linked in the chain by virtue of being ring-opened as in a metathesis polymerization. By "essentially no repeating unit" is meant that there is no evidence in a NMR spectroscopic analysis of a linked ring-opened unit. From this it is concluded that there is less than 1 mol % of a ring-opened repeating unit. Therefore all addition polymers made using the process of this invention are characterized by having less than 1 mole % of a ring-opened comonomer, preferably less than 100 ppm.

Further, addition polymers of this invention are made in yields of at least 50 mol % preferably 80 mol % conversion of monomers to polymer, most preferably more than 90 mol %, and most preferably more than 95 mol %.

TABLE 7

| Ex. # | Norbornene (g, mmol) | Decene-1 (g, mmol) | 5-Decyl-norbornene, (g, mmol) | CPD trimers, (g, mmol) | Poly. yield, (g) | Conv (%) | $M_w \times 10^{-3}$ | $M_n \times 10^{-3}$ | $T_g$, °C. |
|---|---|---|---|---|---|---|---|---|---|
| 47 | 2.2, 23.3 | 0.07, 0.5 | 0.276, 1.19 | 0.012, 0.06 | 2.22 | 89 | 106 | 50 | 337 |
| 48 | 2.32, 24.6 | 0.035, 0.25 | 0.03, 0.125 | 0.001, 0.006 | 2.16 | 92 | 195 | 80 | 353 |
| 49 | 2.31, 24.5 | 0.053, 0.38 | 0.03, 0.125 | 0.001, 0.006 | 2.18 | 93 | 124 | 44 | 351 |
| 50 | 2.25, 23.9 | 0.053, 0.38 | 0.17, 0.71 | 0.008, 0.04 | 2.19 | 90 | 125 | 54 | 356 |
| 51 | 1.98, 21.1 | 0.018, 0.125 | 0.832, 3.56 | 0.037, 0.19 | 2.49 | 87 | 310 | 129 | 285 |

EXAMPLE 52

To a 100 ml glass vial equipped with a magnetic stir bar was added norbornene (4 g, 42.5 mmol), dichloroethane (40 ml) and 5-nonafluorobutylnorbornene (3.3 g, 10.62 mmol). To this stirred solution was added, at ambient temperature, catalyst A (13 mg, 0.035 mmol in 2 ml dichloroethane). Immediately upon addition of the catalyst polymer started to precipitate from solution. After 90 minutes the slurry was added to excess acetone and the polymer was collected by filtration. The polymer was washed with excess acetone and dried. The yield of the copolymer was 5.4 g (74%). The product was characterized by IR and NMR methods ($^1$H, $^{13}$C and $^{19}$F) as being a copolymer of norbornene and 5-nonafluorobutylnorbornene, and exhibited a $T_g$ of 303° C.

EXAMPLE 53

To a 50 ml glass vial equipped with a magnetic stir bar was added norbornene (7.5 g, 80 mmol), 1-decene (0.072 g, 0.5 mmol) and 1,2-dichloroethane (20 ml). To this stirred solution was added, at ambient temperature, catalyst L (15 mg in 5 ml 1,2-dichloroethane). After 1 hour the reaction was stopped by adding ethanol and the polymer was was isolated by adding to a large excess of acetone, filtered, washed and dried.

EXAMPLE 54

To a 100 ml glass vial equipped with a magnetic stir bar was added norbornene (15 g, 160 mmol), 1-decene (0.144 g, 1 mmol) and 1,2-dichloroethane (20 ml). To this stirred solution was added, at ambient temperature, catalyst M. After 1 hour the reaction was stopped by adding ethanol and the polymer was was isolated by adding to a large excess of acetone, filtered, washed and dried.

EXAMPLES 55–60

The following examples illustrate the large conversion-enhancing effect of using a polar diluent (1,2-dichloroethane, DCE, was used) rather than a non-polar hydrocarbon (toluene, TOL, was used in the examples) when (co)polymerizing norbornenes using a catalyst comprising a group VIII metal salt in combination with a methaluminoxane. In every example nickel ethylhexanoate (catalyst F) was used in combination with methaluminoxane (MAO, 10% solution in toluene). All examples were (co-)polymerizations of norbornene (NB) and 5-decylnorbornene (NB-10).

The $T_g$ of the polymer from example 58 was 170° C.

Though conversion of monomer(s) to polymer in a non-polar hydrocarbyl solvent is generally about 80 mole %, the conversion of some monomers to homopolymers, and of some combinations of monomers to copolymers may be in the range from 40–50 mole %. Such non-polar solvents are typically ($C_3$–$C_{12}$)alkane, or ($C_6$–$C_{20}$) aromatic solvents. In those instances where the conversion in a non-polar hydrocarbyl solvent are less than 50 mole %, at least a 50% improvement in conversion is realized in a polar halohydrocarbyl solvent. Such polar solvents are typically halo($C_1$–$C_4$)alkane, and ($C_6$-$C_{20}$) haloaromatic solvents. Effective polar hydrocarbyl solvents are methylene chloride, 1,2-dichloroethane, 1,1,1-trichloroethane, perchloroethylene and haloaromatic solvents such as chlorobenzene, dichlorobenzene and trichlorobenzene. In some instances the conversion can be doubled, that is a 100% improvement can be realized, by choice of the optimum polar solvent.

TABLE 8

| Ex. # | Cat. F, mmol | MAO, ml. | Diluent | NB, g, mmol | NB-10, g, mmol | NB-10, mol % | Time, h | Polymer Yield, g | Conv'n. % |
|---|---|---|---|---|---|---|---|---|---|
| 55 | 13 × 10$^{-3}$ | 1 | TOL | 3.7, 39.8 | 3.1, 13.3 | 25 | 2 | 1.8 | 26 |
| 56 | 13 × 10$^{-3}$ | 1 | DCE | 3.7, 39.8 | 3.1, 13.3 | 25 | 2 | 6.2 | 91 |
| 57 | 13 × 10$^{-3}$ | 1 | TOL | 2.5, 26.5 | 6.2, 26.5 | 50 | 2 | 0.85 | 9.7 |
| 58 | 13 × 10$^{-3}$ | 1 | DCE | 2.5, 26.5 | 6.2, 26.5 | 50 | 2 | 7.7 | 89 |
| 59 | 12 × 10$^{-3}$ | 1 | TOL | 0, 0 | 5.8, 25 | 100 | 24 | 0.8 | 14 |
| 60 | 6.5 × 10$^{-3}$ | 0.5 | DCE | 0, 0 | 6.2, 26.5 | 100 | 2 | 3.8 | 61 |

EXAMPLE 61

To a 50 ml glass vial equipped with a magnetic stir bar was added norbornene (1.8 g, 18.8 mmol), 1-decene (0.04 g, 0.31 mmol), 5-decylnorbornene (1.46 g, 6.2 mmol) and 1,2-dichloroethane (25 ml). To this stirred solution was added, at ambient temperature, catalyst C (13.2 mg, 0.012 mmol in 2 ml 1,2-dichloroethane). After 1 hour the reaction was stopped by adding ethanol and the polymer was was isolated by adding to a large excess of acetone, filtered, washed and dried (yield 2.65 g, 81%).

EXAMPLE 62

The procedure used in Examples 49–51, in which the polymerizations were run in a 50 ml glass vial, at ambient temperature in 1,2-dichloroethane (25 ml) was repeated, substituting the same molar equivalents of norbornadiene for the trimer used in each example, and in each case, a terpolymer was obtained which had about the same $T_g$ as the corresponding terpolymer with trimer.

EXAMPLE 63

(Comparative example)

To a 100 ml glass vial was added norbornene (5 g, 53.1 mmol) and hexane (45 ml). To this solution was added catalyst N (Manganese Lin-All in mineral spirits) (0.024 g, 0.026 mmol) followed by MAO (1.0 ml of a 10% solution in toluene). After 90 minutes the reaction was stopped by adding ethanol. The mass of polymer was thoroughly washed with acetone and methanol and then dried in a vacuum oven. The polymer yield was roughly 1.5 g (30%). The polymer was characterized by proton NMR methods (o-dichlorobenzene solvent) to contain a high level of backbone olefinic unsaturation indicative of ROMP polymerization. Indeed the polymer composition corresponded to about 80% ring-opening (ROMP) and only 20% addition.

EXAMPLE 64

(Comparative example)

To a 100 ml glass vial was added norbornene (5 g, 53.1 mmol) and toluene (75 ml). To this solution was added catalyst 0 (Molybdenum Hex-Cem in mineral spirits) (0.016 g, 0.026 mmol) and decene-1 (1 ml) followed by MAO (1.0 ml of a 10% solution in toluene). After 90 minutes the reaction was stopped by adding ethanol. The resulting mass was a very viscous gel, indicating high conversion. A sample of the polymer was precipitated from solution with methanol and then thoroughly washed with acetone and methanol and then dried in a vacuum oven. The polymer was characterized by proton NMR methods (o-dichlorobenzene solvent) to contain a high level of backbone olefinic unsaturation indicative of ROMP polymerization. Indeed the polymer composition corresponded to about 75% ring-opening (ROMP) and only 25% addition.

EXAMPLE 65

Preparation of AlF$_3$ support

To a 500 ml round-bottomed flask containing dry toluene (100 ml) under an argon atmosphere was added BF$_3$•etherate (11 g, 78 mmol). To this mixture (with stirring) was added dropwise, at ambient temperature a 10% wt solution of triethylaluminum (78 mmol) in toluene. After complete addition the solvent was removed under vacuum at ambient temperature to afford the aluminum trifluoride support as a free-flowing, fine powder containing small amounts of bound toluene (approximately 0.5–0.6 mole toluene per mole aluminum trifluoride).

Preparation of supported catalyst

To a flask containing (under argon) the aluminum trifluoride support (1.4 g, 10 mmol) was added catalyst A ([(η$^3$-crotyl)(cycloocta-1,5-diene)nickel]hexafluorophosphate, 0.2 g, 0.5 mmol) followed by dry toluene up to a level approximately 2 cm above the solids. The mixture was then stirred and then allowed to stand overnight at ambient temperature. The mixture was then filtered, the solid washed with diethyl ether until the ether filtrate was totally colorless and the solid dried under vacuum to afford the catalyst as a dry powder.

Homopolymerization of norbornene

To a 50 ml glass vial containing a magnetic stir bar and norbornene (3.2 g, 33.3 mmol) was added dichloroethane (25 ml) followed by the supported catalyst (17 mg suspended in 1 ml dichloroethane). After two hours ethanol was injected to terminate the reaction and the polymer was washed with excess acetone, filtered and dried overnight, under vacuum at 80° C. The yield of poly(norbornene) was 1.8 g, 56%.

EXAMPLE 66

Preparation of catalyst

Nickel ethylhexanoate in mineral spirits (4.6 ml, 4.3 g, 6 mmol of nickel) was added to a flask under a nitrogen atmosphere and diluted with toluene (about 20 ml). To this solution was added a solution of BF$_3$•etherate (1.13 ml, 1.3 g, 9 mmol) in toluene, causing the original green solution to turn yellow-green in color. Butadiene was then bubbled through the solution for approximately 5 seconds. The flask then briefly evacuated and refilled with nitrogen to remove excess butadiene. To this solution was slowly added triethylaluminum (10 mmol) diluted to about 10% wt in toluene while the flask was cooled in ice-water. The resulting solution was a dark-brown/black solution of the catalyst in toluene.

Homopolymerization of norbornene

To a 50 ml glass vial containing a magnetic stir bar and norbornene (2.3 g, 24 mmol) was added dichloroethane (25 ml) followed by the catalyst (approximately 0.012 mmol). After two hours ethanol was injected to terminate the reaction and the polymer was washed with excess acetone, filtered and dried overnight, under vacuum at 80° C. The yield of poly(norbornene) was 1.6 g, 70%.

EXAMPLE 67

Preparation of catalyst

To the catalyst described in example 66 (1 mmole of nickel) was added neat hexafluoroantimonic acid (HSbF$_6$, 0.12 g, 0.5 mmole) to afford the catalyst as a solution or colloidal slurry in toluene.

Homopolymerization of norbornene

To a 50 ml glass vial containing a magnetic stir bar and norbornene (2.3 g, 24 mmol) was added dichloroethane (25 ml) followed by the catalyst (approximately 0.012 mmol). After two hours ethanol was injected to terminate the reaction and the polymer was washed with excess acetone, filtered and dried overnight, under vacuum at 80° C. The yield of poly(norbornene) was 2.3 g, 100%.

EXAMPLES 68 and 69

Preparation of catalyst, (η3, η2, η2-dodeca-2(E),6(E), 10(Z)-triene-1-ylnickel hexafluoroantimonate)

Bis(cyclooctadiene)nickel was placed in an argon-filled Kjeldahl flask and cooled with dry ice. Butadiene was condensed into the flask to a level approximately 2 cm above the level of the yellow solid. The butadiene was then refluxed (ambient temperature) for about 2 days after which time the yellow solid had been converted into a red oil. The mixture was filtered through a dry-ice cooled frit (under argon) to remove solid impurities, then the butadiene was evaporated off and replaced with twice the volume of pentane. After repeated crystallizations in pentane and diethylether at −78° C. the product was isolated as a red oil with a melting point of about −1° C. This product is shown in the following figure and has the empirical formula C$_2$H$_{18}$Ni. To a cooled solution of C$_{12}$H$_{18}$Ni (approximately 10 mmole) in diethyl ether (20 ml) at −78° C. was slowly added hexafluoroantimonic acid (2.3 g, 10 mmole). The resulting mixture comprised a light brown solid and a reddish-brown solution. After warming to room temperature the ether was decanted off and the brown oil, was cooled back down to −78° C. at which temperature it resolidified. Methylene chloride was slowly added and the the remaining solid was removed by filtration to afford the catalyst C$_{12}$H$_{19}$NiSbF$_6$ as a solution. The catalyst was precipitated as an orange brown solid by adding a five-fold volume excess of diethyl ether, decanting and drying. The net reaction is shown in the following figure:

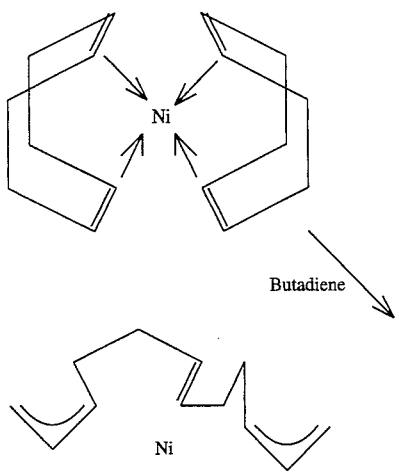

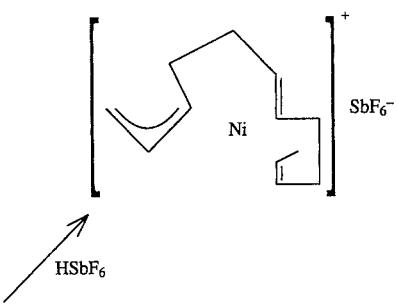

Homopolymerization of norbornene

Example 68: To a 50 ml glass vial containing a magnetic stir bar and norbornene (2.3 g, 24 mmol) was added dichloroethane (25 ml) followed by the catalyst (approximately 0.012 mmol). After two hours ethanol was injected to terminate the reaction and the polymer was washed with excess acetone, filtered and dried overnight, under vacuum at 80° C. The yield of poly(norbornene) was 2.3 g, 100%.

Copolymerization of norbornene and 5-decylnorbornene

Example 69: To a 50 ml glass vial containing a magnetic stir bar and norbornene (1.8 g, 18.8 mmol) and 5-decylnorbornene (1.46 g, 6.2 mmole) was added dichloroethane (25 ml) followed by the catalyst (approximately 0.012 mmol). After two hours ethanol was injected to terminate the reaction and the polymer was washed with excess acetone, filtered and dried overnight, under vacuum at 80° C. The yield of poly(norbornene) copolymer was 2.9 g, 89%.

EXAMPLE 70

Preparation of catalyst

Nickel ethylhexanoate in mineral spirits (0.72 ml, 1 mmol of nickel) was added to a flask under a nitrogen atmosphere and diluted with toluene (about 20 ml). To this solution was added a solution of $BF_3$•etherate (1.13 ml, 1.3 g, 9 mmol) in toluene, causing the original green solution to turn yellow-green in color. Butadiene was then bubbled through the solution for approximately 5 seconds. The flask then briefly evacuated and refilled with nitrogen to remove excess butadiene. To this solution was slowly added triethylaluminum (10 mmol) diluted to about 10% wt in toluene while the flask was cooled in ice-water. The resulting solution was a dark-brown/black solution of the catalyst in toluene. To this solution was added triethylaluminum (1 ml of 1M solution in toluene) followed by 0.07 g (0.5 mmole) of $HPF_6$ (60% wt in water).

Homopolymerization of norbornene

To a 50 ml glass vial containing a magnetic stir bar and norbornene (2.3 g, 24 mmol) was added 1-decene (0.043 g, 0.31 mmole) and dichloroethane (25 ml) followed by the catalyst (approximately 0.012 mmol). After two hours ethanol was injected to terminate the reaction and the polymer was washed with excess acetone, filtered and dried overnight, under vacuum at 80° C. The yield of poly(norbornene) was 1.71 g, 74%.

EXAMPLE 71

Preparation of catalyst

Hexafluoroantimonic acid ($HSbF_6$, 0.708 g, 3 mmole) was placed in a dry, nitrogen filled Teflon® bottle with a Teflon® cap/valve containing a magnetic stir-bar. The bottle was cooled in alcohol/dry ice and nickel ethylhexanoate (8% in mineral spirits, 2.3 ml, 3 mmole) was added and the contents were allowed to warm to room temperature.

Copolymerization of norbornene and 5-decylnorbornene

To a 250 ml glass polymerization vessel fitted with a mechanical stirrer and baffles was added a 75/25 mol/mol % mixture of norbornene and 5-decylnorbornene (10 g), 1-decene ($M_w$ control agent, 0.073 ml, 0.39 mmole) and 1,2-dichloroethane (88 ml). To this stirred solution was added the above catalyst (0.016 ml, 0.019 mmole) followed by $BF_3$•etherate (0.021 ml, 0.17 mmole) and triethylaluminum (1.7 molar in cyclohexane, 0.11 ml, 0.19 mmole). The ratio of the catalyst components (Ni:B:Al) was 1:9:10 and the ratio of the monomers to catalyst (norbornenes to Ni) was 4,000:1. The polymerization ensued immediately upon addition of the aluminum alkyl with an immediate exotherm from ambient temperature (20° C.) to almost 40° C.

After 1 hour the polymerization was terminated by addition of ethanol. The polymer was isolated by filtration and washed with excess ethanol before drying at 80° C. under vacuum overnight to afford the copolymer product (9.2 g, 92% yield).

EXAMPLE 72

Preparation of catalyst

Hexafluoroantimonic acid ($HSbF_6$, 1.126 g, 4.76 mmole) was placed in a dry, nitrogen filled Teflon® bottle with a Teflon® cap/valve containing a magnetic stir-bar. The bottle was cooled in alcohol/dry ice and nickel ethylhexanoate (8% in mineral spirits, 4.76 mmole) was added and the contents were allowed to warm to room temperature.

Copolymerization of norbornene and 5-decylnorbornene

To a 250 ml glass polymerization vessel fitted with a mechanical stirrer and baffles was added a 75/25 mol/mol % mixture of norbornene and 5-decylnorbornene (10 g) and 1,2-dichloroethane (138 ml). To this stirred solution at 0° C. was added the above catalyst (0.016 ml, 0.019 mmole) followed by $BF_3$•etherate (0.021 ml, 0.17 mmole) and triethylaluminum (1.0 molar in toluene, 0.19 ml, 0.19 mmole). The ratio of the catalyst components (Ni:B:Al) was 1:9:10 and the ratio of the monomers to catalyst (norbornenes to Ni) was 4,000:1. The polymerization ensued immediately upon addition of the aluminum alkyl with an immediate exotherm from 0° C. to about 12° C.

After 1 hour the polymerization was terminated by addition of ethanol. The polymer was isolated by filtration and washed with excess ethanol before drying at 80° C. under vacuum overnight to afford the copolymer product (8.7 g, 87% yield).

EXAMPLE 73

Preparation of catalyst

The catalyst was prepared as described in example 72.

Copolymerization of norbornene and 5-decylnorbornene

To a 250 ml glass polymerization vessel fitted with a mechanical stirrer and baffles was added methylene chloride (88 ml). To this stirred diluent at 0° C. was added the above catalyst (0.032 ml, 0.038 mmole) followed by $BF_3$•etherate (0.042 ml, 0.34 mmole) and triethylaluminum (1.0 molar in toluene, 0.38 ml, 0.38 mmole). The ratio of the catalyst components (Ni:B:Al) was 1:9:10. To the catalyst solution at 0° C. was slowly added (over 5 minutes) a mixture of a 75/25 mol/mol % mixture of norbornene and 5-decylnorbornene (20 g, 154.6 mmoles of norbornenes) and 1-decene (0.146 ml, 0.78 mmole) such that the final ratio of monomers to catalyst (norbornenes to Ni) was 4,000:1. The polymerization ensued immediately upon addition of the first drops of monomer mixture with exhibition of an exotherm from 0° C. to about 12° C.

After 1 hour the polymerization was terminated by addition of ethanol. The polymer was isolated by filtration and washed with excess ethanol before drying at 80° C. under vacuum overnight to afford the copolymer product (17.5 g, 88% yield).

EXAMPLE 74

Preparation of Catalyst

Hexafluoroantimonic acid ($HSbF_6$, 1.126 g, 4.76 mmole) was placed in a dry, nitrogen filled Teflon® bottle with a Teflon® cap/valve containing a magnetic stir-bar. The bottle was cooled in alcohol/dry ice and nickel ethylhexanoate (8% in mineral spirits, 4.76 mmole) was added and the contents were allowed to warm to room temperature.

Copolymerization of norbornene and 5-decylnorbornene

To a 250 ml glass polymerization vessel fitted with a mechanical stirrer and baffles was added a 75/25 mol/mol % mixture of norbornene and 5-decylnorbornene (15 g) and methylene chloride (82 ml). To this stirred solution at −10° C. was added the above catalyst (0.024 ml, 0.029 mmole) followed by $BF_3$•etherate (0.032 ml, 0.26 mmole) and triethylaluminum (1.0 molar in toluene, 0.29 ml, 0.29 mmole). The ratio of the catalyst components (Ni:B:Al) was 1:9:10 and the ratio of the monomers to catalyst (norbornenes to Ni) was 4,000:1. The polymerization ensued immediately upon addition of the aluminum alkyl with an immediate exotherm from −10° C. to about 22° C.

After 1 hour the polymerization was terminated by addition of ethanol. The polymer was isolated by filtration and washed with excess ethanol before drying at 80° C. under vacuum overnight to afford the copolymer product (12.5 g, 83% yield).

EXAMPLE 75

Preparation of catalyst

Hexafluoroantimonic acid ($HSbF_6$, 0.55 g, 2.32 mmole) was placed in a dry, nitrogen filled Teflon® bottle with a Teflon® cap/valve containing a magnetic stir-bar. The bottle was cooled in alcohol/dry ice and nickel ethylhexanoate (8% in mineral spirits, 2.32 mmole) was added and the contents were allowed to warm to room temperature. After 2 hours at ambient temperature the catalyst was stored at −18° C.

Copolymerization of norbornene and 5-decylnorbornene

To a 250 ml glass polymerization vessel fitted with a mechanical stirrer and baffles was added a 58/42 mol/mol % mixture of norbornene and 5-decylnorbornene (16.2 g), 1-decene (0.073 ml, 0.39 mmole) and 1,2-dichloroethane (146 ml). To this stirred solution at 20° C. was added the above catalyst (0.016 ml, 0.019 mmole) followed by $BF_3$•etherate (0.021 ml, 0.17 mmole) and triethylaluminum (1.7 molar in cyclohexane, 0.11 ml, 0.19 mmole). The ratio of the catalyst components (Ni:B:Al) was 1:9:10 and the ratio of the monomers to catalyst (norbornenes to Ni) was 4,000:1. The polymerization ensued immediately upon addition of the aluminum alkyl with an immediate exotherm from 20° C. to about 33° C.

After 1 hour the polymerization was terminated by addition of ethanol. The polymer was isolated by filtration and washed with excess ethanol before drying at 80° C. under vacuum overnight to afford the copolymer product (12.4 g, 77% yield). The molecular weight of the copolymer was measured by GPC and found to be 386,000 ($M_w$, the $M_n$ was 104,000).

EXAMPLES 76 and 77

Preparation of catalyst

Hexafluoroantimonic acid ($HSbF_6$, 1.126 g, 4.76 mmole) was placed in a dry, nitrogen filled Teflon® bottle with a Teflon® cap/valve containing a magnetic stir-bar. The bottle was cooled in alcohol/dry ice and nickel ethylhexanoate (8% in mineral spirits, 4.76 mmole) was added and the contents were allowed to warm to room temperature.

Copolymerization of norbornene and 5-decylnorbornene

Example 76: To a 5 liter stainless steel polymerization vessel fitted with a mechanical stirrer and baffles was added norbornene (305 g, 3.24 Mole), 5-decylnorbornene (256 g, 1.092 Mole), 1-decene (8.19 ml, 43.3 mmole) and methylene chloride (to give a total liquid volume of 4.2 liters). To this stirred solution at −11° C. was added the above catalyst (1.05 g, 1.082 mmole) dissolved in methylene chloride (3 ml) followed by $BF_3$•etherate (1.19 ml, 9.74 mmole) and triethylaluminum (1.0 molar in heptane, 10.82 ml, 10.82 mmole). The ratio of the catalyst components (Ni:B:Al) was 1:9:10 and the ratio of the monomers to catalyst (norbornenes to Ni) was 4,000:1. The polymerization ensued immediately upon addition of the aluminum alkyl and the reaction was killed after 1 hour by addition of ethanol. The resulting polymer was washed twice with an excess of ethanol, filtered and dried overnight under vacuum at 80° C. The polymer yield was 510 g which represents a conversion of 91%. The polymer molecular weight was determined by GPC methods to be 204,000 ($M_w$, $M_n$=97,100).

Example 77: To a 500 ml glass polymerization vessel fitted with a mechanical stirrer and baffles was added norbornene (43.5 g), 5-decylnorbornene (36.5 g), 1-decene (1.17 ml) and methylene chloride (to give a total liquid volume of 400 ml). To this stirred solution at 0° C. was added the above catalyst (0.146 g, 0.15 mmole) dissolved in methylene chloride (2.5 ml) followed by $BF_3$•etherate (0.17 ml, 1.35 mmole) and triethylaluminum (1.0 molar in heptane, 1.5 ml, 1.5 mmole). The ratio of the catalyst components (Ni:B:Al) was 1:9:10 and the ratio of the monomers to catalyst (norbornenes to Ni) was 4,000:1. The polymerization ensued immediately upon addition of the aluminum alkyl and the reaction was killed after 1 hour by addition of ethanol. The resulting polymer was washed twice with an excess of ethanol, filtered and dried overnight under vacuum at 80° C. The polymer yield was 79.5 g which represents a conversion of 99%.

EXAMPLES 78 and 79

Preparation of catalyst

Hexafluoroantimonic acid (HSbF$_6$, 1.42 g, 6 mmole) was placed in a dry, nitrogen filled Teflon® bottle with a Teflon® cap/valve containing a magnetic stir-bar and nickel ethylhexanoate (8% in mineral spirits, 6 mmole) was added at ambient temperature and the contents (red-brown in color) were allowed to stir at room temperature for 3 hours. The mixture was then diluted with 1,2 dichloroethane to a concentration of 0.3 Molar and transferred to a glass vessel for storage.

Example 78

Homopolymerization of norbornene using Triethylaluminum as Cocatalyst

To a 100 ml glass vial equipped with a magnetic stir-bar was added norbornene (5 g, 53.1 mmol) and 1,2 dichloroethane (40 ml). Thereafter was added the catalyst (0.026 mmol) immediately followed by triethylaluminum (2.6 ml of 0.5 Molar solution in hexanes, 1.3 mmol). There ensued a very rapid and exothermic polymerization with quantitative conversion of the monomer.

Example 79

Homopolymerization of norbornene using Diethylaluminum chloride as Cocatalyst

To a 100 ml glass vial equipped with a magnetic stir-bar was added norbornene (5 g, 53.1 mmol) and 1,2 dichloroethane (40 ml). Thereafter was added the catalyst (0.026 mmol) immediately followed by diethylaluminum chloride (neat, 0.65 mmol). There ensued a very rapid and exothermic polymerization with quantitative conversion of the monomer within 5 minutes. The molecular weight of the isolated polymer ($M_w$) was 694,000.

EXAMPLE 80

Preparation of catalyst

Hexafluoroantimonic acid (HSbF$_6$, 1.29 g, 5.45 mmole) was placed in a dry, nitrogen filled Teflon® bottle with a Teflon® cap/valve containing a magnetic stir-bar and nicked ethylhexanoate (8% in mineral spirits, 5.45 mmole) was added at ambient temperature and the contents (red-brown in color) were allowed to stir at room temperature for 2 hours. BF$_3$•etherate (6.28 ml, 49.05 mmol) was added and the mixture was allowed to stir for a further 2 hours.

Copolymerization of norbornene and 5-decylnorbornene using Triethylaluminum as Cocatalyst To a 100 ml glass vial equipped with a magnetic stir-bar was added norbornene (3.7 g), 5-decylnorbornene (3.6 ml) and 1,2 dichloroethane (40 ml). Thereafter was added the catalyst (0.013 mmol) immediately followed by triethylaluminum (0.26 ml of 0.5 Molar solution in hexanes, 0.13 mmol). There ensued a rapid and exothermic polymerization which was terminated with methanol after 2 hours. The polymer was washed with methanol and then acetone and dried overnight at 80° C. under vacuum. The polymer (4.8 g was recovered) showed a molecular weight of 467,000 ($M_w$, $M_n$=147,000).

EXAMPLE 81–85

Preparation of catalyst

Hexafluoroantimonic acid (HSbF$_6$, 1.8 g, 7.6mmole) was placed in a dry, nitrogen filled Teflon® bottle with a Teflon® cap/valve containing a magnetic stir-bar followed by nickel ethylhexanoate (8% in mineral spirits, 5.06 mmole) and the resulting mixture mixture was stirred at ambient temperature for 2.5 hours.

Copolymerizations of norbornene and 5-decylnorbornene

Example 81: With triethylaluminum as cocatalyst:

To a 100 ml glass vial equipped with a magnetic stir-bar was added norbornene (3.7 g), 5-decylnorbornene (3.6 ml) and 1,2 dichloroethane (40 ml). Thereafter was added the catalyst (0.016 mmol) immediately followed by triethylaluminum (0.1 ml of 0.5 Molar solution in hexanes, 0.05 mmol). There ensued an extremely rapid and exothermic polymerization which was terminated with methanol after 1 hour. The polymer was washed with methanol and then acetone and dried overnight at 80° C. under vacuum. The polymer (6.1 g was recovered) showed a molecular weight of 738,000 ($M_w$, $M_n$=172,000).

Example 82: With triethylaluminum as cocatalyst:

To a 100 ml glass vial equipped with a magnetic stir-bar was added norbornene (3.7 g), 5-decylnorbornene (3.6 ml) and 1,2 dichloroethane (40 ml). Thereafter was added the catalyst (0.0073 mmol), BF$_3$•etherate (0.015 ml, 0.117 mmol) immediately followed by triethylaluminum (0.26 ml of 0.5 Molar solution in hexanes, 0.13 mmol). There ensued a very rapid and exothermic polymerization which was terminated with methanol after 1 hour. The polymer was washed with methanol and then acetone and dried overnight at 80° C. under vacuum. The polymer (6.05 g was recovered) showed a molecular weight of 674,000 ($M_w$, $M_n$=197,000).

Example 83: With triethylaluminum as cocatalyst:

To a 100 ml glass vial equipped with a magnetic stir-bar was added norbornene (3.7 g), 5-decylnorbornene (3.6 ml) and 1,2 dichloroethane (40 ml). Thereafter was added the catalyst (0.027 mmol), BF$_3$•etherate (0.015 ml, 0.117 mmol) immediately followed by triethylaluminum (0.26 ml of 0.5 Molar solution in hexanes, 0.13 mmol). There ensued a very rapid and exothermic polymerization which was terminated with methanol after 1 hour. The polymer was washed with methanol and then acetone and dried overnight at 80° C. under vacuum. The polymer (6.3 g was recovered, 93%) showed a molecular weight of 723,000 ($M_w$, $M_n$=141,000).

Example 84: With triethylaluminum as cocatalyst:

To a 100 ml glass vial equipped with a magnetic stir-bar was added norbornene (3.7 g), 5-decylnorbornene (3.6 ml) and 1,2 dichloroethane (40 ml). Thereafter was added the catalyst (0.015 mmol), BF$_3$•etherate (0.03 ml, 0.234 mmol) immediately followed by triethylaluminum (0.26 ml of 0.5 Molar solution in hexanes, 0.13 mmol). The ratio of the catalyst components (Ni:B:Al) was 1:15:17 and the ratio of the monomers to catalyst (norbornenes to Ni) was 3,600:1. There ensued a very rapid and exothermic polymerization which was terminated with methanol after 1 hour. The polymer was washed with methanol and then acetone and dried overnight at 80° C. under vacuum. The polymer (6.2 g was recovered, 92%) showed a molecular weight of 1,350,000 ($M_w$, $M_n$=310,000).

Example 85: With diethylaluminum chloride as cocatalyst:

To a 100 ml glass vial equipped with a magnetic stir-bar was added norbornene (3.7 g), 5-decylnorbornene (3.6 ml) and 1,2 dichloroethane (40 ml). Thereafter was added the catalyst (0.018 mmol), BF$_3$•etherate (0.015 ml, 0.117 mmol) immediately followed by neat diethylaluminum chloride(0.13 mmol). There ensued a very rapid and exothermic polymerization which was terminated with methanol after 1 hour. The polymer was washed with methanol and then acetone and dried overnight at 80° C. under vacuum. The polymer (5.1 g was recovered) showed a molecular weight of 238,000 ($M_w$, $M_n$=103,000).

EXAMPLES 86 and 87

Preparation of catalyst

Hexafluoroantimonic acid (HSbF$_6$, 1.92 g, 8.11 mmole) was placed in a dry, nitrogen filled Teflon® bottle with a Teflon® cap/valve containing a magnetic stir-bar followed by nickel ethylhexanoate (8% in mineral spirits, 4.05 mmole) and the resulting mixture mixture was stirred at ambient temperature for 2 hours.

Copolymerization of norbornene and 5-decylnorbornene

Example 86: With triethylaluminum as cocatalyst:

To a 100 ml glass vial equipped with a magnetic stir-bar was added norbornene (3.7 g), 5-decylnorbornene (3.6 ml) and 1,2 dichloroethane (40 ml). Thereafter was added the catalyst (0.013 mmol), BF$_3$•etherate (0.015 ml, 0.117 mmol) immediately followed by triethylaluminum (0.26 ml of 0.5 Molar solution in hexanes, 0.13 mmol). There ensued a very rapid and exothermic polymerization which was terminated with methanol after 1 hour. The polymer was washed with methanol and then acetone and dried overnight at 80° C. under vacuum. The polymer (6.3 g was recovered, 93%) showed a molecular weight of 1,270,000 ($M_w$, $M_n$=262,000).

Example 87: With triethylaluminum as cocatalyst:

To a 100 ml glass vial equipped with a magnetic stir-bar was added norbornene (3.7 g), 5-decylnorbornene (3.6 ml) and 1,2 dichloroethane (40 ml). Thereafter was added the catalyst (0.013 mmol) immediately followed by triethylaluminum (0.52 ml of 0.5 Molar solution in hexanes, 0.26 mmol). There ensued an extremely rapid and exothermic polymerization which was terminated with methanol after 1 hour. The polymer was washed with methanol and then acetone and dried overnight at 80° C. under vacuum. The polymer (6.2 g was recovered) showed a molecular weight of 931,000 ($M_w$, $M_n$=224,000).

EXAMPLE 88

Preparation of catalyst

Hexafluoroantimonic acid (HSbF$_6$, 0.45 g, 1.90 mmole) was placed in a dry, nitrogen filled Teflon® bottle with a Teflon® cap/valve containing a magnetic stir-bar and the contents were cooled to −27° C. Thereafter was added nickel ethylhexanoate (8% in mineral spirits, 1.9 mmole) and the resulting mixture was allowed to warm to ambient temperature and was then stirred at ambient temperature for 2 hours.

Homopolymerization of norbornene

To a 100 ml glass vial equipped with a magnetic stir-bar was added 1,2 dichloroethane (40 ml), norbornene (5 g, 53.1 mmole). Thereafter was added the catalyst (0.012 mmol), TiCl$_4$ (0.013 ml) immediately followed by triethylaluminum (1.3 ml of 0.1 Molar solution in heptane, 0.13 mmol). There ensued a slow polymerization which was terminated with methanol after 12 hour. The polymer was washed with methanol and then acetone and dried overnight at 80° C. under vacuum. The polymer yield amounted to 0.9 g (18%).

EXAMPLE 89

Preparation of Catalyst

Nickel ethylhexanoate in mineral spirits (1 mmol of nickel) was added to a flask under a nitrogen atmosphere and diluted with toluene (about 20 ml). To this solution was added a solution of BF$_3$•etherate (1.13 ml, 1.3 g, 9 mmol) in toluene, causing the original green solution to turn yellow-green in color. Butadiene was then bubbled through the solution for approximately 5 seconds. The flask then briefly evacuated and refilled with nitrogen to remove excess butadiene. To this solution was slowly added triethylaluminum (15 mmol) diluted to about 10% wt in toluene while the flask was cooled in ice water. To this solution was added neat HSbF$_6$ (0.48 g, 2 mmol). The resulting solution/slurry was a dark-brown/black solution or colloidal slurry of the catalyst in toluene.

Copolymerization of norbornene and 5-dodecylnorbornene

To a 50 ml glass vial containing a magnetic stir bar norbornene (1.8 g, 18.8 mmol) and 5-decylnorbornene (1.46 g, 6.25 mmol) was added dichloroethane (32 ml) followed by the catalyst (approximately 0.008 mmol). After one hour ethanol was injected to terminate the reaction and the polymer was washed with excess acetone, filtered and dried overnight, under vacuum at 80° C. The yield of polymer was 2.52 g (77%).

EXAMPLE 90

Preparation of catalyst

Nickel ethylhexanoate in mineral spirits (1 mmol of nickel) was added to a flask under a nitrogen atmosphere and diluted with toluene (about 20 ml). To this solution was added a solution of BF$_3$•etherate (1.13 ml, 1.3 g, 9 mmol) in toluene, causing the original green solution to turn yellow-green in color. 1,5-cyclooctadiene (3 mmol) was then added. To this solution was slowly added triethylaluminum (10 mmol) diluted to about 10% wt in toluene while the flask was cooled in ice water. To this solution was then added neat HSbF$_6$ (0.48 g, 2 mmol). The resulting solution/slurry was a dark-brown/black solution or colloidal slurry of the catalyst in toluene.

Copolymerization of norbornene and 5-decylnorbornene

To a 50 ml glass vial containing a magnetic stir bar norbornene (1.8 g, 18.8 mmol) and 5-decylnorbornene (1.46 g, 6.25 mmol) was added dichloroethane (34 ml) followed by the catalyst (approximately 0.008 mmol). After one hour ethanol was injected to terminate the reaction and the polymer was washed with excess acetone, filtered and dried overnight, under vacuum at 80° C. The yield of polymer was 2.26 g (69%).

EXAMPLE 91

Preparation of catalyst

Hexafluoroantimonic acid (HSbF$_6$, 0.68 g, 2.85 mmole) was placed in a dry, nitrogen filled Teflon® bottle with a Teflon® cap/valve containing a magnetic stir-bar and the contents were cooled to −27° C. Thereafter was added nickel ethylhexanoate (8% in mineral spirits, 1.9 mmole) and the resulting mixture was allowed to warm to ambient temperature and was then stirred at ambient temperature for 2 hours.

Homopolymerization of norbornene

To a 250 ml glass reaction flask fitted with mechanical stirring was added norbornene (10 g, 106 mmol), used as received without any purification, and dichloroethane (188 ml). The flask was cooled to 0° C. and thereafter was added the catalyst (approximately 0.019 mmol), BF$_3$•etherate (0.171 mmol) and triethylaluminum (0.19 mmol). Polymer formed immediately upon addition of the final catalyst component, the temperature rising to approximately 20° C. After one hour ethanol was injected to terminate the reaction and the polymer was washed with excess acetone, filtered and dried overnight, under vacuum at 80° C. The yield of polymer was 9.6 g (96%).

EXAMPLES 92 and 93

Preparation of catalyst

Hexafluoroantimonic acid ($HSbF_6$, 0.608 g, 2.57 mmole) was placed in a dry, nitrogen filled Teflon® bottle with a Teflon® cap/valve containing a magnetic stir-bar and the contents were cooled to −27° C. Thereafter was added nickel ethylhexanoate (8% in mineral spirits, 2.57 mmole) and the resulting mixture was allowed to warm to ambient temperature and was then stirred at ambient temperature for 2 hours.
Copolymerizations of norbornene and ethylidenenorbornene Example 92: To a 250 ml glass reaction flask fitted with mechanical stirring was added a 90:10 mol:mol mixture of norbornene and ethylidenenorbornene (10 g, 103 mmoles of total norbornenes) and dichloroethane (138 ml) at ambient temperature. Thereafter was added the catalyst (approximately 0.052 mmol), $BF_3$•etherate (0.47 mmol) and triethylaluminum (0.52 mmol). Polymer formed immediately upon addition of the final catalyst component. After one hour ethanol was injected to terminate the reaction and the copolymer was washed with excess acetone, filtered and dried overnight, under vacuum at 80° C. The yield of polymer was 6.7 g (67%).

Example 93: In a second experiment identical conditions were employed except that 1-decene (0.52 mmol) was added as chain transfer agent. The copolymer yield was 6.5 g (65%).

EXAMPLES 94 and 95

Preparation of catalyst

Hexafluoroantimonic acid ($HSbF_6$, 0.851 g, 3.59 mmole) was placed in a dry, nitrogen filled Teflon® bottle with a Teflon® cap/valve containing a magnetic stir-bar and the contents were cooled to −28° C. Thereafter was added cobalt neodecanoate (12% in mineral spirits, 3.59 mmole) and the resulting mixture was allowed to warm to ambient temperature and was then stirred at ambient temperature for 2 hours.
Homopolymerizations of norbornene Example 94: To a 100 ml glass vial containing a magnetic stir bar was added norbornene (5 g, 53.1 mmol) and dichloroethane (45 ml). At ambient temperature was added the catalyst (approximately 0.013 mmol, dissolved in 1,2 dichloroethane, 3 ml), $BF_3$•etherate (0.117 mmol) and triethylaluminum (0.13 mmol). There was an immediate, highly exothermic reaction on adding the last catalyst component. After one hour methanol was injected to terminate the reaction and the polymer was washed with excess acetone, filtered and dried overnight, under vacuum at 80° C. The yield of polymer was 4.1 g (82%). The GPC showed a weight average molecular weight ($M_w$) of 424,000.

Example 95: The above reaction was repeated identically except that 1-decene (0.2 ml) was added as a chain transfer agent. The polymer yield was 4.3 g (86%). NMR indicates the presence of olefinic end groups and the GPC showed a weight average molecular weight ($M_w$) of 233,000.

EXAMPLE 96

Preparation of catalyst

Hexafluoroantimonic acid ($HSbF_6$, 0.575 g, 2.23 mmole) was placed in a dry, nitrogen filled Teflon® bottle with a Teflon® cap/valve containing a magnetic stir-bar and the contents were cooled to −28° C. Thereafter was added iron napthenate (6% in mineral spirits, 2.23 mmole) and the resulting mixture was allowed to warm to ambient temperature and was then stirred at ambient temperature for 3 hours.
Homopolymerization of norbornene To a 100 ml glass vial containing a magnetic stir bar was added norbornene (5 g, 53.1 mmol) and dichloroethane (45 ml). At ambient temperature was added the catalyst (approximately 0.013 mmol, dissolved in 1,2 dichloroethane, 3 ml), $BF_3$•etherate (0.117 mmol) and triethylaluminum (0.13 mmol). After one hour methanol was injected to terminate the reaction and the polymer was washed with excess acetone, filtered and dried overnight, under vacuum at 80° C. The yield of polymer was 0.5 g (10%).

EXAMPLE 97

Preparation of catalyst

Hexafluoroantimonic acid ($HSbF_6$, 0.666 g, 2.81 mmole) was placed in a dry, nitrogen filled Teflon® bottle with a Teflon® cap/valve containing a magnetic stir-bar and the contents were cooled to −28° C. Thereafter was added palladium ethylhexanoate (in mineral spirits, 2.81 mmole) and the resulting mixture was allowed to warm to ambient temperature and was then stirred at ambient temperature for 2 hours.
Homopolymerization of norbornene To a 50 ml glass vial containing a magnetic stir bar was added norbornene (5 g, 53.1 mmol) and dichloroethane (40 ml). At ambient temperature was added triethylaluminum (0.13 mmol) followed by the catalyst (approximately 0.013 mmol, dissolved in 1,2 dichloroethane, 3 ml). After one hour methanol was injected to terminate the reaction and the polymer was washed thoroughly with excess acetone, filtered and dried overnight, under vacuum at 80° C. The yield of polymer was 1.5 g (30%).

EXAMPLE 98

Homopolymerization of norbornene

To a 50 ml glass vial containing a magnetic stir bar and norbornene (5.0 g, 53.1 mmol) was added isooctane (3 ml) followed by the cobalt neodecanoate (0.053 ml of a 1.0 molar solution in toluene, 0.053 mmol) and ethylaluminum dichloride (50% in hexanes, 0.265 mmol). After one hour ethanol was injected to terminate the reaction, the polymer was precipitated from solution by adding the solution to an excess of ethanol and the polymer was filtered and washed with excess acetone, filtered and dried overnight, under vacuum at 80° C. The yield of poly(norbornene) was 2.6 g, 52%. The polymer was characterized by proton NMR methods (in $CDCl_3$) to be the addition polymer of norbornene (resonances between 0.8 and 2.6 ppm, no indication of unsaturation).

EXAMPLE 99

Homopolymerization of norbornene in heptane

To a 50 ml glass vial containing a magnetic stir bar and norbornene (5 g, 53.1 mmol) was added heptane (35 ml) followed by nickel ethylhexanoate (0.026 mmol) and ethylaluminum dichloride (0.13 mmol). After one hour ethanol was injected to the viscous polymer solution to terminate the reaction. The polymer was then precipitated from solution using an excess of ethanol, filtered and the polymer was washed with excess acetone, filtered and dried overnight, under vacuum at 80° C. The yield of poly(norbornene) was 3.75 g, 75%. The GPC data was as follows: $M_w$ 235,000, $M_n$ 90,000.

EXAMPLE 100

Copolymerization of norbornene and 5-decylnorbornene

To a 100 ml glass vial containing a magnetic stir bar and a mixture of norbornene and 5-decylnorbornene (75/25 mol/mol, 53 mmol total norbornenes) was added heptane (35 ml) followed by nickel ethylhexanoate (0.013 mmol) and ethylaluminum dichloride (0.065 mmol). After one hour ethanol was injected to the solution to terminate the reaction. The polymer was precipitated with excess ethanol, washed with excess acetone, filtered and dried overnight, under vacuum at 80° C. The polymer yield was 4.75 g, $M_w$ 458,000, $M_n$ 174,000.

EXAMPLE 101

To a 50 ml glass vial containing a magnetic stir bar and norbornene (5 g, 53.1 mmol) was added 1,2-dichloroethane (35 ml) followed by nickel ethylhexanoate (0.026 mmol) and ethylaluminum dichloride (0.13 mmol). After one hour ethanol was injected to the slurry to terminate the reaction. The polymer was washed with excess acetone, filtered and dried overnight, under vacuum at 80° C. The yield of poly(norbornene) was 4.6 g, 92%.

EXAMPLES 102–104

Copolymerizations of norbornene and 5-decylnorbornene

To a 100 ml glass vial containing a magnetic stir bar and a mixture of norbornene and 5-decylnorbornene (75/25 mol/mol, 53 mmol total norbornenes) was added halohydrocarbon (30 ml) followed by metal ethylhexanoate (0.026 mmol in the case of nickel, 0.013 mmol in the case of palladium) and ethylaluminum dichloride (0.13 mmol). After one hour ethanol was injected to the slurry to terminate the reaction. The polymer was washed with excess acetone, filtered and dried overnight, under vacuum at 80° C. The polymer yields are tabulated below:

| Ex. # | Metal | Halohydrocarbon | Polymer yield, g | Conversion, % | $M_w$ | $M_n$ |
|---|---|---|---|---|---|---|
| 102 | Nickel | 1,2-dichloroethane | 5.8 | 85 | 602,000 | 73,800 |
| 103 | Nickel | dichloromethane | 6.0 | 88 | 992,000 | 96,500 |
| 104 | Palladium | 1,2-dichloroethane | 6.4 | 94 | 149,000 | 74,100 |

EXAMPLE 105

Copolymerization of norbornene and 5-decylnorbornene

To a 50 ml glass vial containing a magnetic stir bar and a mixture of norbornene and 5-decylnorbornene (75/25 mol/mol, 53 mmol total norbornenes) was added cyclohexane (30 ml) followed by nickel ethylhexanoate (0.013 mmol) and iso-butylaluminum dichloride (0.02 ml). After one hour ethanol was injected to the solution to terminate the reaction. The polymer blend was then precipitated with excess ethanol and was washed with excess acetone, filtered and dried overnight, under vacuum at 80° C. The polymer yield was 4.8 g. The GPC data was as follows: $M_w$ 416,000, $M_n$ 160,000.

EXAMPLE 106

Copolymerization of norbornene and 5-decylnorbornene

To a 50 ml glass vial containing a magnetic stir bar and a mixture of norbornene and 5-decylnorbornene (75/25 mol/mol, 53 mmol total norbornenes) was added heptane (30 ml) followed by nickel ethylhexanoate (0.013 mmol) and diethylaluminum chloride (0.065 mmol). After 5 days ethanol was injected to the solution to terminate the reaction. The polymer was dissolved in toluene and then precipitated with excess ethanol and was washed with excess acetone, filtered and dried overnight, under vacuum at 80° C. The polymer yield was 6.1 g. The GPC data was as follows: $M_w$ 377,000, $M_n$ 136,000.

EXAMPLES 107–109

Homopolymerizations of norbornene

To a 100 ml glass vial containing a magnetic stir bar and norbornene (5 g, 53.1 mmol) was added 1,2-dichloroethane (60 ml) and 1-decene (0.2 ml, 2 mole %) at the temperature indicated in the following table followed by palladium ethylhexanoate (0.088 ml of a 0.2 molar solution) and ethylaluminum dichloride (0.053 ml of a 3.4 molar solution). After 60 minutes the reaction was halted by adding to excess methanol, followed by filtration and washing with excess methanol, and drying overnight, under vacuum at 80° C. The polymer yields are tabulated in the following table:

| Example # | Reaction Temperature, Degree C. | Polymer Yield, g | Conversion, % |
|---|---|---|---|
| 107 | 40 | 3.62 | 72.4 |
| 108 | 55 | 3.73 | 74.6 |
| 109 | 70 | 3.70 | 74.0 |

EXAMPLES 110–130

Homopolymerization of Norbornene

To a 100 mL vial, equipped with a Teflon® septum and a stirbar, was added norbornene (5.0 g, 53 mmol) in 1,2-dichloroethane (60 mL). To this solution was added a 1,2-dichloroethane solution of Ni(II) 2-ethylhexanoate (0.66 mL of a 0.032M solution), a toluene solution of triethylaluminum (0.45 mL of a 0.22M solution), and a toluene solution of chloranil (0.21 mL of a 0.10M solution). The polymerization was allowed to continue for 1 hour. The slurry was poured into methanol, stirred, filtered, and dried in a vacuum oven overnight at 80° C.

Yield=3.06 g (61%), $M_w$=585,000, $M_n$=215,000.

The following homopolymerizations were carried out as in Example 110 above except that the activator (third component) differs as well as the amounts of catalyst, cocatalyst, and activator. The results of the homopolymerizations are presented in the following table:

| | | Homopolymerization of Norbornene | | | | | |
|---|---|---|---|---|---|---|---|
| Example # | Ni HEX-CEM (mmol Ni) | TEA1 triethyl aluminum | Activator | Yield | $M_n$ (× $10^{-3}$) | $M_w$ (× $10^{-3}$) | $M_w/M_n$ |
| 110 | 15 mg (0.021 mmol) | 11.4 mg (0.10 mmol) | chloranil (0.021 mmol) | 3.06 g (61%) | 215 | 585 | 2.72 |
| 111 | 15 mg (0.021 mmol) | 11.4 mg (0.10 mmol) | HCA (0.021 mmol) | 3.83 g (77%) | 32.5 | 87.1 | 2.68 |
| 112 | 15 mg (0.021 mmol) | 11.4 mg (0.10 mmol) | BPCC (0.021 mmol) | 0.10 g (2%) | 70.6 | 194 | 2.74 |
| 113 | 15 mg (0.021 mmol) | 11.4 mg (0.10 mmol) | HFIPA (0.021 mmol) | 0.7 g (14%) | 190 | 596 | 3.13 |
| 114 | 15 mg (0.021 mmol) | 23.9 mg (0.21 mmol) | chloranil (0.021 mmol) | 2.81 g (56%) | 71.1 | 177 | 2.49 |
| 115 | 15 mg (0.021 mmol) | 23.9 mg (0.21 mmol) | HCA (0.021 mmol) | 2.51 g (50%) | 76 | 205 | 2.68 |
| 116 | 15 mg (0.021 mmol) | 23.9 mg (0.21 mmol) | BPCC (0.021 mmol) | 0.50 g (10%) | 65.9 | 203 | 3.08 |
| 117 | 15 mg (0.021 mmol) | 23.9 mg (0.21 mmol) | HFIPA (0.021 mmol) | 3.17 g (63%) | 176 | 441 | 2.51 |
| 118 | 15 mg (0.021 mmol) | 23.9 mg (0.21 mmol) | HCA (0.21 mmol) | 4.48 g (90%) | 139 | 408 | 2.94 |
| 119 | 15 mg (0.021 mmol) | 23.9 mg (0.21 mmol) | BPCC (0.21 mmol) | 4.00 g (80%) | 41 | 79.7 | 1.94 |
| 120 | 15 mg (0.021 mmol) | 23.9 mg (0.21 mmol) | HFIPA (0.21 mmol) | 4.27 g (85%) | 240 | 610 | 2.54 |
| 121 | 15 mg (0.021 mmol) | 23.9 mg (0.21 mmol) | HFGTA (0.21 mmol) | 3.28 g (66%) | | | |
| 122 | 15 mg (0.021 mmol) | 23.9 mg (0.21 mmol) | — | 4.22 g (84%) | 96.6 | 366 | 3.79 |
| 123 | 15 mg (0.021 mmol) | 23.9 mg (0.21 mmol) | — | 4.41 g (88%) | 391 | 128 | 3.04 |
| 124 | 15 mg (0.021 mmol) | 23.9 mg (0.21 mmol) | HCA (0.21 mmol) | 4.51 g (90%) | | | |
| 125 | 10 mg (0.014 mmol) | 15.9 mg (0.14 mmol) | chloranil (0.14 mmol) | 2.69 g (54%) | 239 | 639 | 2.68 |
| 126 | 10 mg (0.014 mmol) | 15.9 mg (0.14 mmol) | HCA (0.14 mmol) | 4.31 g (86%) | 44.3 | 124 | 2.8 |
| 127 | 10 mg (0.014 mmol) | 15.9 mg (0.14 mmol) | BPCC (0.14 mmol) | 4.11 g (82%) | 60.1 | 130 | 2.16 |
| 128 | 10 mg (0.014 mmol) | 7.9 mg (0.07 mmol) | chloranil (0.014 mmol) | 4.00 g (80%) | 117 | 276 | 2.36 |
| 129 | 10 mg (0.014 mmol) | 7.9 mg (0.07 mmol) | HCA (0.014 mmol) | 3.50 g (70%) | 125 | 330 | 2.64 |
| 130 | 10 mg (0.014 mmol) | 7.9 mg (0.07 mmol) | BPCC (0.014 mmol) | 1.40 g (28%) | 97.7 | 314 | 3.22 |

HCA = hexachloroacetone,
BPCC = 3-butenoic acid-2,2,3,4,4-pentachlorobutylester
HFGTA = hexafluoroglutaric acid,
HFIPA = hexafluoroisopropanol

EXAMPLES 131–145

Copolymerization of Norbornene and 5-Decylnorbornene

To a 100 mL vial, equipped with a Teflon® septum and a stirbar, was added norbornene (3.74 g, 0.40 mol) and 5-decylnorbornene (3.10 g, 0.013 mol) in 1,2-dichloroethane (60 mL). To this solution was added a 1,2-dichloroethane solution of Ni(II) 2-ethylhexanoate (0.66 mL of a 0.032 M solution), a toluene solution of triethylaluminum (1.76 mL of a 0.24 M solution), and a toluene solution of hexachloroacetone (2.2 mL of a 0.10 M solution). The polymerization was allowed to continue for 1 hour. The slurry was poured into methanol, stirred, filtered, and dried in a vacuum oven overnight at 80° C.

Yield=6.04 g (88%), $M_w$=71,500, $M_n$=32,300.

The following copolymerizations were carried out as in Example 131 above except that the amounts of catalyst, cocatalyst, and activator differ and the type of cocatalyst differs. The results of the copolymerizations are presented in the following table:

| | Copolymerization of Norbornene and 5-Decylnorbornene. | | | | | | |
|---|---|---|---|---|---|---|---|
| Example # | Ni (mmol) | Al Alkyl (mmol) | HCA (mmol) | Yield | $M_n$ (× $10^{-3}$) | $M_w$ (× $10^{-3}$) | $M_w/M_n$ |
| 131 | 0.021 | TEA1 0.42 | 0.21 | 6.04 g (88.3%) | 32.3 | 71.5 | 2.21 |
| 132 | 0.021 | TEA1 | — | 1.00 g | | | |

-continued

Copolymerization of Norbornene and 5-Decylnorbornene.

| Example # | Ni (mmol) | Al Alkyl (mmol) | HCA (mmol) | Yield | $M_n$ ($\times 10^{-3}$) | $M_w$ ($\times 10^{-3}$) | $M_w/M_n$ |
|---|---|---|---|---|---|---|---|
| 133 | 0.021 | TEAl 0.21 0.42 | — | 1.84 g (14.6%) (26.9%) | | | |
| 134 | 0.021 | TEAl 0.42 | 0.21 | 5.98 g (87.4%) | 31.8 | 66.9 | 2.11 |
| 135 | 0.011 | TEAl 0.2 | 0.10 | 3.55 g (51.9%) | 63.6 | 127 | 1.99 |
| 136 | 0.021 | TEAl 0.32 | 0.21 | 5.90 g (86.3%) | 42.5 | 83.1 | 1.95 |
| 137 | 0.021 | DEAC 0.2 | 0.21 | 5.44 (79.5%) | 32.5 | 73.5 | 2.26 |
| 138 | 0.0211 | DEAC 0.32 | 0.21 10 | 5.52 (80.7%) | 41.7 | 92.3 | 2.21 |
| 139 | 0.021 | TIBAl 0.42 | 0.21 | 4.20 g (61.4%) | 83.3 | 158 | 1.9 |
| 140 | 0.021 | TIBAl 0.32 | 0.21 | 5.47 (80.0%) | 121 | 234 | 1.93 |
| 141 | 0.021 | TIBAl 0.2 | 0.21 | 5.50 g (80.4%) | 105 | 253 | 2.41 |
| 142 | 0.021 | TIBAl 0.2 | 0.10 | 5.61 g (82.0%) | 99.5 | 236 | 2.37 |
| 143* | 0.021 | TIBAl 0.2 | 0.10 | 6.40 g (93.5%) | 66.6 | 216 | 3.24 |
| 144 | 0.021 | TIBAl 0.32 | 0.10 | 3.31 g (48.4%) | 68.2 | 144 | 2.1 |
| 145 | 0.021 | TIBAl 0.11 | 0.11 | 0.33 g (4.8%) | 43.2 | 93.2 | 2.16 |

*Polymerization run for 7 hrs.
TEAl = triethylaluminum,
DEAC = diethylaluminum chloride,
TIBAl = triisobutylaluminum

EXAMPLE 145–146

Copolymerization of norbornene and 5-decylnorbornene Using Other Catalysts Polymerizations were run as example 131.

Copolymerization of Norbornene and Decylnorbornene (75:25) Using Pd and Co with Hexachloroacetone (HCA).

| Example # | Catalyst (mmol) | Al Alkyl (mmol) | HCA (mmol) | Yield | $M_n$ $10^{-3}$ | $M_w$ $10^{-3}$ |
|---|---|---|---|---|---|---|
| 145 | Co 0.021 | TIBAl 0.2 | 0.11 | 0.31 g (4.5%) | 21.3 | 161 |
| 146 | Pd 0.021 | TIBAl 0.2 | 0.11 | 5.43 (79.3%) | 66.9 | 213 |

EXAMPLES 147–157

Homopolymerization of Norbornene with various systems using hexachloroacetone as activator.

The following examples were run according to the procedure used in example 110 except that all experiments were carried out using hexachloroacetone as activator (ratio metal salt:hexachloroacetone: triethylaluminum, 1:10:10), for 1 hr, in dichloroethane, at room temperature.

| Example # | Catalyst | Norbornene: Catalyst | Conversion | $M_w$ $10^{-3}$ | $M_n$ $10^{-3}$ |
|---|---|---|---|---|---|
| 147 | Ni Hexcem | 2500:1 | 84% | 103 | 44.3 |
| 148 | $NiCl_2(PPh_3)_2$ | 2500:1 | 88% | 420 | 65.9 |
| 149 | $NiCl_2(PPh_2CH_2)_2$ | 2500:1 | 43% | 82.9 | 5.57 |
| 150 | Ni(II)hexafluoroacac tetrahydrate | 2500:1 | 91% | 423 | 64.4 |
| 151 | Ni(II)trifluoroacac dihydrate | 3100:1 | 88% | | |
| 152 | Ni(II)acac tetrahydrate | 2500:1 | 71% | 453 | 12.1 |
| 153 | trans-$PdCl_2(PPh_3)_2$ | 2500:1 | 60% | | |
| 154 | Pd(II) bis(trifluoroacetate) | 2500:1 | 95% | 411 | 9.96 |
| 155 | Pd(II) bis(acetylacetonate) | 2500:1 | 84% | 384 | 3.44 |
| 156 | Pd Hexcem | 3800:1 | 80% | | |
| 157 | $Pd(acetate)_2(PPh_3)_2$ | 2500:1 | 33% | | |

EXAMPLES 158–160

Example 158: Copolymerization of norbornene and 5-decylnorbornene

To a 50 ml glass vial containing a magnetic stir bar and a mixture of norbornene (3.7 g), 5-decylnorbornene (3.6 ml) and 1-decene (0.1 ml) was added cyclohexane (35 ml) followed by nickel ethylhexanoate (0.013 mmol) and ethylaluminum dichloride (0.065 mmol). After two hours ethanol was injected to the solution to terminate the reaction. The polymer blend was then diluted with toluene and precipitated with excess acetone and was washed with excess acetone, filtered and dried overnight, under vacuum at 80° C. The polymer yield was 5.4 g. The GPC data was as follows: $M_w$ 254,000, $M_n$ 100,000.

Examples 159, 160: Homopolymerizations of norbornene

To a 100 ml glass vial equipped with a magnetic stir-bar was added norbornene (5 g, 53.1 mmole) and an equimolar amount of the olefins listed in the table below. The vial and its contents were cooled to –20° C. Thereafter was added the nickel ethylhexanoate (0.026 mmole) and ethylaluminum dichloride (0.13 mmole). There ensued a rapid and exothermic polymerization which was terminated with methanol after 1 hour. The polymer was warmed to ambient temperature, dissolved in cyclohexane and reprecipitated with methanol. The polymer was washed with methanol and then acetone and dried overnight at 80° C. under vacuum. The polymer yields and MW data are listed below:

| Example # | Olefin, type | yield, g | $M_w$ | $M_n$ |
| --- | --- | --- | --- | --- |
| 159 | 4-methyl-pentene-1 (4MP1) | 5 | 7,300 | 3,680 |
| 160 | 4-methylcyclohexene (4MC) | 5 | 139,000 | 37,300 |

Each of the homopolymers showed the presence of olefinic end groups as witnessed by the presence of resonances in the proton NMR (o-dichlorobenzene) in the region 5–6 ppm (5.3–5.5 in the case of 4MP1, 5.2–5.7 in the case of 4MC).

EXAMPLE 161, 162

Homopolymerization of norbornene with isobutylene as chain transfer agent

Example 161: To a 50 ml glass vial equipped with a magnetic stir-bar were added norbornene (5 g) and isobutylene (5.0 g). At –30° C. the catalyst (catalyst A ([(η$^3$-crotyl)(cycloocta-1,5-diene)- nickel]hexafluorophosphate, 4.6 mg, 0.013 mmol) dissolved in 1,2-dichloroethane (2 ml) was added. The reaction was allowed to continue at –30° C. for 3 hours and was then kept at –20° C. overnight (15 hours). The reaction was then terminated by adding ethanol. The polymer was dissolved in toluene, reprecipitated with methanol, washed extensively with acetone and dried under vacuum, overnight, at 80° C. The polymer yield was 2.8 g (56%). The molecular weight was 27,400 ($M_w$, $M_n$=13,800). Evidence that the polymer is terminated with "isobutylene" (i.e., methylene groups, —$CH_2C(CH_3)$=$CH_2$) end groups is to be found in the proton NMR (deuterated chloroform) which shows resonances attributed to the methylene protons at 4.7–4.8 ppm. The proton NMR spectrum also indicates the polymer to be essentially devoid of isobutylene in the backbone.

Example 162: To a 100 ml glass vial equipped with a magnetic stir-bar were added 1,2-dichloroethane (40 ml), norbornene (5 g) and isobutylene (5.0 g). At ambient temperature the catalyst (catalyst A ([(η3-crotyl)(cycloocta-1,5-diene)nickel]hexafluorophosphate, 9.2 mg, 0.026 mmol) dissolved in 1,2-dichloroethane (2 ml) was added. The reaction was terminated after 1 hour by adding ethanol. The polymer was dissolved in toluene, reprecipitated with methanol, washed extensively with acetone and dried under vacuum, overnight, at 80° C. The polymer yield was 2.9 g (58%). The molecular weight was 17,400 ($M_w$, $M_n$=9,580). Evidence that the polymer is terminated with "isobutylene" (i.e., methylene groups, —$CH_2C(CH_3)$=$CH_2$) end groups is to be found in the proton NMR (deuterated chloroform) which shows resonances attributed to the methylene protons at 4.7–4.8 ppm. The proton NMR spectrum also indicates the polymer to be essentially devoid of isobutylene in the backbone.

EXAMPLE 163

Preparation of catalyst

Nickel ethylhexanoate (8% in mineral spirits) and dimethylanilinium tetrakis(pentafluorophenyl)-borate ($C_6H_5N(CH_3)_2H^+(C_6F_5)_4B^-$) were premixed in equimolar quantities in 1,2-dichloroethane to give a 0.125 Molar solution.

Homopoymerization of norbornene with isobutylene as chain transfer agent

To a 50 ml glass vial equipped with a magnetic stir-bar were added norbornene (5 g) and isobutylene (5.0 g). At –30° C. the catalyst (0.104 ml, 0.013 mmol) was added followed by neat triethylaluminum (0.088 ml, 0.65 mmol). There ensued a very rapid and exothermic reaction which was terminated after 1 hour by adding ethanol. The polymer was dissolved in toluene, reprecipitated with methanol, washed extensively with acetone and dried under vacuum, overnight, at 80° C. The polymer yield was 4.6 g (92%). Evidence that the polymer is terminated with "isobutylene" (i.e. methylene groups, —$CH_2C(CH_3)$=$CH_2$) end groups is to be found in the proton NMR (deuterated o-dichlorobenzene) which shows a resonance attributed to the methylene protons at 4.8 ppm. Apart from the isobutylene end-group the polymer showed resonances attributable to poly(norbornene) homopolymer. The proton NMR spectrum also indicates the polymer to be essentially devoid of isobutylene in the backbone.

EXAMPLE 164–167

Preparation of catalyst

Hexafluoroantimonic acid ($HSbF_6$, 0.557 g, 2.35 mmole) was placed in a dry, nitrogen filled Teflon® bottle with a Teflon® cap/valve containing a magnetic stir-bar and the contents were cooled to –28° C. Thereafter was added nickel ethylhexanoate (8% in mineral spirits, 3.52 mmole) and the resulting mixture was allowed to warm to ambient temperature and was then stirred at ambient temperature for 2 hours.

Copolymerizations of norbornene and 5-decylnorbornene

To a 100 ml glass vial equipped with a magnetic stir-bar was added a 75:25 mole/mole mixture of norbornene and 5-decylnorbornene (total 7.95 ml, 53 mmole of norbornenes) and 1,2 dichloroethane (32 ml). Then differing levels of 1-decene ($M_w$ control agent) were added (see table below). Thereafter was added the catalyst (0.012 mmol), $BF_3$•etherate (0.03 ml, 0.234 mmol) immediately followed by triethylaluminum (0.26 ml of 0.5 molar solution in hexanes, 0.13 mmol). There ensued a very rapid and exothermic polymerization which was terminated with methanol after 1 hour. The polymer was washed with methanol and then acetone and dried overnight at 80° C. under vacuum. The polymer yields and MW data are listed below:

| Example # | 1-Decene added, ml. | Polymer yield, g | $M_w$ | $M_n$ |
|---|---|---|---|---|
| 164 | 0.03 | 6 | 556,000 | 181,000 |
| 165 | 0.1 | 6 | 212,000 | 65,500 |
| 166 | 0.2 | 5.7 | 144,000 | 54,600 |
| 167 | 0.5 | 5.5 | 69,800 | 29,700 |

EXAMPLES 168–169

Preparation of catalyst

Hexafluoroantimonic acid (HSbF$_6$, 0.45 g, 1.90 mmole) was placed in a dry, nitrogen filled Teflon® bottle with a Teflon® cap/valve containing a magnetic stir-bar and the contents were cooled to –27° C. Thereafter was added nickel ethylhexanoate (8% in mineral spirits, 1.9 mmole) and the resulting mixture was allowed to warm to ambient temperature and was then stirred at ambient temperature for 2 hours.
Homopolymerizations of norbornene To a 100 ml glass vial equipped with a magnetic stir-bar was added 1,2 dichloroethane (35 ml), norbornene (5 g, 53.1 mmole) and an equimolar amount of the olefins listed in the table below. Thereafter was added the catalyst (0.012 mmol), BF$_3$•etherate (0.015 ml, 0.117 mmol) immediately followed by triethylaluminum (1.3 ml of 0.1 molar solution in heptane, 0.13 mmol). There ensued a very, rapid and exothermic polymerization which was terminated with methanol after 1 hour. The polymer was washed with methanol and then acetone and dried overnight at 80° C. under vacuum. The polymer yields and MW data are listed below:

| Example # | Olefin Used | Polymer Yield, g | $M_w$ | $M_n$ |
|---|---|---|---|---|
| 168 | 4-methylcyclohexene | 5 | 126,000 | 35,800 |
| 169 | 4-methyl-1-pentene | 4.8 | 11,600 | 4,920 |

EXAMPLES 170, 171

Preparation of catalyst

Hexafluoroantimonic acid (HSbF$_6$, 0.45 g, 1.90 mmole) was placed in a dry, nitrogen filled Teflon® bottle with a Teflon® cap/valve containing a magnetic stir-bar and the contents were cooled to –27° C. Thereafter was added nickel ethylhexanoate (8% in mineral spirits, 1.9 mmole) and the resulting mixture was allowed to warm to ambient temperature and was then stirred at ambient temperature for 2 hours.
Homopolymerizations of norbornene To a 100 ml glass vial equipped with a magnetic stir-bar was added 1,2 dichloroethane (50 ml), norbornene (5 g, 53.1 mmole) and allyltriethoxysilane as shown in the table below. Thereafter was added the catalyst (0.012 mmol), BF$_3$•etherate (0.015 ml, 0.117 mmol) immediately followed by triethylaluminum (1.3 ml of 0.1 molar solution in heptane, 0.13 mmol). There ensued a rapid and exothermic polymerization which was terminated with methanol after 1 hour. The polymer was washed with excess acetone and dried overnight at 80° C. under vacuum. The polymer yields and MW data are listed below. In each case the proton NMR spectra indicated that one mole of the allyltriethoxysilane was located on each polymer chain as a reactive end-group.

| Example # | Alkyl-triethoxysilane (mmol, mol %) | Polymer yield, g | Conversion, % | $M_w$ | $M_n$ |
|---|---|---|---|---|---|
| 170 | 1.06, 2% | 4.4 | 88 | 43,560 | 17,500 |
| 171 | 3.18, 6% | 2.1 | 42 | 27,770 | 12,720 |

EXAMPLE 172

To a 100 ml glass vial equipped with a magnetic stir-bar was added 1,2 dichloroethane (40 ml), norbornene (5 g, 53.1 mmole) and methylmethacrylate (1 ml). Thereafter was added nickel ethylhexanoate (0.013 mmol) immediately followed by methaluminoxane (1.9 mmol). The reaction mixture was allowed to stir at ambient temperature for 2 hours after which it was terminated with methanol. The polymer was washed with acetone and dried overnight at 80° C. under vacuum. The yield of polymer was 1.3 g (26%), the proton NMR indicated that the polymer was terminated with a —CH=C(CH$_3$)(CO$_2$CH$_3$) group originated from the methyl methacrylate chain transfer agent. The GPC data was as follows: $M_w$, 142,000, $M_n$, 50,700.

EXAMPLES 173–175

To a 100 ml glass vial equipped with a magnetic stir-bar was added 1,2 dichloroethane (60 ml), norbornene (5 g, 53.1 mmole) and 1-decene (amounts shown in the following table). Thereafter was added palladium trifluoroacetate (0.66 ml of a 0.0321 molar solution), immediately followed by triethylaluminum (0.54 ml of a 0.386 molar solution) and hexachloroacetone (1.63 ml of a 0.129 molar solution). The reaction mixture was allowed to stir at ambient temperature for 1 hour after which it was terminated with methanol. The polymer was washed with methanol and dried overnight at 80° C. under vacuum.

| Example # | 1-Decene (ml) | 1-Decene (mol %) | Polymer Yield g | $M_w$ | $M_n$ |
|---|---|---|---|---|---|
| 173 | 0 | 0 | 4.15 | 779,000 | 133,000 |
| 174 | 0.2 | 2 | 4.49 | 628,000 | 154,000 |
| 175 | 1 | 10 | 3.06 | 135,000 | 34,000 |

EXAMPLE 176

To a 100 ml glass vial equipped with a magnetic stir-bar was added 1,2 dichloroethane (60 ml), norbornene (5 g, 53.1 mmole) and allyltriethoxysilane (1.2 ml, 1.085 g). Thereafter was added palladium trifluoroacetate (0.66 ml of a 0.0321 molar solution), immediately/followed by triethylaluminum (0.54 ml of a 0.386 molar solution) and hexachloroacetone (1.63 ml of a 0.129 molar solution). The reaction mixture was allowed to stir at ambient temperature overnight after which it was terminated with methanol. The polymer was washed with methanol and dried overnight at 80° C. under vacuum. The polymer yield was 1.88 g, $M_w$ 33,000, $M_n$ 19,300.

EXAMPLES 177–187

Preparation of catalyst

Hexafluoroantimonic acid (HSbF$_6$, 0.45 g, 1.90 mmole) was placed in a dry, nitrogen filled Teflon® bottle with a Teflon® cap/valve containing a magnetic stir-bar and the contents were cooled to –27° C. Thereafter was added nickel ethylhexanoate (8% in mineral spirits, 1.9 mmole) and the resulting mixture was allowed to warm to ambient temperature and was then stirred at ambient temperature for 2 hours.

Homopolymerizations of norbornene

To a 100 ml glass vial equipped with a magnetic stir-bar was added 1,2 dichloroethane (60 ml), norbornene (5 g, 53.1 mmole) and varying amounts of the olefins listed in the table below. Thereafter was added the catalyst (0.018 mmol), $BF_3$•etherate (0.02 ml, 0.162 mmole) immediately followed by triethylaluminum (0.18 mmol). The reactions were terminated with methanol after 1 hour. The polymers were washed extensively with methanol and dried overnight at 80° C. under vacuum. The polymer yields and MW data are listed below:

| Example # | Olefin Type | Olefin (mol %) | Polymer yield, g | Conv. % | $M_w$ | $M_n$ |
|---|---|---|---|---|---|---|
| 177 | allyl chloride | 2 | 3.5 | 70 | 685,000 | 201,000 |
| 178 | allyl chloride | 5 | 3.3 | 66 | 458,000 | 186,000 |
| 179 | allyl chloride | 10 | 3.15 | 63 | 351,000 | 163,000 |
| 180 | vinyltriethoxysilane | 2 | 4.65 | 93 | 77,000 | 29,000 |
| 181 | allylisocyanate | 2 | 2.1 | 42 | 271,000 | 112,000 |
| 182 | allyl alcohol | 2 | 4 | 80 | 79,000 | 35,000 |
| 183 | allyl bromide | 2 | 3.35 | 67 | 599,000 | 204,000 |
| 184 | allylglycidyl ether | 2 | 1 | 20 | 159,000 | 83,000 |
| 185 | allyloxytrimethylsilane | 2 | 4.4 | 88 | 111,000 | 49,000 |
| 186 | 2-allylphenol | 2 | 1 | 20 | 116,000 | 59,000 |
| 187 | vinyltrichloroacetate | 2 | 3.15 | 63 | 638,000 | 220,000 |

EXAMPLE 188

Preparation of catalyst

Hexafluoroantimonic acid ($HSbF_6$, 1.126 g, 4.76 mmole) was placed in a dry, nitrogen filled Teflon® bottle with a Teflon® cap/valve containing a magnetic stir-bar. The bottle was cooled in alcohol/dry ice and nickel ethylhexanoate (8% in mineral spirits, 4.76 mmole) was added and the contents were allowed to warm to room temperature.

Copolymerization of norbornene and 5-decylnorbornene

To a 250 ml glass polymerization vessel fitted with a mechanical stirrer and baffles was added a 75/25 mol/mol % mixture of norbornene and 5-decylnorbornene (10 g), 1-decene (0.073 ml, 0.39 mmole) and methylene chloride (88 ml). To this stirred solution at −14° C. was added the above catalyst (0.016 ml, 0.019 mmole) followed by $BF_3$•etherate (0.021 ml, 0.17 mmole) and triethylaluminum (1.0 molar in toluene, 0.19 ml, 0.19 mmole). The ratio of the catalyst components (Ni:B:Al) was 1:9:10 and the ratio of the monomers to catalyst (norbornenes to Ni) was 4,000:1. The polymerization ensued immediately upon addition of the aluminum alkyl with an immediate exotherm from −14° C. to about 6° C., ultimately the temperature rose to 13° C.

After one hour the polymerization, which was in the form of an easily stirrable slurry of polymer particles in the diluent, was terminated by addition of ethanol. The polymer was isolated by filtration and washed with excess ethanol before drying at 80° C. under vacuum overnight to afford the copolymer product (9.03 g, 90% yield). The resulting polymer contained approximately 8 ppm of aluminum and less than 3 ppm of nickel.

EXAMPLE 189

The same catalyst was used as in examples 177–187. To a 100 ml glass vial equipped with a magnetic stir-bar was added 1,2 dichloroethane (40 ml) and norbornene (5 g, 53.1 mmole). Thereafter was added the catalyst (0.013 mmol), $BF_3$•etherate (0.015 ml) immediately followed by triethylaluminum (0.48 mmol) that had been prereacted at ambient temperature with 1-hexenol (1.06 mmol) in dichloroethane (4.8 ml). The reaction was terminated with methanol after one hour. The polymer was washed extensively with methanol and dried overnight at 80° C. under vacuum. The polymer yield was 3.2 g (64%), the GPC indicated a molecular weight ($M_w$) of 244,000: $M_n$ was 104,500).

EXAMPLE 190

To a 50 ml glass vial equipped with a magnetic stir-bar was added 1,2 dichloroethane (20 ml) and norbornene (2.34 g, 24.8 mmole) and B-5-hexenyl-9-borabicyclononane. Thereafter was added catalyst A (0.006 mmol). The reaction was terminated with methanol after one hour. The polymer was washed extensively with methanol and dried overnight at 80° C. under vacuum. The polymer yield was 1.8 g (77%), the GPC indicated a molecular weight ($M_w$) of 186,000: $M_n$ was 61,500).

EXAMPLES 191–193

Polymerizations were carried out according to the procedures in example 110, except that the catalyst component ratios were different and 1-decene was used as a CTA.

| Example # | Catalyst (mmol) | Al Alkyl (mmol) | HCA (mmol) | 1-Decene (mmol) | Yield | $M_n$ (× $10^{-3}$) | $M_w$ (× $10^{-3}$) |
|---|---|---|---|---|---|---|---|
| 191 | Ni 0.021 | TEAL 0.21 | 0.21 | 0 | 3.94 g (79%) | 69.9 | 163 |
| 192 | Ni 0.021 | TEAL 0.21 | 0.21 | 0.27 | 3.52 g (70%) | 68.1 | 143 |
| 193 | Ni 0.021 | TEAL 0.21 | 0.21 | 1.59 | 4.07 g (81%) | 27.6 | 60.1 |

EXAMPLES 194 and 195

Preparation of catalyst

To a clean, dry, nitrogen-purged 20 ml serum bottle containing a magnetic stir-bar was added nickel ethylhexanoate (8% in mineral spirits, 5 mmole). The bottle was then cooled to −78° C. and trifluoroacetic acid ($CF_3CO_2H$, 0.39 ml, 5 mmole) was added. The resulting mixture was allowed to warm to ambient temperature and was then stirred at ambient temperature for one hour.

Homopolymerizations of norbornene

Example 194: To a 100 ml glass vial containing a magnetic stir bar was added norbornene (5 g, 53.1 mmol) and dichloroethane (50 ml). At ambient temperature was added the catalyst (approximately 0.0 13 mmole, dissolved in 1,2 dichloroethane, 3 ml), $BF_3$•etherate (0.117 mmole) and triethylaluminum (0.13 mmole). There was an immediate, highly exothermic reaction on adding the last catalyst component. After one hour methanol was injected to terminate the reaction and the polymer was washed with excess acetone, filtered and dried overnight, under vacuum at 80° C. The yield of polymer was 4.8 g (96%).

Example 195: The above reaction was repeated identically except that 1-decene (0.5 ml) was added as a chain transfer agent. The polymer yield was 3.2 g (64%).

EXAMPLE 196

Preparation of catalyst

To a clean, dry nitrogen-purged 20 ml serum bottle containing a magnetic stir-bar was added nickel ethylhexanoate (8% in mineral spirits, 5 mmole). The bottle was then cooled to −78° C. and trifluoromethanesulfonic acid ($CF_3SO_3H$, 0.44 ml, 5 mmole) was added. The resulting mixture was allowed to warm to ambient temperature and was then stirred at ambient temperature for one hour and diluted with 1,2-dichloroethane (20 ml).

Homopolymerization of norbornene

To a 100 ml glass vial containing a magnetic stir bar was added norbornene (5 g, 53.1 mmol) and dichloroethane (50 ml). At ambient temperature was added the catalyst (approximately 0.013 mmol), $BF_3$•etherate (0.117 mmol) and triethylaluminum (0.13 mmol). There was an immediate, highly exothermic reaction on adding the last catalyst component. After one hour the polymerization had obviously reached very high conversion and so methanol was injected to terminate the reaction.

EXAMPLE 197

Preparation of catalyst

To a clean, dry, nitrogen-purged 20 ml serum bottle containing a magnetic stir-bar was added p-toluenesulfonic acid (p-$CH_3C_6H_4SO_3H$, 0.95 g, 5 mmole) and chlorobenzene (5 ml). This mixture was heated to about 100° C. to cause dissolution/melting of the acid. Nickel ethylhexanoate (8% in mineral spirits, 5 mmole) was then added and the mixture was allowed to stir for 10 minutes while cooling to ambient temperature.

Homopolymerization of norbornene

To a 100 ml glass vial containing a magnetic stir bar was added norbornene (5 g, 53.1 mmole) and dichloroethane (50 ml). At ambient temperature was added the catalyst (approximately 0.013 mmol), $BF_3$•etherate (0.117 mmol) and triethylaluminum (0.13 mmol). There was an immediate, highly exothermic reaction on adding the last catalyst component. After one hour the polymerization had obviously reached very high conversion and so methanol was injected to terminate the reaction.

EXAMPLES 198 and 199

Preparation of catalyst

Hexafluoroantimonic acid ($HSbF_6$, 0.45 g, 1.90 mmole) was placed in a dry, nitrogen filled Teflon® bottle with a Teflon® cap/valve containing a magnetic stir bar and the contents were cooled to −27° C. Thereafter was added nickel ethylhexanoate (8% in mineral spirits, 1.9 mmole) and the resulting mixture was allowed to warm to ambient temperature and was then stirred at ambient temperature for 2 hours.

Homopolymerizations of norbornene

Example 198: To a 100 ml glass vial equipped with a magnetic stir bar was added 1,2 dichloroethane (50 ml) and norbornene (5 g, 53.1 mmole). Thereafter was added the catalyst (0.013 mmol), $BCl_{13}$ (0.017 ml) immediately followed by triethylaluminum in cyclohexane (0.13 mmol). There ensued a very rapid polymerization which was terminated with methanol after one hour. The polymer was washed with methanol and then acetone and dried overnight at 80° C. under vacuum. The polymer yield amounted to 4.2 g (84%).

Example 199: To a 100 ml glass vial equipped with a magnetic stir bar was added 1,2 dichlorethane (50 ml) and norbornene (5 g, 53.1 mmole). Thereafter was added the catalyst (0.013 mmole), $B(OEt)_3$ (0.02 ml) immediately followed by triethylaluminum in cyclohexane (0.13 mmol). There ensued a very rapid polymerization which was terminated with methanol after one hour. The polymer was washed with methanol and then acetone and dried overnight at 80° C. under vacuum. The polymer yield amounted to 5 g (100%).

We claim:

1. An addition polymer consisting essentially of repeating units polymerized from one or more norbornene-functional monomers, and optionally one or more monocyclomonoolefins, terminated with an olefinic moiety introduced to said polymer via a chain transfer agent selected from a compound having a terminal olefinic double bond between adjacent carbon atoms, excluding styrenes, vinyl ethers, and conjugated dienes, and at least one of said adjacent carbon atoms has two hydrogen atoms attached thereto, wherein said olefinic moiety is exclusively located at a terminal end of said polymer.

2. The addition polymer of claim 1 wherein said norbornene-functional monomer is selected from a compound represented by the formulae:

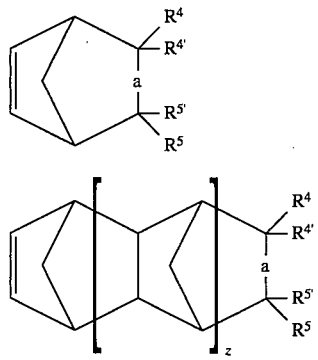

wherein $R^4$, $R^{4'}$ $R^5$, and $R^{5'}$ independently represent hydrogen, halogen, branched and unbranched ($C_1$–$C_{20}$) alkyl, ($C_1$–$C_{20}$) haloalkyl, substituted and unsubstituted cycloalkyl, $(C_1-C_6)$ alkylidenyl, $(C_6-C_{40})$ aryl, $(C_6-C_{40})$ haloaryl, $(C_7-C_{15})$ aralkyl, $(C_7-C_{15})$ haloaralkyl, $(C_2-C_{20})$ alkynyl, vinyl, $(C_3-C_{20})$ alkenyl, provided the alkenyl radical does not contain a terminal double bond, halogenated alkyl of the formula —$C_nF_{2n+1}$, wherein n is 1 to 20, $R^4$ and $R^5$ when taken with the two ring carbon atoms to which they are attached represent saturated and unsaturated cyclic groups containing 4 to 12 carbon atoms or an aromatic ring containing 6 to 17 carbon atoms, "a" represents a single or double bond, and "z" is 1 to 5; when $R^4$, $R^{4'}$ $R^5$, and $R^{5'}$ represent an alkylidene radical, the carbon atom to which the alkylidene radical is attached cannot have another substituent, and when "a" is a double bond $R^4$ to $R^5$ cannot be alkylidenyl.

3. The addition polymer of claim 2 wherein said norbornenefunctional monomer is selected from the group consisting of (a) norbornene; (b) substituted norbornene selected from the group consisting of branched and unbranched $(C_1-C_{20})$ alkylnorbornenes, branched and unbranched $(C_1-C_{20})$ haloalkylnorbornenes, $(C_1-C_6)$ alkylidenylnorbornenes, vinyl norbornene (c) tetracyclododecene and substituted tetracyclododecenes selected from the group consisting of branched and unbranched $(C_1-C_{20})$ alkyltetracyclododecenes, $(C_1-C_6)$ alkylidenyltetracyclododecenes; (d) dicyclopentadiene; (e) norbornadiene; (f) tetracyclododecadiene; (g) symmetrical and asymmetrical trimers of cyclopentadiene; and mixtures thereof.

4. The addition polymer of claim 1, 2, or 3 wherein said monocyclomonoolefin is selected from the group consisting of cyclobutene, cyclopentene, cycloheptene, cyclooctene, and mixtures thereof.

5. The addition polymer of claim 1 wherein said chain transfer agent is selected from a compound represented by the following formula:

$$CH_2=C\begin{matrix}R'\\R''\end{matrix}$$

wherein R' and R" are independently hydrogen, branched or unbranched $(C_1-C_{40})$ alkyl, branched or unbranched $(C_7-C_{40})$ araalkyl, branched or unbranched $(C_3-C_{40})$ alkenyl, halogen, or the group —$CH_2(CH_2)_n$—OR'''

—$Si(OR''')_3$

—$(CH_2)_n$—$Si(OR''')_3$

—$(CH_2)_n$—$OSi(R''')_3$

—$CH_2(CH_2)_n$—OH

—$CH_2(CH_2)_n$—NCO

—$(CH_2)_n$—⟨phenyl⟩—OH

—$(CH_2)_n$—X $$-O-\overset{O}{\underset{\|}{C}}-CX_3$$

—$CO_2$—R'''

—$(CH_2)_4$—B⟨ring⟩ wherein R''' is branched or unbranched $(C_1-C_{10})$ alkyl, branched or unbranched $(C_3-C_{40})$ alkenyl, substituted or unsubstituted $(C_6-C_{15})$ aryl, X is chlorine, fluorine, bromine or iodine, and n is 0 to 20.

6. The addition polymer of claim 5 wherein said chain transfer agent is selected from the group consisting of an α-olefin having 2 to 30 carbon atoms, isobutylene, 1,7-octadiene, and 1,6-octadiene.

7. The addition polymer of claim 6 wherein said chain transfer agent is selected from the group consisting of ethylene, propylene, 4-methyl-1-pentene, 1-decene, and 1-dodecene.

8. The addition polymer of claim 1 having a molecular weight in the range from about 500 to about 2,000,000.

9. The addition polymer of claim 8 wherein the molecular weight is in the range of about 3,000 to about 1,000,000.

10. The addition polymer of claim 9 wherein the molecular weight is in the range of about 50,000 to about 500,000.

11. An addition oligomer consisting essentially of 4 to 30 linked repeating units polymerized from one or more norbornene-functional monomers, and optionally one or more monocyclomonoolefins, terminated with an olefinic moiety introduced to said oligomer via a chain transfer agent selected from a compound having a terminal olefinic double bond between adjacent carbon atoms, excluding styrenes, vinyl ethers, and conjugated dienes, and at least one of said adjacent carbon atoms has two hydrogen atoms attached thereto, wherein said olefinic moiety is exclusively located at a terminal end of said oligomer.

12. The addition oligomer of claim 11 wherein said norbornene-functional monomer is selected from a compound represented by the formulae:

[norbornene structure with substituents $R^4$, $R^{4'}$, $R^{5'}$, $R^5$, and label a]

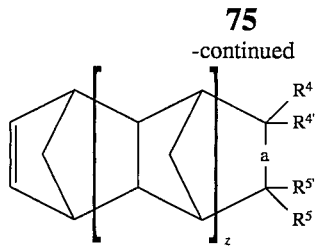

wherein $R^4$, $R^{4'}$ $R^5$, and $R^{5'}$ independently represent hydrogen, halogen, branched and unbranched ($C_1$–$C_{20}$) alkyl, ($C_1$–$C_{20}$) haloalkyl, substituted and unsubstituted cycloalkyl, ($C_1$–$C_6$) alkylidenyl, ($C_6$–$C_{40}$) aryl, ($C_6$–$C_{40}$) haloaryl, ($C_7$–$C_{15}$) aralkyl, ($C_7$–$C_{15}$) haloaralkyl, ($C_2$–$C_{20}$) alkynyl, vinyl, ($C_3$–$C_{20}$) alkenyl, provided the alkenyl radical does not contain a terminal double bond, halogenated alkyl of the formula —$C_nF_{2n+1}$, wherein n is 1 to 20, $R^4$ and $R^5$ when taken with the two ring carbon atoms to which they are attached represent saturated and unsaturated cyclic groups containing 4 to 12 carbon atoms or an aromatic ring containing 6 to 17 carbon atoms, "a" represents a single or double bond, and "z" is 1 to 5; when $R^4$, $R^{4'}$ $R^5$, and $R^{5'}$ represent an alkylidene radical, the carbon atom to which the alkylidene radical is attached cannot have another substituent, and when "a" is a double bond $R^4$ to $R^5$ cannot be alkylidenyl.

13. The addition oligomer of claim 12 wherein said norbornenefunctional monomer is selected from the group consisting of (a) norbornene; (b) substituted norbornene selected from the group consisting of branched and unbranched ($C_1$–$C_{20}$) alkylnorbornenes, branched and unbranched ($C_1$–$C_{20}$) haloalkylnorbornenes, ($C_1$–$C_6$) alkylidenylnorbornenes, vinyl norbornene (c) tetracyclododecene and substituted tetracyclododecenes selected from the group consisting of branched and unbranched ($C_1$–$C_{20}$) alkyltetracyclododecenes, ($C_1$–$C_6$) alkylidenyltetracyclododecenes; (d) dicyclopentadiene; (e) norbornadiene; (f) tetracyclododecadiene; (g) symmetrical and asymmetrical trimers of cyclopentadiene; and mixtures thereof.

14. The addition oligomer of claim 13 wherein said chain transfer agent is selected from a compound represented by the following formula:

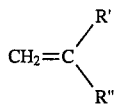

wherein R' and R" are independently hydrogen, branched or unbranched ($C_1$–$C_{40}$) alkyl, ($C_1$–$C_{40}$) branched or unbranched alkyl, branched or unbranched ($C_3$–$C_{40}$) alkenyl, halogen, or the group —$CH_2(CH_2)_n$—OR'''

—Si(OR''')$_3$

—($CH_2)_n$—Si(OR''')$_3$

—($CH_2)_n$—OSi(R''')$_3$

—$CH_2(CH_2)_n$—OH

—$CH_2(CH_2)_n$—NCO

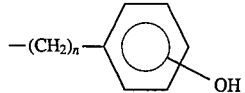

—($CH_2)_n$—X $$-O-\overset{O}{\underset{\|}{C}}-CX_3$$

—$CO_2$—R'''

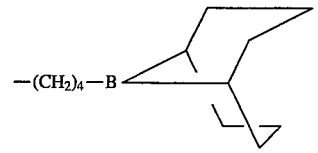

wherein R''' is ($C_1$–$C_{10}$) alkyl, branched or unbranched ($C_3$–$C_{40}$) alkenyl, X is chlorine, fluorine, bromine or iodine, and n is 0 to 20.

15. The addition oligomer of claim 14 wherein said chain transfer agent is selected from the group consisting of an α-olefin having 2 to 30 carbon atoms, isobutylene, 1,7-octadiene, and 1,6-octadiene.

16. The addition oligomer of claim 15 wherein said chain transfer agent is selected from the group consisting of ethylene, propylene, 4-methyl-1-pentene, 1-decene, and 1-dodecene.

17. An addition polymer or oligomer of norbornene or substituted norbornene derived repeating units having a $^{13}$C-NMR spectrum for a non-bridgehead CH group showing resonances at 45–55 ppm with a narrow multiplet centered at 47.5 to 48 ppm and $^{13}$C and $^1$H-NMR resonances characteristic of olefinic end groups.

18. The addition polymer of claim 1, 2, 3, 5, 6, 7, 8, 9, or 10 wherein said addition polymer polymerized from one or more norbornene functional monomers comprises 2,7-repeating unit linkages.

19. The addition oligomer of claim 11, 12, 13, 14, 15, or 16 wherein said addition polymer polymerized from one or more norbornene functional monomers comprises 2,7-repeating unit linkages.

* * * * *